United States Patent
Ishikura et al.

(10) Patent No.: US 9,427,779 B2
(45) Date of Patent: Aug. 30, 2016

(54) MULTILAYER FILM-FORMING METHOD AND COATED ARTICLE

(71) Applicant: KANSAI PAINT CO., LTD., Hyogo (JP)

(72) Inventors: Minoru Ishikura, Kanagawa (JP); Takashi Nakayabu, Kanagawa (JP); Yuuki Yamada, Aichi (JP); Masami Kobata, Kanagawa (JP)

(73) Assignee: KANSAI PAINT CO., LTD., Hyogo (JP)

(*) Notice: Subject to any disclaimer, the term of this patent is extended or adjusted under 35 U.S.C. 154(b) by 16 days.

(21) Appl. No.: 14/380,073

(22) PCT Filed: Feb. 22, 2013

(86) PCT No.: PCT/JP2013/054606
§ 371 (c)(1),
(2) Date: Aug. 21, 2014

(87) PCT Pub. No.: WO2013/125705
PCT Pub. Date: Aug. 29, 2013

(65) Prior Publication Data
US 2015/0037591 A1    Feb. 5, 2015

(30) Foreign Application Priority Data

Feb. 24, 2012 (JP) ................. 2012-038162

(51) Int. Cl.

| | | |
|---|---|---|
| *B05D 1/02* | (2006.01) | |
| *C08G 18/08* | (2006.01) | |
| *C09D 123/28* | (2006.01) | |
| *B05D 7/00* | (2006.01) | |
| *C08G 18/79* | (2006.01) | |
| *C08G 18/80* | (2006.01) | |
| *C08G 18/40* | (2006.01) | |
| *C08G 18/42* | (2006.01) | |
| *B05D 3/02* | (2006.01) | |
| *C09D 133/10* | (2006.01) | |
| *C09D 175/04* | (2006.01) | |
| *C09D 179/04* | (2006.01) | |
| *C09D 5/02* | (2006.01) | |
| *C08G 18/62* | (2006.01) | |

(52) U.S. Cl.
CPC ................ *B05D 7/572* (2013.01); *B05D 1/02* (2013.01); *B05D 3/0254* (2013.01); *B05D 7/532* (2013.01); *B05D 7/542* (2013.01); *C08G 18/0866* (2013.01); *C08G 18/4063* (2013.01); *C08G 18/423* (2013.01); *C08G 18/4263* (2013.01); *C08G 18/6254* (2013.01); *C08G 18/792* (2013.01); *C08G 18/8064* (2013.01); *C08G 18/8093* (2013.01); *C08G 18/8096* (2013.01); *C09D 5/024* (2013.01); *C09D 123/28* (2013.01); *C09D 133/10* (2013.01); *C09D 175/04* (2013.01); *C09D 179/04* (2013.01); *Y10T 428/31551* (2015.04)

(58) Field of Classification Search
CPC ...... B05D 7/572; B05D 1/02; B05D 3/0254; B05D 7/532; B05D 7/542; C09D 133/10; C09D 175/04; C09D 123/28; C09D 179/04; C09D 123/10; C09D 5/024; C08G 18/792; C08G 18/8093; C08G 18/0866; C08G 18/4063; C08G 18/423; C08G 18/6254; C08G 18/8064; C08G 18/8096; C08G 18/4263
USPC ..................... 524/507; 428/423.1; 427/385.6
See application file for complete search history.

(56) References Cited

U.S. PATENT DOCUMENTS

| | | | | |
|---|---|---|---|---|
| 4,518,724 A | * | 5/1985 | Kuwajima ........... | C09D 133/06 523/501 |
| 5,747,558 A | * | 5/1998 | Nishi ...................... | B05D 7/57 523/201 |
| 6,274,693 B1 | * | 8/2001 | Poth ................... | C08G 18/6254 427/385.5 |
| 6,696,539 B2 | | 2/2004 | Kobata et al. | |

(Continued)

FOREIGN PATENT DOCUMENTS

| | | |
|---|---|---|
| CN | 1793250 A | 6/2006 |
| EP | 1236751 A1 | 9/2002 |

(Continued)

OTHER PUBLICATIONS

Search Report related to the corresponding European Patent Application No. 13751532.6 dated Aug. 11, 2015.

(Continued)

*Primary Examiner* — Michael M Bernshteyn
(74) *Attorney, Agent, or Firm* — Millen White Zelano and Branigan, PC; John Sopp; Anthony Zelano

(57) ABSTRACT

A method of forming a multilayer coating film with smoothness, distinct image, adhesion and water resistance when a plurality of uncured coating films are cured at once, and especially when cured at low temperature. The method includes the following steps 1-1 to 1-4: step 1-1: coating an article with a primer coating composition (X) and forming an uncured primer coating film on the article, step 1-2: a coating the article having the uncured primer coating film with an aqueous colored coating composition ($Y_1$) for a base coat, to form an uncured base coat film thereover, step 1-3: coating the article having the uncured primer coating film and uncured base coat film, with a clear coating composition (Z), and forming an uncured clear coating film thereover, and step 1-4: a curing the uncured primer coating film, the uncured base coat coating film and the uncured clear coating film by heating.

35 Claims, No Drawings

(56) References Cited

U.S. PATENT DOCUMENTS

| | | |
|---|---|---|
| 7,875,684 B2 | 1/2011 | Nakane et al. |
| 8,580,385 B2 | 11/2013 | Kitagawa et al. |
| 2001/0024693 A1* | 9/2001 | Morimoto ............... B05D 7/57 427/404 |
| 2002/0165335 A1 | 11/2002 | Kobata et al. |
| 2006/0135651 A1 | 6/2006 | Nakane et al. |
| 2011/0135935 A1 | 6/2011 | Adachi et al. |
| 2011/0293948 A1 | 12/2011 | Tanaka et al. |
| 2012/0021228 A1 | 1/2012 | Kitagawa et al. |
| 2012/0107619 A1* | 5/2012 | Kitagawa ............... C08G 18/44 428/423.1 |
| 2014/0030528 A1 | 1/2014 | Kitagawa et al. |
| 2014/0031484 A1 | 1/2014 | Kobata et al. |

FOREIGN PATENT DOCUMENTS

| | | |
|---|---|---|
| EP | 1852478 A1 | 11/2007 |
| JP | 2001521956 A | 11/2001 |
| JP | 2002-153806 A | 5/2002 |
| JP | 2002-322238 A | 11/2002 |
| JP | 2004-025046 A | 1/2004 |
| JP | 2007-297545 A | 11/2007 |
| JP | 2009-155409 A | 7/2009 |
| JP | 2011-131135 A | 7/2011 |
| JP | 2011-530393 A | 12/2011 |
| WO | 2008050778 A1 | 5/2008 |
| WO | 2010018872 A1 | 2/2010 |
| WO | 2012137881 A1 | 10/2012 |
| WO | 2012137884 A1 | 10/2012 |

OTHER PUBLICATIONS

Database WPI, Week 200264, Thomson Scientific, London, GB, AN 2002-593937, XP002742920, [2002], (2 pages).

Official Action related to the corresponding Chinese Application No. 201380010492.6 dated Apr. 10, 2015.

International Search Report from PCT/JP2013/054606 dated May 28, 2013.

\* cited by examiner

MULTILAYER FILM-FORMING METHOD AND COATED ARTICLE

TECHNICAL FIELD

The disclosure relates to a method of forming a multilayer coating film, and to a coated article formed by the method.

BACKGROUND ART

Multilayer coating film-forming methods for automobile bodies or automobile parts that are known in the prior art include three-coat, two-bake systems comprising (i) a step of coating an article to be coated (electrodeposited steel sheet, plastic or the like) with a primer coating composition (intercoating composition) and heating it to cure the formed uncured primer coating film, (ii) a step of coating the primer coating film with a base coat material and forming an uncured base coat coating film, (iii) a step of coating the uncured base coat coating film with a clear coating composition and forming an uncured clear coating film, and (iv) a step of heating to cure the uncured base coat coating film and the uncured clear coating film.

There is also widely known, as a multilayer coating film-forming method for automobile bodies or automobile parts, a two-coat, two-bake system comprising (i) a step of coating an article to be coated with a primer coating, and heating it to cure the formed uncured primer coating film, (ii) a step of coating the primer coating film with a top coat material and forming an uncured top coat coating film, and (iii) heating it to cure the uncured top coating film (optionally including a step of preheating after coating of the coating composition).

Generally speaking, the three-coat, two-bake system is employed when a "metallic color" coating film is to be formed using a base coat material containing a luster pigment, while the two-coat, two-bake system is employed when a "solid color", such as white or black coating film is to be formed using a top coat material containing a color pigment.

On the other hand, from the viewpoint of shortening the line steps and achieving energy savings in recent years, research has been carried out on 3-coat, 1-bake systems that eliminate the heating step after coating of the primer coating, comprising (i) a step of coating an article to be coated with a primer coating and forming an uncured primer coating film, (ii) a step of coating the uncured primer coating film with a base coat material and forming an uncured base coat coating film, (iii) a step of coating the uncured base coat coating film with a clear coating composition and forming an uncured clear coating film, and (iv) a step of heating to cure the layered coating films.

Research has also been carried out on 2-coat, 1-bake systems comprising (i) a step of coating an article to be coated with a primer coating and forming an uncured primer coating film, (ii) a step of coating the uncured primer coating film with a clear coating composition and forming an uncured clear coating film, and (iii) a step of heating to cure the layered coating films, and 2-coat, 1-bake systems comprising (i) a step of coating an article to be coated with a base coat material and forming an uncured base coat coating film, (ii) coating the uncured base coat coating film with a clear coating composition and forming an uncured clear coating film, and (iii) heating to cure the layered coating film (optionally including a step of preheating after coating of the coating composition). From the viewpoint of minimizing environmental pollution by volatilization of organic solvents in 3-coat, 1-bake systems and 2-coat, 1-bake systems, there is particular demand for systems employing aqueous coating compositions as the base coat material and top coat material.

In these 3-coat, 1-bake systems and 2-coat, 1-bake systems, however, mixing takes place between the aqueous base coat coating film (aqueous top coating film) and the primer coating film or between the aqueous base coat coating film (aqueous top coating film) and the clear coating film, often reducing the smoothness and distinctness of image of the multilayer coating film that is formed.

In addition, in a base coat material (top coat material) that requires a variety of types for different coating colors, it is possible to reduce costs and improve color matching by using the same for automobile body coating compositions and automobile part coating compositions. On the other hand, considering the heat resistance (and/or energy efficiency) of plastics as automobile part materials, there has been a desire for coating compositions and multilayer coating film-forming methods that allow curing to be accomplished at lower temperatures than the conventional range of 120° C. to 160° C.

However, with conventional aqueous base coat materials (aqueous top coat materials) and multilayer coating film-forming methods, heating at low temperature results in insufficient curing of the multilayer coating film and the adhesion and water resistance of the multilayer coating film has sometimes been reduced.

In PTL 1, for example, there is described a 3-coat, 1-bake type of coating film-forming method, in which an intercoating film, a base coating film and a clear coating film are formed in that order on a base material in a wet-on-wet manner, wherein the intercoating composition forming the intercoating film and the base coating composition forming the base coating film comprise an amide group-containing acrylic resin and a curing agent, and the curing agent in the intercoating composition comprises an aliphatic isocyanate-based active methylene blocked isocyanate.

PTL 1 teaches that a viscosity-controlling effect is exhibited by the amide group-containing acrylic resin when the aliphatic isocyanate-based active methylene blocked isocyanate used as the curing agent has a mean functional group number of greater than 3, that intermingling and inversion at the interfaces between each of the coating film layers is limited when coating is by a 3-coat, 1-bake method, and also that curing of the intercoating film begins before that of the base coating film and clear coating film, allowing a sufficient flow property to be ensured, and a product results that has an excellent ground layer masking property against roughening of the electrodeposition coating, and therefore a multilayer coating film is obtained that has an excellent finished appearance and excellent coating properties, and especially chipping resistance.

PTL 2 describes an aqueous coating composition for a second aqueous coating composition, for formation of a multilayer coating film by application of a first aqueous coating composition, a second aqueous coating composition and a clear coating composition in that order in a wet-on-wet manner. The aqueous coating composition comprises (a) 40 to 60 parts by mass of an emulsion resin obtained by emulsion polymerization of a monomer mixture containing 0.5 to 10 mass % of a polyfunctional vinyl monomer (amount with respect to the total monomer component), a carboxyl group-containing vinyl monomer, a hydroxyl-containing vinyl monomer and another vinyl polymerizable monomer, (b) 1 to 5 parts by mass of an amide group-containing water-soluble acrylic resin, (c) 5 to 20 parts by mass of a urethane emulsion and (d) 15 to 35 parts by mass of a curing agent, in 100 parts by mass of resin solid content in the coating composition.

According to PTL 2, due to the crosslinked structure in the emulsion particles, coating in a wet-on-wet manner causes the clear coating composition component to infiltrate into the lower layer coating film, or in other words, formation of a mixed layer between the lower layer coating film and upper layer coating film is inhibited, and as a result, the energy required during formation of the multilayer coating film is lowered and a multilayer coating film with an excellent outer appearance and water resistance can be obtained. PTL 2 also teaches that the second aqueous coating composition has excellent storage stability, because it comprises (b) an amide group-containing water-soluble acrylic resin, (c) a urethane emulsion and (d) a curing agent.

PTL 3 describes a coating method in which an aqueous primer, aqueous base coat material and clear coat coating composition are coated onto a plastic base material and the three layers are simultaneously baked at a temperature of no higher than 100° C., wherein the aqueous primer comprises an aqueous polyolefin-based resin and an aqueous acrylic-based resin, and the aqueous base coat material comprises an aqueous polyurethane resin, a hydroxyl-containing aqueous acrylic resin and/or an aqueous polyester resin and a melamine resin, the melamine resin being a butyl/methyl mixed etherified melamine resin and having a weight-average molecular weight in the range of 1500-3000, the clear coat coating composition comprising a hydroxyl-containing resin and an isocyanate crosslinking agent, and the isocyanate crosslinking agent including a polyisocyanate compound with a urethodione structure and a trimer or greater diisocyanate compound, whereby a multilayer coating film with excellent adhesion, water resistance and durability can be formed.

PTL 4 describes a method of forming a multilayer coating film in which an aqueous intercoating composition is coated onto a base material having both a steel sheet and a plastic base material to form an intercoating film, an aqueous base coating composition is coated onto the formed intercoating film to form a base coating film, an organic solvent-based clear coating composition is coated to form a clear coating film, and the three layers: intercoating film, base coating film and clear coating film are cured by heating them, the method of forming a multilayer coating film being characterized in that the aqueous base coating composition contains, in 100 mass % of resin solid content, (a) 10 to 60 mass % by solid content of an acrylic resin emulsion obtained by emulsion polymerization of a monomer mixture containing 0.2 to 20 mass % of a crosslinkable monomer, (b) 5 to 40 mass % by solid content of a water-soluble acrylic resin, (c) 20 to 40 mass % by solid content of a melamine resin and (d) 10 to 40 parts by mass of a propylene glycol monoalkyl ether with respect to 100 parts by mass of the coating resin solid content, whereby the outer appearance of the steel sheet and plastic base material become uniform.

CITATION LIST

Patent Literature

PTL 1 Japanese Unexamined Patent Publication No. 2002-153806
PTL 2 Japanese Unexamined Patent Publication No. 2007-297545
PTL 3 International Patent Publication No. WO2008/050778
PTL 4 Japanese Unexamined Patent Publication No. 2011-131135

SUMMARY OF INVENTION

Technical Problem

In the method of forming a coating film described in PTL 1, however, the storage stability of the active methylene blocked isocyanate is low, sometimes lowering the smoothness and distinctness of image, while insufficient curing sometimes results in reduced adhesion. In the method of forming a coating film described in PTL 2, mixing between the intercoating composition and the aqueous base coat material and/or between the aqueous base coat material and the clear coating composition lowers the smoothness and distinctness of image of the coating film that is formed, and when the baking temperature is low the water resistance is sometimes reduced due to insufficient curing.

In the method of forming a coating film described in PTL 3, a large film thickness of the base coat and a low film thickness of the clear coat can sometimes result in a lower amount of polyisocyanate compound migrating from the clear coat coating composition into the base coat material and primer coating, and reduced water resistance due to insufficient curing. In the method of forming a coating film according to PTL 4, curing of the multilayer coating film has sometimes been insufficient when the baking temperature falls below 120° C., the base coating film is increased in thickness (to 30 μm or greater) or the clear coating film is decreased in thickness (to less than 20 μm).

It is therefore an object of this disclosure to provide a method of forming a multilayer coating film that forms a multilayer coating film with excellent smoothness, distinctness of image, adhesion and water resistance when a plurality of uncured coating films are cured at once, and especially when they are cured at once at low temperature.

Solution to Problems

The present inventors have discovered the following first to fourth methods of forming a multilayer coating film.

The first method of forming a multilayer coating film of the disclosure (hereunder also referred to as "Method I") is a method of forming a multilayer coating film comprising the following steps 1-1 to 1-4:

step 1-1: a step of coating an article to be coated with a primer coating composition (X) and forming an uncured primer coating film on the article to be coated, step 1-2: a step of coating the article to be coated having the uncured primer coating film with an aqueous colored coating composition ($Y_1$) for a base coat, to form an uncured base coat coating film thereover, step 1-3: a step of coating the article to be coated having the uncured primer coating film and uncured base coat coating film, with a clear coating composition (Z), and forming an uncured clear coating film thereover, and step 1-4: a step of curing the uncured primer coating film, the uncured base coat coating film and the uncured clear coating film by heating them, wherein the aqueous colored coating composition ($Y_1$) comprises a hydroxyl-containing resin (A), and a blocked polyisocyanate compound (B) having at least one blocked isocyanate group selected from the group consisting of blocked isocyanate groups represented by the following formula (I):

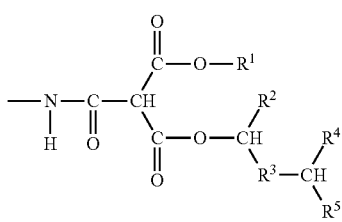

wherein $R^1$, $R^2$, $R^4$ and $R^5$ independently represent an approximately C1-C12 hydrocarbon group, and $R^3$ represents an approximately C1-C12 straight-chain or branched alkylene group,
blocked isocyanate groups represented by the following formula (II):

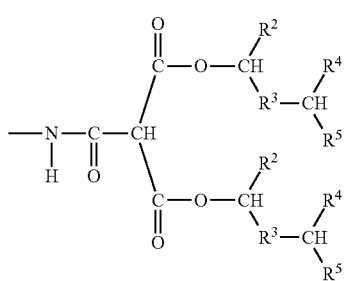

wherein $R^2$, $R^3$, $R^4$ and $R^5$ have the same definitions as above,
and blocked isocyanate groups represented by the following formula (III):

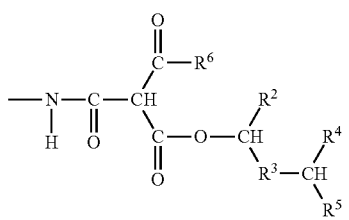

wherein $R^2$, $R^3$, $R^4$ and $R^5$ have the same definitions as above, and $R^6$ represents an approximately C1-C12 hydrocarbon group.

The second method of forming a multilayer coating film of the disclosure (hereunder also referred to as "Method II") is a method of forming a multilayer coating film comprising the following steps 2-1, 2-2 and 2-3:

step 2-1: a step of coating an article to be coated with a primer coating composition (X) and forming an uncured primer coating film on the article to be coated, step 2-2: a step of coating the article to be coated having the uncured primer coating film with an aqueous colored coating composition ($Y_2$) for a top coating film, and forming an uncured top coating film thereover, and step 2-3: a step of curing the uncured primer coating film and the uncured top coating film by heating them, wherein the aqueous colored coating composition ($Y_2$) comprises a hydroxyl-containing resin (A), and a blocked polyisocyanate compound (B) having at least one blocked isocyanate group selected from the group consisting of blocked isocyanate groups represented by formula (I) above, blocked isocyanate groups represented by formula (II) above and blocked isocyanate groups represented by formula (III) above.

The third method of forming a multilayer coating film of the disclosure (hereunder also referred to as "Method III") is a method of forming a multilayer coating film comprising the following steps 3-1, 3-2 and 3-3:

step 3-1: a step of coating an article to be coated with an aqueous colored coating composition ($Y_1$) for a base coat, and forming an uncured base coat coating film on the article to be coated, step 3-2: a step of coating the article to be coated having the uncured base coat coating film with a clear coating composition (Z) and forming a clear coating film thereover, and step 3-3: a step of curing the uncured base coat coating film and the uncured clear coating film by heating them, wherein the aqueous colored coating composition ($Y_1$) comprises a hydroxyl-containing resin (A), and a blocked polyisocyanate compound (B) having at least one blocked isocyanate group selected from the group consisting of blocked isocyanate groups represented by formula (I) above, blocked isocyanate groups represented by formula (II) above and blocked isocyanate groups represented by formula (III) above.

Advantageous Effects of Invention

The method of forming a multilayer coating film of the disclosure forms a multilayer coating film with excellent smoothness, distinctness of image, adhesion and water resistance when a plurality of uncured coating films are cured at once, and especially when they are cured at once at low temperature.

DESCRIPTION OF EMBODIMENTS

The method of forming a multilayer coating film of the disclosure will now be explained in greater detail.
[First Method of Forming a Multilayer Coating Film (Method 1)]

Method 1 comprises the following step 1-1 to step 1-4.
[Step 1-1]

In step 1-1, an article to be coated is coated with a primer coating composition (X), and an uncured primer coating film is formed on the article to be coated.
[Article to be Coated]

In the method of forming a multilayer coating film of the disclosure, the article to be coated, may be, for example, an external plating of an automobile body of a passenger vehicle, truck, motorcycle or bus; an automobile part, such as a bumper; or an external plating of a consumer electric product, such as a cellular phone or audio device. Preferred as articles to be coated are external platings of automobile bodies, and automobile parts.

The material of the article to be coated is not particularly restricted, and examples include metal materials, such as iron, aluminum, brass, copper, tin, stainless steel, galvanized steel and alloyed zinc (such as Zn—Al, Zn—Ni and Zn—Fe)-plated steel and the like; resins, such as polyethylene resins, polypropylene resins, acrylonitrile-butadiene-styrene (ABS) resins, polyamide resins, acrylic resins, vinylidene chloride resins, polycarbonate resins, polyurethane resins and epoxy resins, plastic materials, such as various FRP materials; inorganic materials, such as glass, cement and concrete; wood materials; fiber materials, such as paper and fabrics, and the like, among which metal materials and plastic materials are preferred.

The article to be coated may be an article that is a metal material or has a metal surface, such as a car body formed thereof, and that has been surface-treated by phosphate treatment, chromate treatment or complex oxide treatment, or that has a coating film.

Articles to be coated having coating films include base materials that have been optionally surface treated, and having undercoat coating films formed thereover. Car bodies having undercoat coating films formed by electrodeposition coating are particularly preferred, and car bodies having undercoat coating films formed by cationic electrodeposition coating are more preferred.

The article to be coated may also be one that has been optionally surface treated or primer-coated on the surface of the aforementioned plastic material or an automobile part formed from the plastic material. It may also be a combination of a plastic material and a metal material.

[Primer Coating Composition (X)]

A known primer coating composition may be used as the primer coating composition (X) in method 1. Specifically, the primer coating composition (X) preferably comprises, for example, a coating film-forming resin, a crosslinking agent, a color pigment, an extender pigment, a luster pigment and a solvent. The primer coating composition (X) may also comprise, optionally, coating additives, such as a ultraviolet absorber, light stabilizer, curing catalyst, plasticizer, adhesion imparter, compatibilizer, antifoaming agent, thickening agent, rust-preventive agent or surface control agent.

The coating film-forming resin may be, for example, an acrylic resin, polyester resin, alkyd resin, urethane resin, polyolefin resin or the like, or any desired combination thereof, and the coating film-forming resin preferably contains a hydroxyl group.

The primer coating composition (X) may contain a crosslinking agent, or it may not contain a crosslinking agent. In addition, the primer coating composition (X) may be crosslinked by infiltration of the crosslinking agent present in the coating film of the upper layer, and for example, the coating film-forming resin in the primer coating composition (X) may include a functional group that can react with the crosslinking agent in the coating film of the upper layer.

Examples for the crosslinking agent include melamine resins, polyisocyanate compounds and blocked polyisocyanate compounds.

The primer coating composition (X) may be either an organic solvent type or aqueous type, but it is preferably an aqueous type from the viewpoint of environmental protection.

The primer coating composition (X) can be applied by a known method, such as, for example, air spray coating, airless spray coating or rotary atomizing coating, and electrostatic application may also be applied during application. The application is preferably such that the cured film thickness of the primer coating composition (X) is in the range of preferably about 3 to about 40 μm, more preferably about 5 to about 30 μm and even more preferably about 7 to about 20 μm.

[Step 1-2]

In step 1-2, the article to be coated with the uncured primer coating film is coated with an aqueous colored coating composition ($Y_1$) for a base coat, to form an uncured base coat coating film over it.

Before application of the aqueous colored coating composition ($Y_1$), the uncured primer coating film may be preheated or air blown under conditions in which the primer coating film essentially does not cure.

As used herein, a "cured coating film" is a coating film in a "cured dry state" as specified by JIS K 5600-1-1:1999, i.e. a state in which, when the center of the coating surface is firmly held between the thumb and the forefinger, no fingerprint indentation is formed on the coating surface, no movement of the coating film is felt, and no rubbing trace remains on the coating surface when the center of the coating surface is rapidly rubbed with the fingertips. On the other hand, as used herein, an "uncured coating film" is a state in which the coating film has not reached the cured dry state, and this also includes a tack-free state and semi-cured dry state as specified by JIS K 5600-1-1:1999.

The preheating is carried out by heating at a temperature in a range of preferably about 40° C. to about 100° C., more preferably about 50° C. to about 90° C. and even more preferably about 60° C. or higher to below about 80° C., preferably for about 30 seconds to about 15 minutes, more preferably about 1 to about 10 minutes and even more preferably about 2 to about 5 minutes. Air blowing may generally be carried out by blasting the coated surface of the article to be coated with heated air at a temperature of ordinary temperature or about 25° C. to about 80° C., for a period of about 30 seconds to about 15 minutes.

Before application of the aqueous colored coating composition ($Y_1$), from the viewpoint of improving the smoothness and distinctness of image of the multilayer coating film to be formed and inhibiting pinhole popping, the uncured primer coating film may be subjected to preheating or air blowing if desired, to adjust the solid concentration of the uncured primer coating film to a range of generally about 60 to about 100 mass %, preferably about 80 to about 100 mass % and more preferably about 90 to about 100 mass %.

As used herein, the solid concentration of a coating film is that measured by the following method. The solid concentration of an uncured primer coating film after preheating will be used for explanation.

When a primer coating composition (X) is applied onto an article to be coated, aluminum foil whose mass ($M_1$) has previously measured is applied together with it. Next, after preheating the article to be coated with the uncured primer coating film and before coating with the next coating composition, the aluminum foil is recovered and the mass ($M_2$) is measured. The recovered aluminum foil is then dried at 110° C. for 60 minutes and allowed to cool to room temperature (25° C.) in a desiccator, after which the mass ($M_3$) of the aluminum foil is measured and the solid concentration is calculated by the following formula.

$$\text{Solid concentration (mass \%)} = \{(M_3-M_1)/(M_2-M_1)\} \times 100$$

This method allows calculation of the solid concentration of the primer coating film, base coating film and clear coating film at any desired time point.

The aqueous colored coating composition ($Y_1$) comprises (A) a hydroxyl-containing resin, and (B) a blocked polyisocyanate compound having at least one blocked isocyanate group selected from the group consisting of blocked isocyanate groups represented by the following formula (I):

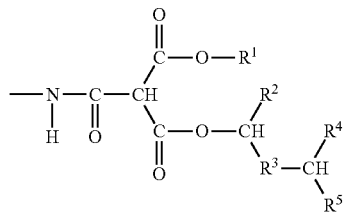

wherein $R^1$, $R^2$, $R^4$ and $R^5$ independently represent an approximately C1-C12 hydrocarbon group and $R^3$ represents an approximately C1-C12 straight-chain or branched alkylene group,
blocked isocyanate groups represented by the following formula (II):

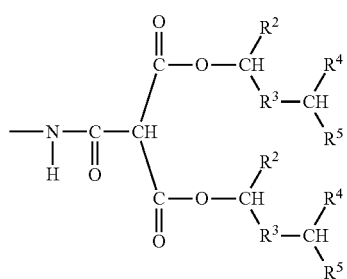

wherein $R^2$, $R^3$, $R^4$ and $R^5$ have the same definitions as above,
and blocked isocyanate groups represented by the following formula (III):

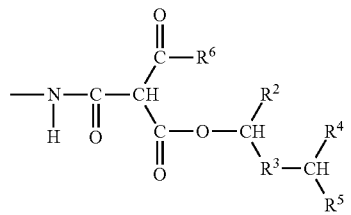

wherein $R^2$, $R^3$, $R^4$ and $R^5$ have the same definitions as above, and $R^6$ represents an approximately C1-C12 hydrocarbon group.

[Hydroxyl-Containing Resin (A)]

Examples for the hydroxyl-containing resin (A) include a hydroxyl-containing acrylic resin ($A_1$), a hydroxyl-containing polyester resin ($A_2$), a hydroxyl-containing polyurethane resin ($A_3$), a hydroxyl-containing epoxy resin and a hydroxyl-containing alkyd resin, as well as any desired combinations of the foregoing.

The hydroxyl-containing resin (A) has a hydroxyl value in the range of preferably 1 to 200 mgKOH/g, more preferably 5 to 150 mgKOH/g and even more preferably 10 to 100 mgKOH/g.

The hydroxyl-containing resin (A) may also have an acid group, such as a carboxyl group. When the hydroxyl-containing resin (A) has an acid group, such as a carboxyl group, the hydroxyl-containing resin (A) has an acid value in the range of preferably about 0.1 to about 55 mgKOH/g, more preferably about 3 to about 50 mgKOH/g and even more preferably about 7 to about 45 mgKOH/g.

From the viewpoint of smoothness, distinctness of image and water resistance of the multilayer coating film that is to be formed, the hydroxyl-containing resin (A) is preferably selected from the group consisting of hydroxyl-containing acrylic resins ($A_1$) and hydroxyl-containing polyester resins ($A_2$), and their combinations, and more preferably it includes both a hydroxyl-containing acrylic resin ($A_1$) and a hydroxyl-containing polyester resin ($A_2$).

When the aqueous colored coating composition ($Y_1$) includes both a hydroxyl-containing acrylic resin ($A_1$) and a hydroxyl-containing polyester resin ($A_2$) as the hydroxyl-containing resin (A), the hydroxyl-containing acrylic resin ($A_1$) and the hydroxyl-containing polyester resin ($A_2$) are present in ranges of preferably about 10 to about 90 mass % and about 10 to about 90 mass %, and more preferably in ranges of about 20 to about 80 mass % and about 20 to about 80 mass %, based on the total solid mass.

[Hydroxyl-Containing Acrylic Resin ($A_1$)]

The hydroxyl-containing acrylic resin ($A_1$) can be produced, for example, by copolymerization of a hydroxyl-containing polymerizable unsaturated monomer ($a_1$) and another polymerizable unsaturated monomer ($a_2$) that is copolymerizable with the hydroxyl-containing polymerizable unsaturated monomer ($a_1$) (hereunder referred to as "other polymerizable unsaturated monomer ($a_2$)", by a known method, such as a solution polymerization method in an organic solvent, an emulsion polymerization method in water, or a miniemulsion polymerization method in water.

The hydroxyl-containing polymerizable unsaturated monomer ($a_1$) is a compound having one or more hydroxyl and polymerizable unsaturated bonds in the molecule. Examples for the hydroxyl-containing polymerizable unsaturated monomer ($a_1$) include monoesterified products of (meth)acrylic acid and approximately C2-C8 dihydric alcohols, such as 2-hydroxyethyl (meth)acrylate, 2-hydroxypropyl (meth)acrylate, 3-hydroxypropyl (meth)acrylate and 4-hydroxybutyl (meth)acrylate; ε-caprolactone-modified forms of monoesterified products of the (meth)acrylic acid and approximately C2-C8 dihydric alcohols; N-hydroxymethyl (meth)acrylamide; allyl alcohols, and (meth)acrylates having polyoxyethylene chains with hydroxyl group molecular ends, as well as any desired combinations of the foregoing.

Examples for the other polymerizable unsaturated monomer ($a_2$) that is copolymerizable with the hydroxyl-containing polymerizable unsaturated monomer ($a_1$) include the following monomers (i) to (xix), as well as any desired combinations of the foregoing.

(i) Alkyl or cycloalkyl (meth)acrylates:

For example, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, tert-butylcyclohexyl (meth)acrylate, cyclododecyl (meth)acrylate, tricyclodecanyl (meth)acrylate and the like.

(ii) Polymerizable unsaturated monomers with isobornyl groups:
    Isobornyl (meth)acrylate and the like.
(iii) Polymerizable unsaturated monomers with adamantyl groups:
    Adamantyl (meth)acrylate and the like.
(iv) Polymerizable unsaturated monomers with tricyclodecenyl groups:
    Tricyclodecenyl (meth)acrylate and the like.
(v) Aromatic ring-containing polymerizable unsaturated monomers:
    Benzyl (meth)acrylate, styrene, α-methylstyrene, vinyltoluene and the like.
(vi) Polymerizable unsaturated monomers with alkoxysilyl groups:
    Vinyltrimethoxysilane, vinyltriethoxysilane, vinyltris(2-methoxyethoxy)silane, γ-(meth)acryloyloxypropyltrimethoxysilane, γ-(meth)acryloyloxypropyltriethoxysilane and the like.
(vii) Polymerizable unsaturated monomers with fluorinated alkyl groups:
    Perfluoroalkyl (meth)acrylates, such as perfluorobutylethyl (meth)acrylate and perfluorooctylethyl (meth)acrylate, and fluoroolefins and the like.
(viii) Polymerizable unsaturated monomers with photopolymerizable functional groups, such as maleimide.
(ix) Vinyl compounds:
    N-vinylpyrrolidone, ethylene, butadiene, chloroprene, vinyl propionate, vinyl acetate and the like.
(x) Carboxyl group-containing polymerizable unsaturated monomers:
    (Meth)acrylic acid, maleic acid, crotonic acid, β-carboxyethyl acrylate and the like.
(xi) Nitrogen-containing polymerizable unsaturated monomers:
    (Meth)acrylonitrile, (meth)acrylamide, N,N-dimethylaminoethyl (meth)acrylate, N,N-diethylaminoethyl (meth)acrylate, N,N-dimethylaminopropyl (meth)acrylamide, methylenebis(meth)acrylamide, ethylenebis(meth)acrylamide, glycidyl (meth)acrylate, amine compound addition products, and the like.
(xii) Polymerizable unsaturated monomers with two or more polymerizable unsaturated groups in the molecule:
    Allyl (meth)acrylates, 1,6-hexanediol di(meth)acrylate and the like.
(xiii) Epoxy group-containing polymerizable unsaturated monomers:
    Glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, allyl glycidyl ether and the like.
(xiv) (Meth)acrylates with polyoxyethylene chains with alkoxy groups at the molecular ends
(xv) Polymerizable unsaturated monomers with sulfonic acid groups:
    2-Acrylamide-2-methylpropanesulfonic acid, 2-sulfoethyl (meth)acrylate, allylsulfonic acid, 4-styrenesulfonic acid and the like; and sodium salts and ammonium salts of these sulfonic acids.
(xvi) Polymerizable unsaturated monomers with phosphate groups:
    Acid phosphooxyethyl (meth)acrylate, acid phosphooxypropyl (meth)acrylate, acid phosphooxypoly(oxyethylene) glycol (meth)acrylate, acid phosphooxypoly(oxypropylene) glycol (meth)acrylates and the like.
(xvii) Polymerizable unsaturated monomers with ultraviolet absorbing functional groups:
    2-Hydroxy-4-(3-methacryloyloxy-2-hydroxypropoxy) benzophenone, 2-hydroxy-4-(3-acryloyloxy-2-hydroxypropoxy)benzophenone, 2,2'-dihydroxy-4-(3-methacryloyloxy-2-hydroxypropoxy)benzophenone, 2,2'-dihydroxy-4-(3-acryloyloxy-2-hydroxypropoxy)benzophenone, 2-(2'-hydroxy-5'-methacryloyloxyethylphenyl)-2H-benzotriazole and the like.
(xviii) Ultraviolet-stable polymerizable unsaturated monomers:
    4-(Meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, 1-crotonoyl-4-crotonoyloxy-2,2,6,6-tetramethylpiperidine and the like.
(xix) Polymerizable unsaturated monomers with carbonyl groups:
    Acrolein, diacetoneacrylamide, diacetonemethacrylamide, acetoacetoxyethyl methacrylate, formylstyrol, approximately C4-C7 vinyl alkyl ketones (for example, vinyl methyl ketone, vinyl ethyl ketone and vinyl butyl ketone), and the like.

As used herein, "polymerizable unsaturated group" means an unsaturated group that can participate in radical polymerization. Examples of such polymerizable unsaturated groups include vinyl and (meth)acryloyl.

Also, as used herein, "(meth)acrylate" refers to acrylate and/or methacrylate. The term "(meth)acrylic acid" refers to acrylic acid and/or methacrylic acid. The term "(meth) acryloyl" refers to acryloyl and/or methacryloyl. The term "(meth)acrylamide" refers to acrylamide and/or methacrylamide.

The proportion of the hydroxyl-containing polymerizable unsaturated monomer ($a_1$) during production of the hydroxyl-containing acrylic resin ($A_1$) is preferably about 0.5 to about 50 mass %, more preferably about 1.0 to about 40 mass % and even more preferably about 1.5 to about 30 mass %, based on the total amount of the monomer components.

From the viewpoint of water resistance of the multilayer coating film to be formed, the hydroxyl-containing acrylic resin ($A_1$) has a hydroxyl value of preferably about 1 to about 200 mgKOH/g, more preferably about 5 to about 150 mgKOH/g and even more preferably about 10 to about 100 mgKOH/g.

Also, from the viewpoint of storage stability of the coating composition and distinctness of image and water resistance of the multilayer coating film that is to be formed, the hydroxyl-containing acrylic resin ($A_1$) has an acid value of preferably about 0.1 to about 55 mgKOH/g, more preferably 3 to 50 mgKOH/g and even more preferably 5 to 45 mgKOH/g.

Also, from the viewpoint of improving the smoothness, distinctness of image and water resistance of the multilayer coating film that is to be formed, the hydroxyl-containing acrylic resin ($A_1$) preferably contains a hydroxyl-containing acrylic resin aqueous dispersion ($A_{11}$) as at least one type.

The hydroxyl-containing acrylic resin aqueous dispersion ($A_{11}$) can be produced, for example, by copolymerizing a hydroxyl-containing polymerizable unsaturated monomer ($a_1$) and another polymerizable unsaturated monomer ($a_2$) that is copolymerizable with the hydroxyl-containing polymerizable unsaturated monomer ($a_1$), by a known method, such as an emulsion polymerization method in water or a miniemulsion polymerization method in water.

From the viewpoint of the water resistance of the multilayer coating film that is to be formed, the hydroxyl-containing acrylic resin in the hydroxyl-containing acrylic resin aqueous dispersion ($A_{11}$) has a hydroxyl value of preferably about 1 to about 200 mgKOH/g, more preferably about 5 to about 150 mgKOH/g and even more preferably about 10 to about 100 mgKOH/g.

The hydroxyl-containing acrylic resin in the hydroxyl-containing acrylic resin aqueous dispersion ($A_{11}$) may have an acid group, such as a carboxyl group. In this case, from the viewpoint of improving the storage stability of the coating composition and the smoothness, distinctness of image and water resistance of the multilayer coating film that is to be formed, the hydroxyl-containing acrylic resin in the hydroxyl-containing acrylic resin aqueous dispersion ($A_{11}$) has an acid value of preferably about 0.1 to about 55 mgKOH/g, more preferably about 3 to about 50 mgKOH/g and even more preferably about 7 to about 45 mgKOH/g.

Also, from the viewpoint of smoothness, distinctness of image, adhesion and water resistance of the multilayer coating film that is to be formed, the hydroxyl-containing acrylic resin aqueous dispersion ($A_{11}$) is preferably an aqueous dispersion of a core-shell type.

For such a core-shell type hydroxyl-containing acrylic resin aqueous dispersion there is preferred a core-shell type hydroxyl-containing acrylic resin aqueous dispersion ($A_{111}$) comprising a copolymer (I) as the core section (hereunder also referred to as "core section copolymer (I)") whose copolymerizing components are a polymerizable unsaturated monomer ($I_1$) having two or more polymerizable unsaturated groups in the molecule (hereunder also referred to as "monomer ($I_1$)") and a polymerizable unsaturated monomer ($I_2$) having one polymerizable unsaturated group in the molecule (hereunder also referred to as "monomer ($I_2$)"), and a copolymer (II) as the shell section (hereunder also referred to as shell section copolymer (II)") whose copolymerizing components are a hydroxyl-containing polymerizable unsaturated monomer ($II_1$), a carboxyl group-containing polymerizable unsaturated monomer ($II_2$) and another polymerizable unsaturated monomer ($II_3$).

Examples for the polymerizable unsaturated monomer ($I_1$) with two or more polymerizable unsaturated groups in the molecule, which is to form the core section copolymer (I), include allyl (meth)acrylate, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra(meth)acrylate, glycerol di(meth)acrylate, 1,1,1-trishydroxymethylethane di(meth)acrylate, 1,1,1-trishydroxymethylethane tri(meth)acrylate, 1,1,1-trishydroxymethylpropane tri(meth)acrylate, triallyl isocyanurate, diallyl terephthalate, divinylbenzene, methylenebis(meth)acrylamide, ethylenebis(meth)acrylamide, and any desired combinations of the foregoing.

The polymerizable unsaturated monomer ($I_1$) with two or more polymerizable unsaturated groups in the molecule has the function of imparting a crosslinked structure to the core section copolymer (I). The core section copolymer (I) contains the polymerizable unsaturated monomer ($I_1$) with two or more polymerizable unsaturated groups in the molecule in the range of preferably about 0.05 to about 20 mass %, more preferably about 0.1 to about 10 mass % and even more preferably about 0.2 to about 7 mass %, as a copolymerizing component, based on the total mass of the copolymerizing components composing the core section copolymer (I).

The polymerizable unsaturated monomer ($I_2$) with one polymerizable unsaturated group in the molecule, that is to form the core section copolymer (I), is a polymerizable unsaturated monomer that is copolymerizable with the polymerizable unsaturated monomer ($I_1$) with two or more polymerizable unsaturated groups in the molecule.

Specific examples for the polymerizable unsaturated monomer ($I_2$) with one polymerizable unsaturated group in the molecule, among the polymerizable unsaturated monomers mentioned as examples of the hydroxyl-containing polymerizable unsaturated monomer ($a_1$) and the other polymerizable unsaturated monomer ($a_2$) listed in explaining the hydroxyl-containing acrylic resin ($A_1$), include monomers, such as (i) to (xi), (xiii) to (xix) which are polymerizable unsaturated monomers other than the polymerizable unsaturated monomer ($I_1$) with two or more polymerizable unsaturated groups in the molecule, as well as any desired combinations of the foregoing.

From the viewpoint of the smoothness and distinctness of image of the coating film that is to be formed, there is preferably included a hydrophobic polymerizable unsaturated monomer as at least one the polymerizable unsaturated monomer ($I_2$) with one polymerizable unsaturated group in the molecule.

As used herein, the hydrophobic polymerizable unsaturated monomer referred to is a polymerizable unsaturated monomer having a C4 or greater and preferably C6-C18 straight-chain, branched or cyclic saturated or unsaturated hydrocarbon group, excluding monomers having hydrophilic groups, such as hydroxyl-containing polymerizable unsaturated monomers.

Examples for the hydrophobic polymerizable unsaturated monomer include alkyl or cycloalkyl (meth)acrylates, such as n-butyl (meth)acrylate, isobutyl (meth)acrylate, tert-butyl (meth)acrylate, pentyl (meth)acrylate, hexyl (meth)acrylate, octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, tert-butylcyclohexyl (meth)acrylate, cyclododecyl (meth)acrylate and tricyclodecanyl (meth)acrylate; polymerizable unsaturated compounds with isobornyl groups, such as isobornyl (meth)acrylate; polymerizable unsaturated compounds with adamantyl groups, such as adamantyl (meth)acrylate; aromatic ring-containing polymerizable unsaturated monomers, such as benzyl (meth)acrylate, styrene, α-methylstyrene and vinyltoluene, and any desired combinations of the foregoing.

From the viewpoint of distinctness of image of the multilayer coating film that is to be formed, the hydrophobic polymerizable unsaturated monomer is preferably at least one polymerizable unsaturated monomer selected from the group consisting of n-butyl (meth)acrylate, 2-ethylhexyl (meth)acrylate and styrene.

When the core section copolymer (I) contains the aforementioned hydrophobic polymerizable unsaturated monomer as a copolymerizing component, it contains the hydrophobic polymerizable unsaturated monomer as a copolymerizing component at preferably about 5 to about 90 mass %, more preferably about 20 to about 85 mass % and even more preferably about 40 to about 75 mass % based on the total mass of the copolymerizing component composing the core section copolymer (I). This is from the viewpoint of excellent stability of the core-shell type hydroxyl-containing acrylic resin aqueous dispersion ($A_{111}$) and smoothness, distinctness of image and water resistance of the coating film to be obtained.

Incidentally, in a core-shell type hydroxyl-containing acrylic resin aqueous dispersion ($A_{111}$), the core section copolymer (I) does not need to contain the monomer ($I_1$), and for example, the core section copolymer (I) may be formed from the monomer ($I_2$).

The shell section copolymer (II) contains a hydroxyl-containing polymerizable unsaturated monomer ($II_1$), a carboxyl group-containing polymerizable unsaturated monomer ($II_2$) and another polymerizable unsaturated monomer ($II_3$), as copolymerizing components.

The hydroxyl-containing polymerizable unsaturated monomer ($II_1$) which is to form the shell section copolymer (II) has the function of increasing the water resistance of the coating film by introducing hydroxyl groups, that undergo crosslinking reaction with the blocked polyisocyanate compound (B), into the core-shell type hydroxyl-containing acrylic resin in the core-shell type hydroxyl-containing acrylic resin aqueous dispersion ($A_{111}$) that is to be obtained, as well as improving the stability of the core-shell type hydroxyl-containing acrylic resin aqueous dispersion ($A_{111}$).

Examples for the hydroxyl-containing polymerizable unsaturated monomer ($II_1$) include monoesterified products of (meth)acrylic acid and approximately C2-C8 dihydric alcohols, such as 2-hydroxyethyl (meth)acrylate, 2-hydroxypropyl (meth)acrylate, 3-hydroxypropyl (meth)acrylate and 4-hydroxybutyl (meth)acrylate; ε-caprolactone-modified forms of monoesterified products of the (meth)acrylic acid and approximately C2-C8 dihydric alcohols; N-hydroxymethyl (meth)acrylamide; allyl alcohols, and (meth)acrylates having polyoxyethylene chains with hydroxyl group molecular ends, as well as any desired combinations of the foregoing.

The hydroxyl-containing polymerizable unsaturated monomer ($II_1$) is preferably selected from the group consisting of 2-hydroxyethyl (meth)acrylate, 2-hydroxypropyl (meth)acrylate, 3-hydroxypropyl (meth)acrylate and 4-hydroxybutyl (meth)acrylate, as well as any desired combinations of the foregoing, and more preferably it is 2-hydroxyethyl (meth)acrylate.

The shell section copolymer (II) contains the hydroxyl-containing polymerizable unsaturated monomer ($II_1$) as a copolymerizing component in the range of preferably about 1 to about 40 mass %, more preferably about 5 to about 30 mass % and even more preferably about 10 to about 25 mass %, based on the total mass of the copolymerizing components that are to compose the shell section copolymer (II). This is from the viewpoint of excellent stability of the core-shell type hydroxyl-containing acrylic resin aqueous dispersion ($A_{11}$) and water resistance of the coating film to be obtained.

Examples for the carboxyl group-containing polymerizable unsaturated monomer ($II_2$) that is to compose the shell section copolymer (II) include the carboxyl group-containing polymerizable unsaturated monomers (x) listed for the other polymerizable unsaturated monomer ($a_2$) in explaining the hydroxyl-containing acrylic resin ($A_1$). The carboxyl group-containing polymerizable unsaturated monomer ($II_2$) is preferably selected from the group consisting of acrylic acid and methacrylic acid, and combinations thereof. If the shell section contains a carboxyl group-containing polymerizable unsaturated monomer ($II_2$) as a copolymerizing component, stability of the obtained core-shell type hydroxyl-containing acrylic resin aqueous dispersion ($A_{111}$) will be ensured.

The shell section copolymer (II) contains the carboxyl group-containing polymerizable unsaturated monomer ($II_2$) as a copolymerizing component, at preferably about 0.1 to about 30 mass %, more preferably about 2 to about 25 mass % and even more preferably about 3 to about 19 mass %, based on the total mass of the copolymerizing components that are to compose the shell section copolymer (II). This is from the viewpoint of excellent stability of the core-shell type hydroxyl-containing acrylic resin aqueous dispersion ($A_{111}$) and water resistance of the coating film to be obtained.

The other polymerizable unsaturated monomer ($II_3$) that is to form the shell section copolymer (II) is a polymerizable unsaturated monomer other than the hydroxyl-containing polymerizable unsaturated monomer ($II_1$) and carboxyl group-containing polymerizable unsaturated monomer ($II_2$). Examples for the other polymerizable unsaturated monomer ($II_3$) include alkyl or cycloalkyl (meth)acrylates, such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, pentyl (meth)acrylate, hexyl (meth)acrylate, octyl (meth)acrylate, 2-ethylhexyl (meth)acrylate, nonyl (meth)acrylate, dodecyl (meth)acrylate, tridecyl (meth)acrylate, stearyl (meth)acrylate, isostearyl (meth)acrylate, cyclohexyl (meth)acrylate, methylcyclohexyl (meth)acrylate, tert-butylcyclohexyl (meth)acrylate, cyclododecyl (meth)acrylate and tricyclodecanyl (meth)acrylate; polymerizable unsaturated compounds with isobornyl groups, such as isobornyl (meth)acrylate; polymerizable unsaturated compounds with adamantyl groups, such as adamantyl (meth)acrylate; aromatic ring-containing polymerizable unsaturated monomers, such as benzyl (meth)acrylate, styrene, α-methylstyrene and vinyltoluene, and any desired combinations of the foregoing.

Preferred as the other polymerizable unsaturated monomer ($II_3$) that is to form the shell section copolymer (II) is one that includes no polymerizable unsaturated monomer with two or more polymerizable unsaturated groups in the molecule as a copolymerizing component, but one wherein the shell section copolymer (II) is non-crosslinked, from the viewpoint of improving the brightness of the coating film that is to be obtained.

The core section copolymer (I)/shell section copolymer (II) proportion in the core-shell type hydroxyl-containing acrylic resin aqueous dispersion ($A_{111}$) is preferably about 5/95 to about 95/5, more preferably about 50/50 to about 85/15 and even more preferably about 60/40 to about 80/20, as the solid weight ratio, from the viewpoint of improving the distinctness of image and brightness of the coating film that is to be formed.

The core-shell type hydroxyl-containing acrylic resin in the core-shell type hydroxyl-containing acrylic resin aqueous dispersion ($A_{111}$) has a hydroxyl value of preferably about 1 to about 200 mgKOH/g, more preferably about 5 to about 150 mgKOH/g and even more preferably about 10 to about 100 mgKOH/g, from the viewpoint of improving the chipping resistance and water resistance of the coating film that is to be obtained.

Also, from the viewpoint of improving the storage stability of the coating composition and the smoothness, distinctness of image and water resistance of the multilayer coating film that is to be formed, the core-shell type hydroxyl-containing acrylic resin in the core-shell type hydroxyl-containing acrylic resin aqueous dispersion ($A_{111}$) has an acid value of preferably about 0.1 to about 55 mgKOH/g, more preferably about 3 to about 50 mgKOH/g and even more preferably about 7 to about 45 mgKOH/g.

The core-shell type hydroxyl-containing acrylic resin aqueous dispersion ($A_{111}$) can be obtained, for example, by emulsion polymerization of a monomer mixture comprising about 0 to about 20 mass % of a polymerizable unsaturated monomer ($I_1$) with two or more polymerizable unsaturated groups in the molecule and about 80 to about 100 mass % of a polymerizable unsaturated monomer ($I_2$) with one polymerizable unsaturated group in the molecule, to obtain an emulsion of a core section copolymer (I), and then adding to the emulsion a monomer mixture comprising about 1 to about 40 mass % of a hydroxyl-containing polymerizable unsaturated monomer ($II_1$), about 0.1 to about 30 mass % of a carboxyl group-containing polymerizable unsaturated monomer ($II_2$) and about 30 to about 98.9 mass % of another polymerizable unsaturated monomer ($II_3$), and further conducting emulsion polymerization to form a shell section copolymer (II).

The emulsion polymerization used to prepare an emulsion of the core section copolymer (I) may be carried out by a known method. For example, the emulsion polymerization can be carried out by adding a polymerization initiator to a mixture of the aforementioned monomers in the presence of a surfactant.

Surfactants include anionic surfactants and nonionic surfactants. Examples of anionic surfactants include sodium salts and ammonium salts of alkylsulfonic acids, alkylbenzenesulfonic acids and alkylphosphoric acids. Examples for the nonionic surfactant include polyoxyethylene oleyl ether, polyoxyethylene stearyl ether, polyoxyethylene lauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan trioleate and polyoxyethylenesorbitan monolaurate.

Also, the anionic surfactant may be a polyoxyalkylene group-containing anionic surfactant having an anionic group and a polyoxyalkylene group, such as polyoxyethylene or polyoxypropylene in the molecule; or a reactive anionic surfactant having an anionic group and a radical polymerizable unsaturated group in the molecule, with reactive anionic surfactants being preferred.

The reactive anionic surfactant may be a sodium salt or ammonium salt of a sulfonic acid compound having a radical polymerizable unsaturated group, such as allyl, methallyl, (meth)acryloyl, propenyl or butenyl, with ammonium salts of sulfonic acid compounds having radical polymerizable unsaturated groups being preferred for excellent water resistance of the coating film that is to be obtained. An example of a commercial ammonium salt of a sulfonic acid compound is "LATEMUL S-180A" (trade name of Kao Corp.).

Among ammonium salts of sulfonic acid compounds with radical polymerizable unsaturated groups, there are preferred ammonium salts of sulfonic acid compounds having radical polymerizable unsaturated groups and polyoxyalkylene groups. Examples of commercial products of ammonium salts of sulfonic acid compounds with radical polymerizable unsaturated groups and polyoxyalkylene groups include "AQUALON KH-10" (trade name of Dai-ichi Kogyo Seiyaku Co., Ltd.), "LATEMUL PD-104" (trade name of Kao Corp.) and "ADEKA REASOAP SR-1025" (trade name of Adeka Corp.).

The emulsion polymerization is carried out by adding the surfactant to the reaction system, preferably at about 0.1 to about 15 mass %, more preferably at about 0.5 to about 10 mass % and even more preferably at about 1 to about 5 mass %, based on the total mass of all of the monomers.

Examples for the polymerization initiator include organic peroxides, such as benzoyl peroxide, octanoyl peroxide, lauroyl peroxide, stearoyl peroxide, cumene hydroperoxide, tert-butyl peroxide, di-tert-amyl peroxide, tert-butylperoxy-2-ethyl hexanoate, tert-butyl peroxylaurate, tert-butylperoxyisopropyl carbonate, tert-butyl peroxyacetate and diisopropylbenzene hydroperoxide; azo compounds, such as azobisisobutyronitrile, azobis(2,4-dimethylvaleronitrile), azobis(2-methylpropionitrile), azobis(2-methylbutyronitrile), 4,4'-azobis(4-cyanobutanoic acid), dimethylazobis(2-methyl propionate), azobis[2-methyl-N-(2-hydroxyethyl)-propionamide] and azobis{2-methyl-N-[2-(1-hydroxybutyl)]-propionamide}; persulfuric acid salts, such as potassium persulfate, ammonium persulfate and sodium persulfate, and any desired combinations of the foregoing. If desired, a reducing agent, such as a sugar, sodium formaldehyde sulfoxylate or an iron complex may be used with the polymerization initiator, for use as a redox initiator.

The emulsion polymerization is carried out by adding the polymerization initiator to the reaction system, preferably at about 0.1 to about 5 mass % and more preferably at about 0.2 to about 3 mass %, based on the total mass of all of the monomers. The polymerization initiator may be added according to its type and amount, without any particular restrictions. For example, the polymerization initiator may be added beforehand to the monomer mixture or aqueous medium, or the polymerization initiator may be added directly to the reaction system all at once during polymerization, or in a dropwise manner.

The core-shell type hydroxyl-containing acrylic resin aqueous dispersion ($A_{111}$) is obtained, for example, by adding a monomer mixture comprising a hydroxyl-containing polymerizable unsaturated monomer ($II_1$), a carboxyl group-containing polymerizable unsaturated monomer ($II_2$) and another polymerizable unsaturated monomer ($II_3$) to an emulsion of the core section copolymer (I), and conducting further polymerization to form the shell section copolymer (II).

The monomer mixture that is to form the shell section copolymer (II) may appropriately include components, such as polymerization initiators, chain transfer agents, reducing agents, surfactants and the like as desired. Also, although the monomer mixture may be added dropwise as is, preferably it is added dropwise as a monomer emulsion obtained by dispersing the monomer mixture in an aqueous medium. The particle diameter of the monomer emulsion is not particularly restricted.

The monomer mixture that is to form the shell section copolymer (II) is formed, for example, by adding the monomer mixture or its emulsion to the reaction system either all at once or in a slow dropwise fashion, and heating to a suitable temperature while stirring, as a method for forming the shell section copolymer (II) around the core section copolymer (I). The core-shell type hydroxyl-containing acrylic resin aqueous dispersion ($A_{111}$) obtained in this manner has a multilayer structure with a core section of a copolymer (I) of a polymerizable unsaturated monomer ($I_1$) with two or more polymerizable unsaturated groups in the molecule and a polymerizable unsaturated monomer ($I_2$) with one polymerizable unsaturated group in the molecule, and a shell section of a copolymer (II) of a hydroxyl-containing polymerizable unsaturated monomer ($II_2$), a carboxyl group-containing polymerizable unsaturated monomer ($II_2$) and another polymerizable unsaturated monomer ($II_3$).

Also, the core-shell type hydroxyl-containing acrylic resin aqueous dispersion ($A_{111}$) may, for example, comprise 3 or more layers, by adding a step of supplying a polymerizable unsaturated monomer that is to form another resin layer (a mixture of a single compound or a mixture of two or more compounds) for emulsion polymerization, between the step of obtaining the core section copolymer (I) and the step of obtaining the shell section copolymer (II).

As used herein, the "shell section" of the core-shell type hydroxyl-containing acrylic resin aqueous dispersion means the polymer layer present on the outermost layer of the resin particles, "core section" means the polymer layer on the inner layer of the resin particles excluding the shell section, and "core-shell type structure" means the structure comprising the core section and the shell section.

The core-shell type structure will generally be a layered structure with the core section totally covered by the shell section, but depending on the mass ratio of the core section and shell section, the amount of monomer of the shell section may be insufficient to form a layered structure. In such cases, it is not necessary for it to be a completely layered structure as described above, but instead it may be a structure wherein a portion of the core section is covered by the shell section. The concept of a multilayer structure in the core-shell type structure likewise applies when a multilayer structure is to be formed on the core section in the core-shell type hydroxyl-containing acrylic resin aqueous dispersion ($A_{111}$).

The core-shell type hydroxyl-containing acrylic resin aqueous dispersion ($A_{111}$) has a mean particle diameter in the range of generally about 10 to about 1,000 nm, preferably about 30 to about 500 nm and more preferably about 50 to about 200 nm.

The mean particle diameter of the core-shell type hydroxyl-containing acrylic resin aqueous dispersion ($A_{111}$) referred to throughout the present specification is the value measured using a submicron particle size distribution analyzer at 20° C., after dilution with deionized water by a common method. As an example of a submicron particle size distribution analyzer, there may be used a "COULTER N4" (trade name of Beckman Coulter, Inc.).

In order to improve the mechanical stability of the particles of the core-shell type hydroxyl-containing acrylic resin aqueous dispersion ($A_{111}$), the acidic groups, such as carboxyl groups of the core-shell type hydroxyl-containing acrylic resin aqueous dispersion ($A_{111}$) are preferably neutralized with a neutralizing agent. There are no particular restrictions on the neutralizing agent so long as it can neutralize the acidic groups, and examples include sodium hydroxide, potassium hydroxide, trimethylamine, 2-(dimethylamino)ethanol, 2-(diethylamino)ethanol, 2-(dibutylamino)ethanol, 2-amino-2-methyl-1-propanol, triethylamine, tributylamine, ammonia water and the like, as well as any desired combinations of the foregoing. The neutralizing agent is preferably used in an amount such that the pH of the core-shell type hydroxyl-containing acrylic resin aqueous dispersion ($A_{111}$) after neutralization is between about 6.5 and about 9.0.

[Hydroxyl-Containing Polyester Resin ($A_2$)]

The hydroxyl-containing polyester resin ($A_2$) can generally be produced by esterification reaction or transesterification reaction between an acid component and an alcohol component.

The acid component may be a compound that is generally used as an acid component for production of polyester resins. Examples for the acid component include aliphatic polybasic acids, alicyclic polybasic acids and aromatic polybasic acids, as well as their anhydrides and ester compounds.

Aliphatic polybasic acids and their anhydrides and ester compounds generally include aliphatic compounds with two or more carboxyl groups in the molecule, acid anhydrides of such aliphatic compounds and esterified forms of such aliphatic compounds, examples of which include aliphatic polybasic carboxylic acids, such as succinic acid, glutaric acid, adipic acid, pimelic acid, suberic acid, azelaic acid, sebacic acid, undecanedioic acid, dodecanedioic acid, brassylic acid, octadecanedioic acid, citric acid and butanetetracarboxylic acid; anhydrides of these aliphatic polybasic carboxylic acids; approximately C1-C4 lower alkyl esters of these aliphatic polybasic carboxylic acids, and any desired combinations of the foregoing.

The aliphatic polybasic acids and their anhydrides and ester compounds are most preferably adipic acid and/or adipic anhydride, from the viewpoint of smoothness of the coating film that is to be obtained.

These alicyclic polybasic acids and their anhydrides and ester compounds generally include compounds having one or more alicyclic structures and two or more carboxyl groups in the molecule, acid anhydrides of such compounds, and esters of such compounds. An alicyclic structure is mainly a 4- to 6-membered cyclic structure. Examples of alicyclic polybasic acids and their anhydrides and esters include alicyclic polybasic carboxylic acids, such as 1,2-cyclohexanedicarboxylic acid, 1,3-cyclohexanedicarboxylic acid, 1,4-cyclohexanedicarboxylic acid, 4-cyclohexene-1,2-dicarboxylic acid, 3-methyl-1,2-cyclohexanedicarboxylic acid, 4-methyl-1,2-cyclohexanedicarboxylic acid, 1,2,4-cyclohexanetricarboxylic acid and 1,3,5-cyclohexanetricarboxylic acid; anhydrides of these alicyclic polybasic carboxylic acids; and approximately C1-C4 lower alkyl esters of these alicyclic polybasic carboxylic acids, as well as any desired combinations of the foregoing.

From the viewpoint of smoothness of the coating film that is to be obtained, the alicyclic polybasic acids and their anhydrides and esters are preferably 1,2-cyclohexanedicarboxylic acid, 1,2-cyclohexanedicarboxylic anhydride, 1,3-cyclohexanedicarboxylic acid, 1,4-cyclohexanedicarboxylic acid, 4-cyclohexene-1,2-dicarboxylic acid and 4-cyclohexene-1,2-dicarboxylic anhydride, and more preferably 1,2-cyclohexanedicarboxylic acid and/or 1,2-cyclohexanedicarboxylic anhydride.

The aromatic polybasic acids and their anhydrides and esters are generally aromatic compounds with two or more carboxyl groups in the molecule, acid anhydrides of such aromatic compounds and esters of such aromatic compounds, examples of which include aromatic polybasic carboxylic acids such as phthalic acid, isophthalic acid, terephthalic acid, naphthalenedicarboxylic acid, 4,4'-biphenyldicarboxylic acid, trimellitic acid and pyromellitic acid; anhydrides of these aromatic polybasic carboxylic acids; approximately C1-C4 lower alkyl esters of these aromatic polybasic carboxylic acids, and any desired combinations of the foregoing.

Preferred as the aromatic polybasic acids and their anhydrides and esters are phthalic acid, phthalic anhydride, isophthalic acid, trimellitic acid and trimellitic anhydride.

Also, the acid component may be an acid component other than the aforementioned aliphatic polybasic acids, alicyclic polybasic acids and aromatic polybasic acids, examples including fatty acids, such as coconut fatty acid, cottonseed oil fatty acid, hempseed oil fatty acid, rice bran oil fatty acid, fish oil fatty acid, tall oil fatty acid, soybean oil fatty acid, linseed oil fatty acid, China wood oil fatty acid, rapeseed oil fatty acid, castor oil fatty acid, dehydrated castor oil fatty acid and safflower oil fatty acid; monocarboxylic acids, such as lauric acid, myristic acid, palmitic acid, stearic acid, oleic acid, linolic acid, linolenic acid, benzoic acid, p-tert-butylbenzoic acid, cyclohexanoic acid and 10-phenyloctadecanoic acid; and hydroxycarboxylic acids, such as lactic acid, 3-hydroxybutanoic acid and 3-hydroxy-4-ethoxybenzoic acid, as well as any desired combinations of the foregoing.

The alcohol component may be a polyhydric alcohol with two or more hydroxyl groups in the molecule, examples of which include dihydric alcohols, such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 2-methyl-1,3-propanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentyl glycol, 1,4-cyclohexanedimethanol, tricyclodecanedimethanol, hydroxypivalic acid neopentyl glycol ester, hydrogenated bisphenol A, hydrogenated bisphenol F and dimethylolpropionic acid; polylactonediols with lactone compounds, such as ε-caprolactone added to the aforementioned dihydric alcohols; ester diol compounds, such as bis(hydroxyethyl) terephthalate; polyether diol compounds, such as bisphenol A alkylene oxide addition products, polyethylene glycol, polypropylene glycol and polybutylene glycol; trihydric and greater alcohols, such as glycerin, trimethylolethane, trimethylolpropane, diglycerin, triglycerin, 1,2,6-hexanetriol, pentaerythritol, dipentaerythritol, tris(2-hydroxyethyl)isocyanuric acid, sorbitol and mannitol; polylactone polyol compounds with lactone compounds, such as ε-caprolactone added to the aforementioned trihydric and greater alcohols; and fatty acid esterified glycerin.

The alcohol component may also be an alcohol component other than the aforementioned polyhydric alcohols, examples of which include monoalcohols, such as methanol, ethanol, propyl alcohol, butyl alcohol, stearyl alcohol and 2-phenoxyethanol; and alcohol compounds obtained by reacting acids with monoepoxy compounds, such as propylene oxide, butylene oxide, "CARDURA E10" (trade name of HEXION Specialty Chemicals, glycidyl ester of synthetic highly-branched saturated fatty acid), and the like.

The hydroxyl-containing polyester resin ($A_2$) may be produced by a common method without any particular restrictions. For example, the acid component and the alcohol component may be heated in a nitrogen stream at about 150° C. to about 250° C. for about 5 to about 10 hours for esterification reaction or transesterification reaction between the acid component and the alcohol component, to produce the hydroxyl-containing polyester resin ($A_2$).

When the acid component and alcohol component are subjected to esterification reaction or transesterification reaction, they may be added all at once to the reactor, or one or both may be added in separate portions. After the hydroxyl-containing polyester resin has been synthesized, an acid anhydride may be reacted with the obtained hydroxyl-containing polyester resin for half-esterification, to produce a carboxyl- and hydroxyl-containing polyester resin. Also, after the carboxyl group-containing polyester resin has been synthesized, the alcohol component may be added to the carboxyl group-containing polyester resin to produce the hydroxyl-containing polyester resin ($A_2$).

During the esterification or transesterification reaction, a known catalyst, such as dibutyltin oxide, antimony trioxide, zinc acetate, manganese acetate, cobalt acetate, calcium acetate, lead acetate, tetrabutyl titanate or tetraisopropyl titanate may be added to the reaction system as a catalyst to accelerate the reaction.

Also, the hydroxyl-containing polyester resin ($A_2$) may be one that has been modified with a fatty acid, monoepoxy compound, polyisocyanate compound or the like either during or after preparation of the resin.

Examples for the fatty acid include coconut fatty acid, cottonseed oil fatty acid, hempseed oil fatty acid, rice bran oil fatty acid, fish oil fatty acid, tall oil fatty acid, soybean oil fatty acid, linseed oil fatty acid, China wood oil fatty acid, rapeseed oil fatty acid, castor oil fatty acid, dehydrated castor oil fatty acid and safflower oil fatty acid, and a preferred example for the monoepoxy compound is "CARDURA E10" (trade name of HEXION Specialty Chemicals, glycidyl ester of synthetic highly-branched saturated fatty acid).

Examples for the polyisocyanate compound include aliphatic diisocyanate compounds, such as lysine diisocyanate, hexamethylene diisocyanate and trimethylhexane diisocyanate; alicyclic diisocyanate compounds, such as hydrogenated xylylene diisocyanate, isophorone diisocyanate, methylcyclohexane-2,4-diisocyanate, methylcyclohexane-2,6-diisocyanate, 4,4'-methylenebis(cyclohexyl isocyanate) and 1,3-(isocyanatomethyl)cyclohexane; aromatic diisocyanate compounds, such as tolylene diisocyanate, xylylene diisocyanate and diphenylmethane diisocyanate; organic polyisocyanates including trivalent and greater polyisocyanates, such as lysine triisocyanate; addition products of the aforementioned organic polyisocyanates with polyhydric alcohols, low molecular weight polyester resins, water or the like; cyclized polymers formed between the aforementioned organic polyisocyanates (for example, isocyanurates), biuret-type addition products, and any desired combinations of the foregoing.

Also, from the viewpoint of improving the smoothness and water resistance of the coating film that is to be obtained, the content of the alicyclic polybasic acid among the acid components of the starting material for the hydroxyl-containing polyester resin ($A_2$) is preferably about 20 to about 100 mol %, more preferably about 25 to about 95 mol % and even more preferably about 30 to about 90 mol %, based on the total amount of the acid components. Most preferably, the alicyclic polybasic acid is 1,2-cyclohexanedicarboxylic acid and/or 1,2-cyclohexanedicarboxylic anhydride, from the viewpoint of improving the smoothness of the coating film that is to be obtained.

The hydroxyl-containing polyester resin ($A_2$) has a hydroxyl value of preferably about 1 to about 200 mgKOH/g, more preferably about 5 to about 150 mgKOH/g and even more preferably about 10 to about 100 mgKOH/g.

In cases where the hydroxyl-containing polyester resin ($A_2$) has a carboxyl group, the hydroxyl-containing polyester resin ($A_2$) has an acid value of preferably about 0.1 to about 55 mgKOH/g, more preferably about 3 to about 50 mgKOH/g and even more preferably about 7 to about 45 mgKOH/g.

Also, the hydroxyl-containing polyester resin ($A_2$) has a number-average molecular weight of preferably about 500 to about 50,000, more preferably about 1,000 to about 30,000 and even more preferably about 1,200 to about 10,000.

As used herein, "number-average molecular weight" and "weight-average molecular weight" are the values determined by converting the retention time (retention volume) using gel permeation chromatography (GPC) to polystyrene molecular weight based on the retention time (retention volume) for standard polystyrene of known molecular weight. measured under the same conditions. Specifically, it may be measured using "HLC-8120GPC" (trade name of Tosoh Corp.) as the gel permeation chromatograph, using 4 columns, a "TSKgel G4000HXL", "TSKgel G3000HXL", "TSKgel G2500HXL" and "TSKgel G2000HXL" (all trade names of Tosoh Corp.) as the columns, and using a differential refractometer as the detector, under the conditions of mobile phase: tetrahydrofuran, measuring temperature: 40° C., flow rate: 1 mL/min.

[Hydroxyl-Containing Polyurethane Resin $A_3$)]

Examples for the hydroxyl-containing polyurethane resin ($A_3$) include resins produced by reacting at least one diisocyanate compound selected from the group consisting of aliphatic diisocyanate compounds, alicyclic diisocyanate compounds and aromatic diisocyanate compounds with at least one polyol compound selected from the group consisting of polyether polyols, polyester polyols and polycarbonate polyols.

Specifically, the hydroxyl-containing polyurethane resin ($A_3$) can be produced in the following manner.

For example, a urethane prepolymer is produced by reacting at least one diisocyanate selected from the group consisting of aliphatic diisocyanates and alicyclic diisocyanates, at least one diol selected from the group consisting of polyether diols, polyester diols and polycarbonate diols, a low-molecular-weight polyhydroxy compound and a dimethylolalkanoic acid. A self-emulsifiable hydroxyl-containing polyurethane resin ($A_3$) having a mean particle size of about 0.001 to about 3 μm can be obtained by neutralizing the urethane prepolymer with a tertiary amine and forming an emulsified dispersion of the neutralized product in water, and then optionally mixing it with an aqueous medium containing a chain extension agent, such as a polyamine, a crosslinking agent, a terminator or the like, and reacting until the isocyanate groups substantially disappear.

[Blocked Polyisocyanate Compound (B)]

The blocked polyisocyanate compound (B) has at least one blocked isocyanate group selected from the group consisting of blocked isocyanate groups represented by the following formula (I):

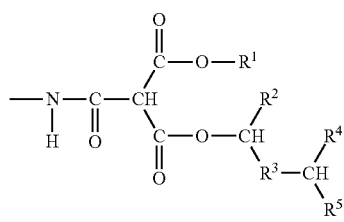

wherein $R^1$, $R^2$, $R^4$ and $R^5$ independently represent an approximately C1-C12 hydrocarbon group and $R^3$ represents an approximately C1-C12 straight-chain or branched alkylene group, blocked isocyanate groups represented by the following formula (II):

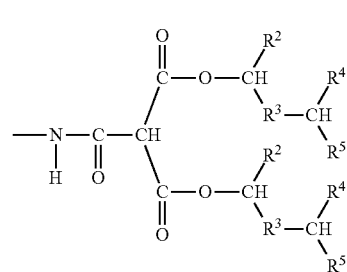

wherein $R^2$, $R^3$, $R^4$ and $R^5$ have the same definitions as above, and blocked isocyanate groups represented by the following formula (III):

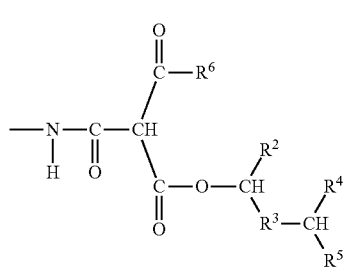

wherein $R^2$, $R^3$, $R^4$ and $R^5$ have the same definitions as above, and $R^6$ represents an approximately C1-C12 hydrocarbon group.

The blocked polyisocyanate compound (B) can be obtained, for example, by means of reacting an active methylene compound ($b_2$) with the isocyanate groups of a polyisocyanate compound ($b_1$) that has two or more isocyanate groups in the molecule, to obtain a blocked polyisocyanate compound precursor ($b_3$), and then reacting the blocked polyisocyanate compound precursor ($b_3$) with a secondary alcohol ($b_4$), or means of reacting the reaction product of an active methylene compound ($b_2$) and a secondary alcohol ($b_4$) with the isocyanate groups of a polyisocyanate compound ($b_1$), with the former means being preferred.

[Polyisocyanate Compound ($b_1$)]

The polyisocyanate compound ($b_1$) is a compound with at least two isocyanate groups in the molecule, and examples include aliphatic polyisocyanates, alicyclic polyisocyanates, aromatic/aliphatic polyisocyanates, aromatic polyisocyanates, and their derivatives, as well as any desired combinations of the foregoing.

Examples of aliphatic polyisocyanates include aliphatic diisocyanates, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate and methyl 2,6-diisocyanatohexanoate (common name: lysine diisocyanate); and aliphatic triisocyanates, such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane and 2,5,7-trimethyl-1,8-diisocyanato-5-isocyanatomethyloctane.

Examples of alicyclic polyisocyanates include alicyclic diisocyanates, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl)cyclohexane (common name: hydrogenated xylylene diisocyanate) or mixtures thereof, methylenebis(4,1-cyclohexanediyl)diisocyanate (common name: hydrogenated MDI) and norbornane diisocyanate; and alicyclic triisocyanates, such as 1,3,5-triisocyanatocyclohexane, 1,3,5-trimethyl-isocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)-heptane and 6-(2-isocyanatoethyl)-2-isocyanatomethyl-2-(3-isocyanatopropyl)-bicyclo(2.2.1)heptane.

Examples of aromatic/aliphatic polyisocyanates include aromatic/aliphatic diisocyanates, such as methylenebis(4,1-phenylene)diisocyanate (common name: MDI), 1,3- or 1,4-xylylene diisocyanate or mixtures thereof, ω,ω'-diisocyanato-1,4-diethylbenzene and 1,3- or 1,4-bis(1-isocyanato-1-methylethyl)benzene (common name: tetramethylxylylene diisocyanate) or mixtures thereof; and aromatic/aliphatic triisocyanates, such as 1,3,5-triisocyanatomethylbenzene.

Examples of aromatic polyisocyanates include aromatic diisocyanates, such as m-phenylene diisocyanate, p-phenylene diisocyanate, 4,4'-diphenyl diisocyanate, 1,5-naphthalene diisocyanate, 2,4-tolylene diisocyanate (common name: 2,4-TDI) or 2,6-tolylene diisocyanate (common name: 2,6-TDI), or mixtures thereof, 4,4'-toluidine diisocyanate and 4,4'-diphenyl ether diisocyanate; aromatic triisocyanates, such as triphenylmethane-4,4',4''-triisocyanate, 1,3,5-triisocyanatobenzene and 2,4,6-triisocyanatotoluene; and aromatic tetraisocyanates, such as 4,4'-diphenylmethane-2,2',5,5'-tetraisocyanate.

Examples of the aforementioned derivatives include the aforementioned polyisocyanate dimers, trimers, biurets, allophanates, urethodiones, urethoimines, isocyanurates, oxadiazinetriones and the like, as well as polymethylenepolyphenyl polyisocyanate (crude MDI, polymeric MDI) and crude TDI.

As the polyisocyanate compound ($b_1$) there are preferred aliphatic diisocyanates, alicyclic diisocyanates, and their derivatives, to render the obtained blocked polyisocyanate compound (B) resistant to yellowing during heating. As the polyisocyanate compound ($b_1$) there are more preferred aliphatic diisocyanates and their derivatives, from the viewpoint of increasing the flexibility of the coating film that is formed.

The polyisocyanate compound ($b_1$) includes prepolymers produced by reacting aliphatic polyisocyanates, alicyclic polyisocyanates, aromatic/aliphatic polyisocyanates, aromatic polyisocyanates, and their derivatives, as well as any desired combinations of the foregoing, with compounds that can react with such polyisocyanates, under conditions with an excess of isocyanate groups. Examples of compounds that can react with the aforementioned polyisocyanates include compounds with active hydrogen groups, such as hydroxyl and amino, and specific examples include polyhydric alcohols, low molecular weight polyester resins, amines, water and the like.

Also, the polyisocyanate compound ($b_1$) includes polymers of isocyanate group-containing polymerizable unsaturated monomers, or copolymers of such isocyanate group-containing polymerizable unsaturated monomers and polymerizable unsaturated monomers other than the isocyanate group-containing polymerizable unsaturated monomers.

The polyisocyanate compound ($b_1$) has a number-average molecular weight in the range of preferably about 300 to about 20,000, more preferably about 400 to about 8,000 and even more preferably about 500 to about 2,000, from the viewpoint of reactivity of the blocked polyisocyanate compound (B) that is to be obtained and compatibility between the blocked polyisocyanate compound (B) and the other components in the coating composition.

The polyisocyanate compound ($b_1$) also preferably has a mean number of isocyanate functional groups in the molecule in the range of about 2 to about 100, from the viewpoint of reactivity of the blocked polyisocyanate compound (B) that is to be obtained and compatibility between the blocked polyisocyanate compound (B) and the other components in the coating composition. The mean number of isocyanate functional groups is more preferably at least 3 or greater from the viewpoint of increasing the reactivity of the blocked polyisocyanate compound (B) that is to be obtained. The mean number of isocyanate functional groups is also more preferably no greater than 20 from the viewpoint of preventing gelling during production of the blocked polyisocyanate compound (B).

[Active Methylene Compound ($b_2$)]

Examples for the active methylene compound ($b_2$) that blocks the isocyanate groups in the polyisocyanate compound ($b_1$) include malonic acid diesters, such as dimethyl malonate, diethyl malonate, di-n-propyl malonate, diisopropyl malonate, di-n-butyl malonate, diisobutyl malonate, di-sec-butyl malonate, di-tert-butyl malonate, di-n-pentyl malonate, di-n-hexyl malonate, di(2-ethylhexyl) malonate, methyl-isopropyl malonate, ethyl-isopropyl malonate, methyl-n-butyl malonate, ethyl-n-butyl malonate, methyl-isobutyl malonate, ethyl-isobutyl malonate, methyl-sec-butyl malonate, ethyl-sec-butyl malonate, diphenyl malonate and dibenzyl malonate, acetoacetic acid esters, such as methyl acetoacetate, ethyl acetoacetate, n-propyl acetoacetate, isopropyl acetoacetate, n-butyl acetoacetate, isobutyl acetoacetate, sec-butyl acetoacetate, tert-butyl acetoacetate, n-pentyl acetoacetate, n-hexyl acetoacetate, 2-ethylhexyl acetoacetate, phenyl acetoacetate and benzyl acetoacetate, isobutyrylacetic acid esters, such as methyl isobutyrylacetate, ethyl isobutyrylacetate, n-propyl isobutyrylacetate, isopropyl isobutyrylacetate, n-butyl isobutyrylacetate, isobutyl isobutyrylacetate, sec-butyl isobutyrylacetate, tert-butyl isobutyrylacetate, n-pentyl isobutyrylacetate, n-hexyl isobutyrylacetate, 2-ethylhexyl isobutyrylacetate, phenyl isobutyrylacetate and benzyl isobutyrylacetate, and any desired combinations of the foregoing.

The active methylene compound ($b_2$) is preferably at least one compound selected from the group consisting of dimethyl malonate, diethyl malonate, diisopropyl malonate, methyl acetoacetate, ethyl acetoacetate, methyl isobutyrylacetate and ethyl isobutyrylacetate, and more preferably at least one compound selected from the group consisting of diisopropyl malonate, methyl isobutyrylacetate and ethyl isobutyrylacetate, from the viewpoint of smoothness and distinctness of image of the multilayer coating film that is to be formed.

The active methylene compound ($b_2$) is even more preferably diisopropyl malonate, from the viewpoint of the smoothness and distinctness of image of the multilayer coating film that is to be formed, the reactivity of the blocked polyisocyanate compound (B) that is to be obtained and the storage stability of the aqueous colored coating composition ($Y_1$).

The blocking reaction of isocyanate groups by the active methylene compound ($b_2$) may include a reaction catalyst if desired. Examples for the reaction catalyst include basic compounds, such as metal hydroxides, metal alkoxides, metal carboxylates, metal acetylacetonates, onium salt hydroxides, onium carboxylates, metal salts of active methylene compounds, onium salts of active methylene compounds, aminosilanes, amines, phosphines, and the like. Preferred as onium salts are ammonium salts, phosphonium salts and sulfonium salts.

The amount of reaction catalyst is generally preferred to be in the range of about 10 to about 10,000 ppm and more preferably in the range of about 20 to about 5,000 ppm, based on the total solid mass of the polyisocyanate compound ($b_1$) and the active methylene compound ($b_2$).

The blocking reaction of isocyanate groups by the active methylene compound ($b_2$) may be conducted at between about 0 and about 150° C., and a solvent may be included. The solvent is preferably an aprotic solvent, with solvents, such as esters, ethers, N-alkylamides and ketones being especially preferred. As the reaction progresses, an acid component may be added to the reaction system to neutralize the basic compound catalyst, thereby suspending the blocking reaction.

There are no particular restrictions on the amount of the active methylene compound ($b_2$) in the blocking reaction of the isocyanate groups by the active methylene compound ($b_2$), but preferably it is about 0.1 to about 3 mol and more preferably about 0.2 to about 2 mol, with respect to 1 mol of isocyanate groups in the polyisocyanate compound ($b_1$). Also, the active methylene compounds that have not reacted with isocyanate groups in the polyisocyanate compound ($b_1$) may be removed after completion of the blocking reaction.

Also, in the blocking reaction of the isocyanate groups by the active methylene compound ($b_2$), there may be added an alcohol-based, phenol-based, oxime-based, amine-based, acid amide-based, imidazole-based, pyridine-based or mercaptane-based blocking agent in addition to the active methylene compound ($b_2$).

Thus, the blocked polyisocyanate compound (B) includes those wherein some of the isocyanate groups are blocked by a blocking agent other than the active methylene compound ($b_2$).

Some of the isocyanate groups in the polyisocyanate compound ($b_1$) may also be reacted with an active hydrogen-containing compound. By reacting some of the isocyanate groups in the polyisocyanate compound ($b_1$) with an active hydrogen-containing compound, it is possible to improve the storage stability of the blocked polyisocyanate compound (B) that is obtained, to modify the compatibility between the blocked polyisocyanate compound (B) and the other components in the coating composition, and increase flexibility of the coating film that is to be formed.

When some of the isocyanate groups in the polyisocyanate compound ($b_1$) are to be reacted with the active hydrogen-containing compound, the order of reacting the polyisocyanate compound ($b_1$), active methylene compound ($b_2$) and active hydrogen-containing compound is not particularly restricted.

Specifically, there may be mentioned (i) a method of blocking some of the isocyanate groups in a polyisocyanate compound ($b_1$) with an active methylene compound ($b_2$), and then reacting an active hydrogen-containing compound with the remaining isocyanate groups, (ii) a method of reacting an active hydrogen-containing compound with some of the isocyanate groups in a polyisocyanate compound ($b_1$) and then blocking the remaining isocyanate groups with an active methylene compound ($b_2$), and (iii) a method of simultaneously reacting an active hydrogen-containing compound and an active methylene compound ($b_2$) with the isocyanate groups in a polyisocyanate compound ($b_1$).

Examples for the active hydrogen-containing compound include hydroxyl-containing compounds and amino group-containing compounds.

Examples of hydroxyl-containing compounds include propanol, butanol, pentanol, hexanol, heptanol, 2-ethyl-1-hexanol, octanol, nonanol, decanol, tridecanol, stearyl alcohol, ethylene glycol, propylene glycol, polyethylene glycol, polypropylene glycol, polyethylene glycol, (propylene glycol), polyethylene glycol monoalkyl ethers, polypropylene glycol monoalkyl ethers, polyethylene glycol (propylene glycol)monoalkyl ethers and trimethylolpropane, as well as any desired combinations of the foregoing.

As used herein, "polyethylene glycol (propylene glycol)" means a copolymer of ethylene glycol and propylene glycol, and it includes their block copolymers and random copolymers.

The hydroxyl-containing compound is preferably a monovalent alcohol from the viewpoint of minimizing viscosity increase of the blocked polyisocyanate compound (B) that is to be obtained. Examples for the monovalent alcohol include propanol, butanol, pentanol, hexanol, heptanol, 2-ethyl-1-hexanol, octanol, nonanol, decanol, tridecanol, stearyl alcohol, polyethylene glycol monoalkyl ethers, polypropylene glycol monoalkyl ethers and polyethylene glycol(propylene glycol) monoalkyl ethers, as well as any desired combinations of the foregoing.

Examples for the amino group-containing compound include butylamine, octylamine, stearylamine, dibutylamine, dioctylamine, dicyclohexylamine, dilaurylamine, α-(aminoalkyl)-ω-alkoxypolyoxyethylene (oxypropylene)s, hexamethylenediamine, diethylenetriamine and polyoxypropylene-α,ω-diamine (examples of commercial products including "JEFFAMINE D-400" by Huntsman Corp.), as well as any desired combinations of the foregoing.

The amino group-containing compound is preferably a monovalent amine from the viewpoint of minimizing viscosity increase of the blocked polyisocyanate compound (B) that is to be obtained. Examples for the monovalent amine include butylamine, octylamine, stearylamine, dibutylamine, dioctylamine, dicyclohexylamine, dilaurylamine and α-(aminoalkyl)-ω-alkoxypolyoxyethylene(oxypropylene)s, as well as any desired combinations of the foregoing.

When the active hydrogen-containing compound is to be reacted with some of the isocyanate groups in the polyisocyanate compound ($b_1$), the proportion of the polyisocyanate compound ($b_1$) and the active hydrogen-containing compound is preferably such that the number of moles of active hydrogen in the active hydrogen-containing compound is in the range of about 0.03 to about 0.6 mol based on 1 mol of isocyanate groups in the polyisocyanate compound ($b_1$), from the viewpoint of storage stability and curability of the aqueous colored coating composition ($Y_1$), and smoothness, distinctness of image and water resistance of the multilayer coating film that is to be formed.

This proportion is more preferably no greater than about 0.4 and even more preferably no greater than about 0.3 from the viewpoint of curability of the aqueous colored coating composition ($Y_1$) and water resistance of the multilayer coating film that is to be formed.

The proportion is also more preferably about 0.04 or greater and more preferably about 0.05 or greater from the viewpoint of storage stability of the aqueous colored coating composition ($Y_1$) and smoothness and distinctness of image of the multilayer coating film that is to be formed.

Also, the blocked polyisocyanate compound (B) is preferably a blocked polyisocyanate compound (B') with hydrophilic groups, from the viewpoint of storage stability and curability of the aqueous colored coating composition ($Y_1$) and smoothness and distinctness of image of the multilayer coating film that is to be formed.

The blocked polyisocyanate compound (B') with hydrophilic groups may be obtained, for example, using an active hydrogen-containing compound with hydrophilic groups as the active hydrogen-containing compound.

The active hydrogen-containing compound having a hydrophilic group may be an active hydrogen-containing compound with a nonionic hydrophilic group, an active hydrogen-containing compound with an anionic hydrophilic group, an active hydrogen-containing compound with a cationic hydrophilic group, or the like, as well as any desired combination of these. The active hydrogen-containing compound having a hydrophilic group is preferably an active hydrogen-containing compound having a nonionic hydrophilic group, in order to minimize inhibition of the reaction of blocking the isocyanate groups in the polyisocyanate compound ($b_1$) with the active methylene compound ($b_2$).

Examples of active hydrogen-containing compounds having nonionic hydrophilic groups include active hydrogen-containing compounds having polyoxyalkylene groups. Examples for the polyoxyalkylene group include polyoxyethylene, polyoxypropylene, polyoxyethyleneoxypropylene, and any desired combinations of the foregoing. The active hydrogen-containing compound having a nonionic hydrophilic group preferably has a polyoxyethylene group, from the viewpoint of storage stability of the aqueous colored coating composition ($Y_1$).

The active hydrogen-containing compound having a polyoxyethylene group has about 3 or more, preferably about 5 to about 100 and even more preferably about 8 to about 45 contiguous oxyethylenes, or in other words it has polyoxyethylene blocks, from the viewpoint of storage stability of the aqueous colored coating composition ($Y_1$) and water resistance of the multilayer coating film that is to be formed.

The active hydrogen-containing compound having a polyoxyethylene group may also contain oxyalkylene groups other than oxyethylene groups, in addition to the polyoxyethylene blocks. Examples of oxyalkylene groups other than the oxyethylene groups include oxypropylene, oxybutylene and oxystyrene.

The molar ratio of oxyethylene groups among the oxyalkylene groups in the active hydrogen-containing compound having polyoxyethylene groups is preferably in the range of about 20 to about 100 mol % and more preferably in the range of about 50 to about 100 mol %, from the viewpoint of storage stability of the aqueous colored coating composition ($Y_1$). If the molar ratio of oxyethylene groups among the oxyalkylene groups is less than about 20 mol %, the hydrophilicity of the aqueous colored coating composition ($Y_1$) may be inadequate, and its storage stability may be reduced.

Also, the active hydrogen-containing compound having a nonionic hydrophilic group preferably has a number-average molecular weight in the range of about 200 to about 2,000, from the viewpoint of the storage stability of the aqueous colored coating composition ($Y_1$) and the water resistance of the multilayer coating film that is to be formed. The number-average molecular weight is preferably about 300 or greater and even more preferably about 400 or greater from the viewpoint of the storage stability of the aqueous colored coating composition ($Y_1$). The number-average molecular weight is also more preferably no greater than about 1,500 and even more preferably no greater than about 1,200 from the viewpoint of the water resistance of the multilayer coating film that is to be formed.

Examples of active hydrogen-containing compounds having nonionic hydrophilic groups include polyethylene glycol monoalkyl ethers (alternate name: ω-alkoxypolyoxyethylenes), such as polyethylene glycol monomethyl ether and polyethylene glycol monoethyl ether, polypropylene glycol monoalkyl ethers (alternate name: ω-alkoxypolyoxypropylenes), such as polypropylene glycol monomethyl ether and polypropylene glycol monoethyl ether, ω-alkoxypolyoxyethylene(oxypropylene)s, such as ω-methoxypolyoxyethylene(oxypropylene) and ω-ethoxypolyoxyethylene(oxypropylene), polyethyleneglycol (propylene glycol) monoalkyl ethers, such as polyethyleneglycol(propylene glycol) monomethyl ether and polyethylene glycol (propylene glycol) monoethyl ether, and polyethylene glycol, polypropylene glycol, polyethylene glycol(propylene glycol), α-(aminoalkyl)-ω-alkoxypolyoxyethylene, α-(aminoalkyl)-ω-alkoxypolyoxypropylene, α-(aminoalkyl)-ω-alkoxypolyoxyethylene and the like, as well as any desired combinations of the foregoing.

Preferred for the active hydrogen-containing compound having a nonionic hydrophilic group are polyethylene glycol monomethyl ether, polyethylene glycol monoethyl ether and polyethylene glycol, with polyethylene glycol monomethyl ether being more preferred.

Examples of commercial products of polyethylene glycol monomethyl ether include "UNIOX M-400", "UNIOX M-550", "UNIOX M-1000" and "UNIOX M-2000" by NOF Corp. Also, examples of commercial products of polyethylene glycol include "PEG#200", "PEG#300", "PEG#400", "PEG#600", "PEG#1000", "PEG#1500", "PEG#1540" and "PEG#2000" by NOF Corp.

Examples of active hydrogen-containing compounds having anionic hydrophilic groups include active hydrogen-containing compounds having acidic groups, for example, active hydrogen-containing compounds having carboxyl groups, active hydrogen-containing compounds having sulfonic acid groups and active hydrogen-containing compounds having phosphate groups, as well as their neutralized salts, and any desired combinations of the foregoing. The active hydrogen-containing compound having an anionic hydrophilic group is preferably an active hydrogen-containing compound having a carboxyl group, from the viewpoint of compatibility between the blocked polyisocyanate compound (B) that is to be obtained and the other components in the coating composition.

Some or all of the acidic groups in the active hydrogen-containing compound having an anionic hydrophilic group are preferably neutralized with a basic compound, in order to minimize inhibition of the reaction of blocking the isocyanate groups in the polyisocyanate compound (b$_1$) with the active methylene compound (b$_2$).

The acidic groups in the active hydrogen-containing compound having an anionic hydrophilic group may be neutralized before reaction between the active hydrogen-containing compound having an anionic hydrophilic group and the polyisocyanate compound (b$_1$), or they may be neutralized after their reaction.

Examples of basic compounds include hydroxides of alkali metals or alkaline earth metals, such as sodium hydroxide, potassium hydroxide, lithium hydroxide, calcium hydroxide and barium hydroxide; metal alkoxides; ammonia; primary monoamines, such as ethylamine, propylamine, butylamine, benzylamine, monoethanolamine, 2,2-dimethyl-3-amino-1-propanol, 2-aminopropanol, 2-amino-2-methyl-1-propanol and 3-aminopropanol; secondary monoamines, such as diethylamine, diethanolamine, di-n-propanolamine, di-isopropanolamine, N-methylethanolamine and N-ethylethanolamine; tertiary monoamines, such as dimethylethanolamine, trimethylamine, triethylamine, triisopropylamine, methyldiethanolamine and 2-(dimethylamino)ethanol; and polyamines, such as diethylenetriamine, hydroxyethylaminoethylamine, ethylaminoethylamine and methylaminopropylamine, as well as any desired combinations of the foregoing. The amount of the basic compound will generally be in the range of about 0.1 to about 1.5 equivalents and preferably about 0.2 to about 1.2 equivalents with respect to the anionic groups in the active hydrogen-containing compound having the anionic hydrophilic group.

Examples of active hydrogen-containing compounds having carboxyl groups include monohydroxycarboxylic acids, such as glycolic acid, lactic acid, hydroxypivalic acid, malic acid and citric acid, dihydroxycarboxylic acids, such as 2,2-dimethylolacetic acid, 2,2-dimethylollactic acid, 2,2-dimethylolpropionic acid, 2,2-dimethylolbutanoic acid, dimethylolheptanoic acid, dimethylolnonanoic acid, 2,2-dimethylolbutyric acid and 2,2-dimethylolvaleric acid, lactone ring-opening addition products of these dihydroxycarboxylic acids, glycine, 1-carboxy-1,5-pentylenediamine, dihydroxybenzoic acid, 3,5-diaminobenzoic acid, lysine, arginine, and the like.

Examples of active hydrogen-containing compounds having sulfonic acid groups include 2-amino-1-ethanesulfonic acid, N,N-bis(2-hydroxyethyl)-2-aminoethanesulfonic acid, 1,3-phenylenediamine-4,6-disulfonic acid, diaminobutanesulfonic acid, 3,6-diamino-2-toluenesulfonic acid, 2,4-diamino-5-toluenesulfonic acid, 2-(cyclohexylamino)-ethanesulfonic acid and 3-(cyclohexylamino)-propanesulfonic acid.

Examples of active hydrogen-containing compounds having phosphate groups include 2,3-dihydroxypropylphenyl phosphate, hydroxyalkylphosphonic acids and aminoalkylphosphonic acids.

When the active hydrogen-containing compound having a hydrophilic group is to be reacted with some of the isocyanate groups in the polyisocyanate compound (b$_1$), the proportion of the polyisocyanate compound (b$_1$) and the active hydrogen-containing compound having a hydrophilic group is preferably such that the number of moles of active hydrogen in the active hydrogen-containing compound is in the range of about 0.03 to about 0.6 mol based on 1 mol of isocyanate groups in the polyisocyanate compound (b$_1$), from the viewpoint of storage stability and curability of the aqueous colored coating composition (Y$_1$), and smoothness, distinctness of image and water resistance of the multilayer coating film that is to be formed.

This proportion is more preferably no greater than about 0.4 and even more preferably no greater than about 0.3 from the viewpoint of curability of the aqueous colored coating composition (Y$_1$) and water resistance of the multilayer coating film that is to be formed.

The proportion is also more preferably about 0.04 or greater and more preferably about 0.05 or greater from the viewpoint of storage stability of the aqueous colored coating composition (Y$_1$) and smoothness and distinctness of image of the multilayer coating film that is to be formed.

The blocked polyisocyanate compound (B) may also be added as a mixture with a surfactant, for production of the aqueous colored coating composition (Y$_1$). The surfactant is preferably a nonionic surfactant and/or anionic surfactant, from the viewpoint of stability of the aqueous colored coating composition (Y$_1$).

[Blocked Polyisocyanate Compound Precursor (b$_3$)]

The blocked polyisocyanate compound precursor (b$_3$) is a compound in which some or all of the isocyanate groups in a polyisocyanate compound (b$_1$) are blocked with an active methylene compound (b$_2$), and that can be formed by reacting the polyisocyanate compound (b$_1$) having two or more isocyanate groups in the molecule with the active methylene compound (b$_2$).

The blocked polyisocyanate compound precursor (b$_3$) is preferably either or both a blocked polyisocyanate compound precursor (b$_{31}$) having a blocked isocyanate group represented by the following formula (IV):

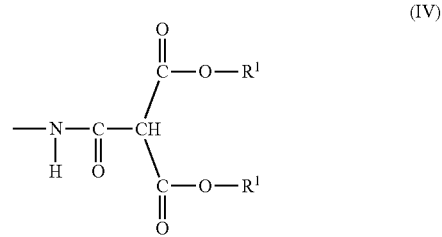

(IV)

wherein each R$^1$ independently represents an approximately C1-C12 hydrocarbon group, and each R$^1$ may be the same or different, and a blocked polyisocyanate compound precursor (b$_{32}$) having a blocked isocyanate group represented by the following formula (V):

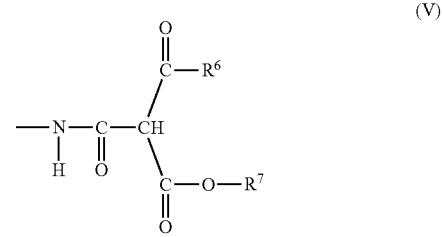

(V)

wherein R$^6$ and R$^7$ each independently represent an approximately C1-C12 hydrocarbon group.

[Blocked Polyisocyanate Compound Precursor (b$_{31}$)]

The blocked polyisocyanate compound precursor (b$_{31}$) is preferably one wherein R$^1$ is an approximately C1-C3 alkyl group, from the viewpoint of allowing use of an active methylene compound that can be produced or obtained relatively easily as the active methylene compound (b$_2$), which is one of the starting materials for the blocked polyisocyanate compound (B).

From the viewpoint of improving compatibility between the blocked polyisocyanate compound (B) that is to be obtained and the other components in the coating composition, $R^1$ is more preferably a C2 or C3 alkyl group, and from the viewpoint of storage stability of the aqueous colored coating composition ($Y_1$), and the smoothness and distinctness of image of the multilayer coating film that is to be formed, $R^1$ is more preferably an isopropyl group.

The blocked polyisocyanate compound precursor ($b_{31}$) may be obtained, for example, by reacting a polyisocyanate compound ($b_1$) with a dialkyl malonate having an approximately C1-C12 hydrocarbon group.

Examples of dialkyl malonates include dimethyl malonate, diethyl malonate, di-n-propyl malonate, diisopropyl malonate, di-n-butyl malonate, diisobutyl malonate, di-sec-butyl malonate, di-tert-butyl malonate, di-n-pentyl malonate, di-n-hexyl malonate and di(2-ethylhexyl) malonate, as well as any desired combinations of the foregoing. The dialkyl malonate is preferably dimethyl malonate, diethyl malonate, di-n-propyl malonate, diisopropyl malonate, di-n-butyl malonate, diisobutyl malonate, di-sec-butyl malonate or di-tert-butyl malonate, more preferably diethyl malonate, di-n-propyl malonate or diisopropyl malonate, and even more preferably diisopropyl malonate.

[Blocked Polyisocyanate Compound Precursor ($b_{32}$)]

The blocked polyisocyanate compound precursor ($b_{32}$) is preferably one wherein $R^6$ and $R^7$ are approximately C1-C3 alkyl groups, from the viewpoint of allowing use of an active methylene compound that can be produced or obtained relatively easily as the active methylene compound ($b_2$), which is one of the starting materials for the blocked polyisocyanate compound (B).

From the viewpoint of improving compatibility between the blocked polyisocyanate compound (B) that is to be obtained and the other components in the coating composition, $R^6$ and $R^7$ are more preferably C2 or C3 alkyl groups, and from the viewpoint of storage stability of the and distinctness of image of the multilayer coating film, $R^6$ and $R^7$ are more preferably isopropyl groups.

The blocked polyisocyanate compound precursor ($b_{32}$) can be obtained, for example, by (i) reacting a polyisocyanate compound ($b_1$) with an acetoacetic acid ester having an approximately C1-C12 hydrocarbon group, or (ii) reacting a polyisocyanate compound ($b_1$) with an isobutyrylacetic acid ester having an approximately C1-C12 hydrocarbon group. The blocked polyisocyanate compound precursor ($b_{32}$) is preferably one obtained by reacting a polyisocyanate compound ($b_1$) with an isobutyrylacetic acid ester having an approximately C1-C12 hydrocarbon group.

Examples for the isobutyrylacetic acid ester having an approximately C1-C12 hydrocarbon group include approximately C1-C12 alkyl esters of isobutyrylacetic acid, such as methyl isobutyrylacetate, ethyl isobutyrylacetate, n-propyl isobutyrylacetate, isopropyl isobutyrylacetate, n-butyl isobutyrylacetate, isobutyl isobutyrylacetate, sec-butyl isobutyrylacetate, tert-butyl isobutyrylacetate, n-pentyl isobutyrylacetate, n-hexyl isobutyrylacetate, 2-ethylhexyl isobutyrylacetate, phenyl isobutyrylacetate and benzyl isobutyrylacetate, as well as any desired combinations of the foregoing, with methyl isobutyrylacetate, ethyl isobutyrylacetate and isopropyl isobutyrylacetate being preferred.

Also, examples of acetoacetic acid esters having approximately C1-C12 hydrocarbon groups include approximately C1-C12 alkyl esters of acetoacetic acid, such as methyl acetoacetate, ethyl acetoacetate, n-propyl acetoacetate, iso-propyl acetoacetate, n-butyl acetoacetate, isobutyl acetoacetate, sec-butyl acetoacetate, tert-butyl acetoacetate, n-pentyl acetoacetate, n-hexyl acetoacetate, 2-ethylhexyl acetoacetate, phenyl acetoacetate and benzyl acetoacetate, as well as any desired combinations of the foregoing, with methyl acetoacetate, ethyl acetoacetate and isopropyl acetoacetate being preferred.

Also, the blocked polyisocyanate compound precursor ($b_3$) may be a compound obtained by reacting a polyisocyanate compound ($b_1$) having two or more isocyanate groups in the molecule, an active methylene compound ($b_2$) and the aforementioned active hydrogen-containing compound. Specifically, the aforementioned active hydrogen-containing compound with a polyoxyalkylene group, for example, may be used as the active hydrogen-containing compound, to produce a blocked polyisocyanate compound wherein some of the isocyanate groups in the polyisocyanate compound ($b_1$) are blocked with an active methylene compound ($b_2$), and some or all of the other isocyanate groups have reacted with the active hydrogen-containing compound having a polyoxyalkylene group.

[Secondary Alcohol ($b_4$)]

The blocked polyisocyanate compound (B) may be produced, for example, by reacting a blocked polyisocyanate compound precursor ($b_3$) with a secondary alcohol.

There are no particular restrictions on the secondary alcohol, but it preferably has the following formula (VI):

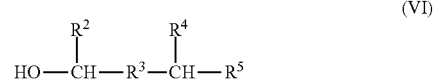

(VI)

wherein $R^2$, $R^4$ and $R^5$ each independently represent an approximately C1-C12 hydrocarbon group, and $R^3$ represents an approximately C1-C12 straight-chain or branched alkylene group.

In the secondary alcohol ($b_4$), $R^2$ is preferably a methyl group from the viewpoint of increasing reactivity with the blocked polyisocyanate compound precursor ($b_3$). Also, if $R^3$, $R^4$ and $R^5$ each have high carbon numbers the polarity of the obtained blocked polyisocyanate compound (B) may be reduced and compatibility with the other components in the coating composition may be lowered, and therefore $R^3$ is preferably an approximately C1-C3 alkylene group, and $R^4$ and $R^5$ are preferably methyl groups.

Examples for the secondary alcohol ($b_4$) include 4-methyl-2-pentanol, 5-methyl-2-hexanol, 6-methyl-2-heptanol and 7-methyl-2-octanol, as well as any desired combinations of the foregoing. The secondary alcohol ($b_4$) is preferably 4-methyl-2-pentanol which has a relatively low boiling point, since this will help facilitate its removal when some or all of the unreacted secondary alcohol ($b_4$) is distilled off following reaction between the blocked polyisocyanate compound precursor ($b_3$) and the secondary alcohol ($b_4$).

The blocked polyisocyanate compound (B) can be produced, for example, by reacting a blocked polyisocyanate compound precursor ($b_{31}$) having a blocked isocyanate group represented by the following formula (IV):

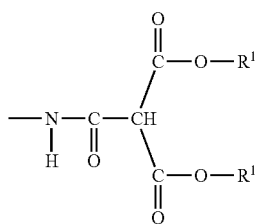

wherein each $R^1$ independently represents an approximately C1-C12 hydrocarbon group, and each $R^1$ may be the same or different,
with a secondary alcohol ($b_4$).

In this reaction, at least one of the $R^1$ groups in the blocked isocyanate group in the blocked polyisocyanate compound precursor ($b_{31}$) is replaced with a group represented by the following formula (VII):

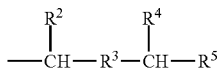

wherein $R^2$, $R^4$ and $R^5$ each independently represent an approximately C1-C12 hydrocarbon group, and $R^3$ represents an approximately C1-C12 straight-chain or branched alkylene group.

In the reaction, the obtained blocked polyisocyanate compound (B) has a blocked isocyanate group represented by the following formula (I):

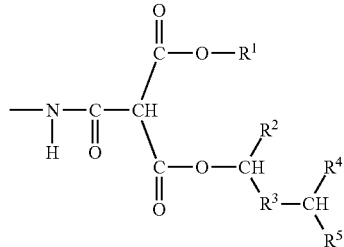

wherein $R^1$, $R^2$, $R^4$ and $R^5$ each independently represent an approximately C1-C12 hydrocarbon group and $R^3$ represents an approximately C1-C12 straight-chain or branched alkylene group,
or a blocked isocyanate group represented by the following formula (II):

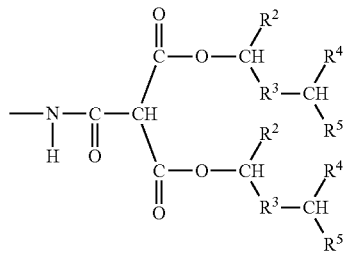

wherein $R^2$, $R^3$, $R^4$ and $R^5$ are as defined above.

In formula (I), $R^1$ is more preferably an approximately C1-C8 hydrocarbon group, even more preferably an approximately C1-C4 hydrocarbon group and yet more preferably an approximately C2-C3 hydrocarbon group.

The reaction between the blocked polyisocyanate compound precursor ($b_{31}$) and the secondary alcohol ($b_4$) is not particularly restricted so long as it is a production method that, for example, allows at least one of the $R^1$ groups of the blocked isocyanate group in the blocked polyisocyanate compound precursor ($b_{31}$) to be replaced by a group represented by formula (VII). For the production method, preferably some or all of the alcohols derived from at least one $R^1$ group in the blocked polyisocyanate compound precursor ($b_{31}$) are distilled out of the system by heating and pressure reduction or the like, and reaction is promoted to obtain a blocked polyisocyanate compound (B) having a blocked isocyanate group represented by formula (I) or (II).

The production method, specifically, is conducted at a temperature of preferably about 20° C. to about 150° C. and more preferably about 75° C. to about 95° C., optionally with pressure reduction, preferably for between about 5 minutes and about 20 hours, and more preferably between about 10 minutes and about 10 hours, to remove some or all of the alcohols. If the temperature is too low, the exchange reaction of alkoxy groups in the blocked polyisocyanate compound precursor ($b_{31}$) will be delayed and the production efficiency may be reduced, while if the temperature is too high, decomposing degradation of the obtained blocked polyisocyanate compound (B) will become more severe and the curability may be lowered.

In addition, the blocked polyisocyanate compound (B) can be produced by reacting a blocked polyisocyanate compound precursor ($b_{32}$) having a blocked isocyanate group represented by the following formula (V):

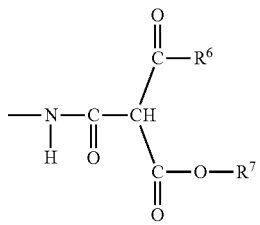

wherein $R^6$ and $R^7$ each independently represent an approximately C1-C12 hydrocarbon group,
with a secondary alcohol ($b_4$).

In this reaction, the $R^7$ group in the blocked isocyanate group in the blocked polyisocyanate compound precursor ($b_{32}$) is replaced with a group represented by the following formula (VII):

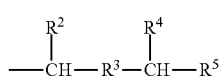

wherein $R^2$, $R^4$ and $R^5$ each independently represent an approximately C1-C12 hydrocarbon group, and $R^3$ represents an approximately C1-C12 straight-chain or branched alkylene group.

In the reaction, the obtained blocked polyisocyanate compound (B) has a blocked isocyanate group represented by the following formula (III):

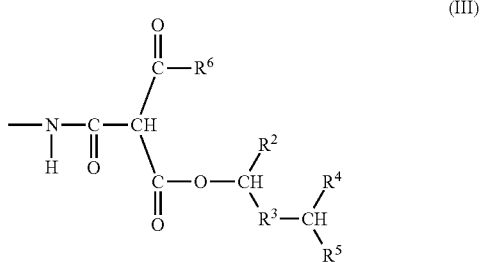

wherein $R^2$, $R^3$, $R^4$ and $R^5$ are as defined above, and $R^6$ represents an approximately C1-C12 hydrocarbon group.

The reaction between the blocked polyisocyanate compound precursor ($b_{32}$) and the secondary alcohol ($b_4$) is not particularly restricted so long as it is a production method that, for example, allows the $R^7$ group of the blocked isocyanate group in the blocked polyisocyanate compound precursor ($b_{32}$) to be replaced by a group represented by formula (VII). For the production method, preferably some or all of the alcohols derived from the $R^7$ group in the blocked polyisocyanate compound precursor ($b_{32}$) are distilled out of the system by heating and pressure reduction or the like, and reaction is promoted to obtain a blocked polyisocyanate compound (B) having a blocked isocyanate group represented by formula (III).

The production method, specifically, is conducted at a temperature of preferably about 20° C. to about 150° C. and more preferably about 75° C. to about 95° C., optionally with pressure reduction, preferably for between about 5 minutes and about 20 hours and more preferably between about 10 minutes and about 10 hours, to remove some or all of the alcohols. If the temperature is too low, the exchange reaction of alkoxy groups in the blocked polyisocyanate compound precursor ($b_{32}$) will be delayed and the production efficiency may be reduced, while if the temperature is too high, decomposing degradation of the obtained blocked polyisocyanate compound (B) will become more severe and the curability may be lowered.

Also, the amounts of the blocked polyisocyanate compound precursor ($b_3$) and the secondary alcohol ($b_4$) for production of the blocked polyisocyanate compound (B), from the viewpoint of reactivity of the blocked polyisocyanate compound (B) that is to be obtained and production efficiency, are such that the secondary alcohol ($b_4$) is preferably in the range of about 5 to about 500 parts by mass and more preferably in the range of about 10 to about 200 parts by mass with respect to 100 parts by solid mass of the blocked polyisocyanate compound precursor ($b_3$). If the amount of the secondary alcohol ($b_4$) is less than about 5 parts by mass, the reaction rate between the blocked polyisocyanate compound precursor ($b_3$) and the secondary alcohol ($b_4$) may be too slow. Also, if the amount of the secondary alcohol ($b_4$) is greater than about 500 parts by mass, the concentration of the produced blocked polyisocyanate compound (B) may be too low, lowering the production efficiency.

Also, during reaction between the blocked polyisocyanate compound precursor ($b_3$) and the secondary alcohol ($b_4$), the aforementioned removal procedure may be carried out after adding the polyfunctional hydroxyl-containing compound to the blocked polyisocyanate compound precursor ($b_3$) and the secondary alcohol ($b_4$), in order to modify the molecular weight of the blocked polyisocyanate compound (B).

The number-average molecular weight of the blocked polyisocyanate compound (B) is preferably in the range of about 600 to about 30,000, from the viewpoint of compatibility with the other components in the coating composition, and the smoothness, distinctness of image, water resistance and chipping resistance of the multilayer coating film that is to be formed. The number-average molecular weight is also more preferably no greater than about 10,000 and even more preferably no greater than about 5,000 from the viewpoint of compatibility with the other components in the coating composition and smoothness and distinctness of image of the multilayer coating film that is to be formed. The number-average molecular weight is also more preferably about 900 or greater and even more preferably about 1,000 or greater from the viewpoint of the water resistance and chipping resistance of the multilayer coating film that is to be formed.

[Aqueous Colored Coating Composition ($Y_1$)]

The aqueous colored coating composition ($Y_1$) for the base coat (hereunder also referred to simply as "aqueous colored coating composition ($Y_1$)") is an aqueous coating composition comprising a hydroxyl-containing resin (A) and a blocked polyisocyanate compound (B).

The aqueous colored coating composition ($Y_1$) contains the hydroxyl-containing resin (A) and the blocked polyisocyanate compound (B), respectively, at preferably about 10 to about 95 parts by mass and about 5 to about 90 parts by mass, more preferably about 20 to about 90 parts by mass and about 10 to about 80 parts by mass, even more preferably about 30 to about 90 parts by mass and about 10 to about 70 parts by mass and yet more preferably about 50 to about 90 parts by mass and about 10 to about 50 parts by mass, based on a total of 100 parts by solid mass of the hydroxyl-containing resin (A) and the blocked polyisocyanate compound (B). This is from the viewpoint of the smoothness, distinctness of image and water resistance of the multilayer coating film that is to be formed.

Also, when the aqueous colored coating composition ($Y_1$) contains a hydroxyl-containing acrylic resin ($A_1$) and a hydroxyl-containing polyester resin ($A_2$) as the hydroxyl-containing resin (A), the proportion of the hydroxyl-containing acrylic resin ($A_1$) and hydroxyl-containing polyester resin ($A_2$) is such that the hydroxyl-containing acrylic resin ($A_1$) and hydroxyl-containing polyester resin ($A_2$) (hydroxyl-containing acrylic resin ($A_1$)/hydroxyl-containing polyester resin ($A_2$)) is preferably about 95/5 to about 5/95, more preferably about 80/20 to about 20/80 and even more preferably about 60/40 to about 40/60, as the solid mass ratio, based on the solid mass of the hydroxyl-containing resin (A). This is from the viewpoint of the smoothness, distinctness of image and water resistance of the multilayer coating film that is to be formed.

Also, the aqueous colored coating composition ($Y_1$) may further contain a curing agent other than the blocked polyisocyanate compound (B). The curing agent may be a known curing agent, and especially an amino resin.

The amino resin may be a partial methylolated amino resin or total methylolated amino resin, obtained by reacting an amino component and an aldehyde component. Examples of such amino components include melamine, urea, benzoguanamine, acetoguanamine, steroguanamine, spiroguanamine and dicyandiamide. Examples of aldehyde components include formaldehyde, paraformaldehyde, acetaldehyde and benzaldehyde.

Also, the amino resin may be one wherein the methylol groups of a methylolated amino resin are partially or totally etherified with an alcohol. Examples of alcohols to be used for the etherification include methyl alcohol, ethyl alcohol, n-propyl alcohol, isopropyl alcohol, n-butyl alcohol, isobutyl alcohol, 2-ethylbutanol and 2-ethylhexanol.

The amino resin is preferably a melamine resin (C). The melamine resin (C) includes known melamine resins, but most preferably it is a methyl etherified melamine resin wherein the methylol groups of a partially or totally methylolated melamine resin are partially or totally etherified with methyl alcohol, a butyl etherified melamine resin wherein the methylol groups of a partially or totally methylolated melamine resin are partially or totally etherified with butyl alcohol, or a methyl-butyl mixed etherified melamine resin wherein the methylol groups of a partially or totally methylolated melamine resin are partially or totally etherified with methyl alcohol and butyl alcohol.

Also, from the viewpoint of improving the water resistance of the coating film that is to be obtained, the melamine resin (C) has a weight-average molecular weight of preferably about 400 to about 6,000, more preferably about 500 to about 4,000 and even more preferably about 600 to about 3,000.

Melamine resins (C) are commercially available, and examples include "SAIMEL 202", "SAIMEL 203", "SAIMEL 238", "SAIMEL 251", "SAIMEL 303", "SAIMEL 323", "SAIMEL 324", "SAIMEL 325", "SAIMEL 327", "SAIMEL 350", "SAIMEL 385", "SAIMEL 1156", "SAIMEL 1158", "SAIMEL 1116" and "SAIMEL 1130" (all products of Nihon Cytec Industries Inc.), and "U-VAN 120", "U-VAN 20HS", "U-VAN 20SE60", "U-VAN 2021", "U-VAN 2028" and "U-VAN 28-60" (all products of Mitsui Chemicals, Inc.).

When the aqueous colored coating composition ($Y_1$) contains a melamine resin (C), the aqueous colored coating composition ($Y_1$) contains the melamine resin in an amount such that the hydroxyl-containing resin (A), blocked polyisocyanate compound (B) and melamine resin (C) are at preferably about 10 to about 90 parts by mass, about 5 to about 85 parts by mass and about 5 to about 40 parts by mass, respectively, more preferably about 15 to about 80 parts by mass, about 7 to about 75 parts by mass and about 7 to about 35 parts by mass respectively, and even more preferably about 20 to about 80 parts by mass, about 9 to about 55 parts by mass and about 9 to about 30 parts by mass, respectively, based on the total of 100 parts by solid mass of the hydroxyl-containing resin (A), blocked polyisocyanate compound (B) and melamine resin (C).

The aqueous colored coating composition ($Y_1$) preferably further contains a pigment. The pigment may be, for example, a color pigment, extender pigment or luster pigment, or any desired combination of the foregoing, and the aqueous colored coating composition ($Y_1$) preferably contains at least one color pigment and luster pigment.

Examples for the color pigment include titanium oxide, zinc oxide, carbon black, molybdenum red, Prussian blue, cobalt blue, azo-based pigments, phthalocyanine-based pigments, quinacridone-based pigments, isoindoline-based pigments, threne-based pigments, perylene-based pigments, dioxazine-based pigments, diketopyrrolopyrrole-based pigments and the like, as well as any desired combination of the foregoing.

When the aqueous colored coating composition ($Y_1$) contains a color pigment, the aqueous colored coating composition ($Y_1$) contains the color pigment at generally about 1 to about 150 parts by mass, preferably about 3 to about 130 parts by mass and more preferably about 5 to about 110 parts by mass based on 100 parts by mass as the total resin solid content in the aqueous colored coating composition ($Y_1$).

Examples for the luster pigment include aluminum (including vapor deposited aluminum), copper, zinc, brass, nickel, aluminum oxide, mica, aluminum oxide covered by titanium oxide or iron oxide, mica covered by titanium oxide or iron oxide, glass flakes, hologram pigments and the like, as well as any desired combinations of the foregoing.

The luster pigment is preferably aluminum, aluminum oxide, mica, aluminum oxide covered by titanium oxide or iron oxide or mica covered by and titanium oxide or iron oxide, and is more preferably aluminum. The aforementioned aluminum includes non-leafing-type aluminum and leafing-type aluminum.

When the aqueous colored coating composition ($Y_1$) contains a luster pigment, the aqueous colored coating composition ($Y_1$) contains the luster pigment at generally about 1 to about 50 parts by mass, preferably about 2 to about 30 parts by mass and more preferably about 3 to about 20 parts by mass based on the total of 100 parts by solid mass of the hydroxyl-containing resin (A) and the blocked polyisocyanate compound (B).

The aqueous colored coating composition ($Y_1$) preferably further contains a hydrophobic solvent from the viewpoint of the smoothness, distinctness of image and resistance to pinhole popping of the coating film that is to be formed.

The hydrophobic solvent has a solubility of preferably no greater than about 10 g, more preferably no greater than about 5 g and even more preferably no greater than about 1 g, in 100 g of water at 20° C.

Examples for the hydrophobic solvent include hydrocarbon-based solvents, such as rubber volatile oils, mineral spirits, toluene, xylene and solvent naphtha; alcohol-based solvents, such as 1-hexanol, 1-octanol, 2-octanol, 2-ethyl-1-hexanol, 1-decanol, benzyl alcohol, ethylene glycol mono-2-ethylhexyl ether, propylene glycol mono-n-butyl ether, dipropylene glycol mono-n-butyl ether, tripropylene glycol mono-n-butyl ether, propylene glycol mono-2-ethylhexyl ether and propylene glycol monophenyl ether; ester-based solvents, such as n-butyl acetate, isobutyl acetate, isoamyl acetate, methylamyl acetate and ethylene glycol monobutyl acetate ether; ketone-based solvents, such as methyl isobutyl ketone, cyclohexanone, ethyl-n-amyl ketone and diisobutyl ketone; and any desired combinations of the foregoing.

When the aqueous colored coating composition ($Y_1$) contains a hydrophobic solvent, the aqueous colored coating composition ($Y_1$) contains the hydrophobic solvent in the range of preferably about 2 to about 100 parts by mass, more preferably about 5 to about 80 parts by mass and even more preferably about 8 to about 60 parts by mass, based on a total of 100 parts by solid mass of the hydroxyl-containing resin (A) and the blocked polyisocyanate compound (B).

Also, the aqueous colored coating composition ($Y_1$) may further contain, optionally, paint additives, such as thickening agents, curing catalysts, ultraviolet absorbers, light stabilizers, antifoaming agents, plasticizers, organic solvents other than the aforementioned hydrophobic solvents, surface control agents, anti-settling agents and the like.

Examples for the thickening agent include inorganic thickening agents, such as silicates, metal silicates, montmorillonite and colloidal alumina; polyacrylic acid-based thickening agents, such as copolymers of (meth)acrylic acids and (meth)acrylic acid esters and sodium polyacrylate; associative thickening agents having a hydrophilic portion and a hydrophobic portion in the molecule and exhibiting a thickening effect when the hydrophobic portion is adsorbed onto the surface of the pigment or emulsion particle in the coating composition in an aqueous medium, such that the hydrophobic portions become associated together; cellulosic derivative-based thickening agents, such as carboxymethyl cellulose, methyl cellulose and hydroxyethyl cellulose; protein-based thickening agents, such as casein, sodium caseinate and ammonium caseinate; alginic acid-based thickening agents, such as sodium alginate; polyvinyl-based thickening agents, such as polyvinyl alcohol, polyvinylpyrrolidone and polyvinylbenzyl ether copolymer; polyether-based thickening agents, such as Pluronic polyethers, polyether dialkyl esters, polyether dialkyl ethers and polyether epoxy-modified compounds; maleic anhydride copolymer-based thickening agents, such as partial esters of vinyl methyl ether-maleic anhydride copolymers; and polyamide-based thickening agents, such as polyamide amine salts, as well as any desired combinations of the foregoing.

The aforementioned polyacrylic acid-based thickening agents are commercially available, and examples include "ACRYSOL ASE-60", "ACRYSOL TT-615" and "ACRYSOL RM-5" (all trade names) by Rohm & Haas, and "SN THICKENER 613", "SN THICKENER 618", "SN THICKENER 630", "SN THICKENER 634" and "SN THICKENER 636" (all trade names) by San Nopco, Ltd.

The aforementioned associative thickening agents are also commercially available, and examples include "UH-420", "UH-450", "UH-462", "UH-472", "UH-540", "UH-752", "UH-756 VF" and "UH-814N" (all trade names) by Adeka Corp., "ACRYSOL RM-8W", "ACRYSOL RM-825", "ACRYSOL RM-2020NPR", "ACRYSOL RM-12W" and "ACRYSOL SCT-275" (all trade names) by Rohm & Haas, and "SN THICKENER 612", "SN THICKENER 621N", "SN THICKENER 625N", "SN THICKENER 627N" and "SN THICKENER 660T" (all trade names) by San Nopco, Ltd.

The polyamide-based thickening agent may be "AQ-630" or "AQ-870" (both trade names) by Kusumoto Chemicals, Ltd.

When the aqueous colored coating composition ($Y_1$) contains a thickening agent, the aqueous colored coating composition ($Y_1$) contains the thickening agent at generally about 0.01 to about 15 parts by mass, preferably about 0.05 to about 10 parts by mass and more preferably about 0.1 to about 5 parts by mass, based on the total of 100 parts by solid mass of the hydroxyl-containing resin (A) and the blocked polyisocyanate compound (B).

The aqueous colored coating composition ($Y_1$) may be prepared by mixing and dispersing the hydroxyl-containing resin (A) and the blocked polyisocyanate compound (B), and optionally a pigment, hydrophobic solvent and other paint additives, in an aqueous medium, by a common method. Also, the aqueous medium may be deionized water or a mixture of deionized water and a hydrophilic organic solvent. Examples of hydrophilic organic solvents include ethylene glycol monobutyl ether, propylene glycol monomethyl ether and propylene glycol monopropyl ether.

The aqueous colored coating composition ($Y_1$) has a solid concentration in the range of generally about 10 to about 60 mass %, preferably about 15 to about 50 mass % and more preferably about 20 to about 40 mass %.

As used herein, the "solid content" of the coating composition, resin and other components refers to the non-volatile components remaining after drying at 110° C. for 1 hour. For example, the solid content of the coating composition consists of the non-volatile components of the base resin, curing agent, pigment, etc. remaining in the coating composition after drying at 110° C. for 1 hour. Thus, the solid concentration of the coating composition can be calculated by measuring the coating composition in a heat-proof container, such as an aluminum foil cup, spreading the coating composition on the bottom of the container and then drying at 110° C. for 1 hour, and measuring the mass of the components in the coating composition remaining after drying to determine the ratio of the mass of the components in the coating composition remaining after drying with respect to the total mass of the coating composition before drying.

There are no particular restrictions on the method of applying the aqueous colored coating composition ($Y_1$), and examples include air spray coating, airless spray coating, rotary atomizing coating, curtain coating and the like, with air spray coating and rotary atomizing coating being preferred. If desired, an electrostatic charge may be applied during the coating.

The aqueous colored coating composition ($Y_1$) is applied to a cured film thickness in the range of generally about 3 to about 50 μm, preferably about 5 to about 35 μm and more preferably about 10 to about 20 μm.

The following may be at least part of the reason that excellent smoothness, distinctness of image and adhesion after water resistance test are obtained by using the aqueous colored coating composition ($Y_1$) in the method of forming a multilayer coating film the disclosure.

Firstly, since the blocked polyisocyanate compound (B) in the aqueous colored coating composition ($Y_1$) has a hydrocarbon group with a specific branched structure, this inhibits formation of a mixed layer of the uncured primer coating film and uncured base coat coating film when the aqueous colored coating composition for a base coat has been applied onto the primer coating film, and thus improves the smoothness and distinctness of image of the multilayer coating film that is formed.

Secondly, since the blocked polyisocyanate compound (B) has a hydrophilic group, the storage stability is improved and the adhesion after water resistance test after storage is improved.

[Step 1-3]

In step 1-3, an article to be coated having an uncured primer coating film and an uncured base coat coating film is coated with a clear coating composition (Z) to form an uncured clear coating film on it.

From the viewpoint of preventing coating defects, such as pinhole popping, the uncured base coat coating film is preferably subjected to preheat or air blowing under conditions in which the base coating film essentially does not cure, before application of the clear coating composition (Z).

The preheating is carried out by heating at a temperature of preferably about 40° C. to about 100° C., more preferably about 50° C. to about 90° C. and even more preferably about 60° C. to about 80° C., preferably for about 30 seconds to about 15 minutes, more preferably about 1 minute to about 10 minutes and even more preferably about 2 minutes to about 5 minutes. Air blowing may be carried out by blasting the coated surface of the article to be coated with heated air at a temperature of generally ordinary temperature or about 25° C. to about 80° C., for a period of about 30 seconds to about 15 minutes.

From the viewpoint of improving the smoothness and distinctness of image of the multilayer coating film that is to be formed and of minimizing pinhole popping, the base coating film may optionally be subjected to preheating, air blowing or the like before application of the clear coating composition (Z), to adjust the solid concentration of the coating film to within a range of generally about 60 to about 100 mass %, preferably about 80 to about 100 mass % and more preferably about 90 to about 100 mass %.

[Clear Coating Composition (Z)]

The clear coating composition (Z) may be a thermosetting clear coating composition that is known for coating onto, for example, automobile bodies, automobile parts, household electrical appliances and the like. Specifically, the clear coating composition (Z) may be an organic solvent-type thermosetting coating composition, an aqueous thermosetting coating composition, a thermosetting powder coating or a thermosetting powder slurry coating composition containing a base resin with a crosslinkable functional group, and a crosslinking agent, and the clear coating composition (Z) is preferably an organic solvent-type thermosetting coating composition.

Examples of crosslinkable functional groups include carboxyl, hydroxyl, epoxy, silanol, alkoxysilyl and reactive unsaturated groups. Examples of base resins with a crosslinkable functional group include acrylic resins, polyester resins, alkyd resins, urethane resins, epoxy resins and fluorine resins.

Examples for the crosslinking agent include polyisocyanate compounds with non-blocked isocyanate groups, blocked polyisocyanate compounds, melamine resins, urea resins, carboxyl group-containing compounds, carboxyl group-containing resins, epoxy group-containing resins and epoxy group-containing compounds.

Polyisocyanate compounds with non-blocked isocyanate groups include the "polyisocyanate compound $(b_1)$" mentioned for the "blocked polyisocyanate compound (B)".

The blocked polyisocyanate compound may be, in addition to those mentioned in the present specification, one obtained by blocking a polyisocyanate compound $(b_1)$ with a known blocking agent, for example, an alcohol-based, phenol-based, oxime-based, amine-based, acid amide-based, imidazole-based, pyridine-based or mercaptane-based blocking agent.

Preferred base resin/crosslinking agent combinations for the clear coating composition (Z) include carboxyl group-containing resin/epoxy group-containing resins, hydroxyl-containing resin/polyisocyanate compounds, hydroxyl-containing resin/blocked polyisocyanate compounds and hydroxyl-containing resin/melamine resin combinations.

Also, the clear coating composition (Z) may be a one-pack type coating composition or a multi-pack type coating composition, such as a two-pack urethane resin coating composition, and when it is to be heat cured at a temperature of about 70° C. or higher and below about 120° C., it is preferably a one-pack type urethane resin coating composition containing a blocked polyisocyanate compound as the curing agent or a two-pack urethane resin coating composition containing a polyisocyanate compound as the curing agent.

The clear coating composition (Z) may contain, optionally, color pigments, luster pigments, dyes and the like in ranges that do not impair the transparency, and may further contain extender pigments, ultraviolet absorbers, light stabilizers, antifoaming agents, thickening agents, rust-preventive agents, surface control agents and the like.

The clear coating composition (Z) can be applied onto the article to be coated having an uncured base coat coating film, by a known method, such as air spray coating, airless spray coating or rotary atomizing coating, while applying an electrostatic charge if desired, and an electrostatic charge may even be applied during the coating. The clear coating composition (Z) is coated to a cured film thickness in the range of generally 10 to 80 μm, preferably 15 to 60 μm and more preferably 20 to 50 μm.

Also, the uncured clear coating film may be allowed to stand at room temperature (25° C.) for about 1 to about 60 minutes or preheated at a temperature of about 40° C. to about 80° C. for about 1 to about 60 minutes, if desired, prior to step 1-4.

[Step 1-4]

In step 1-4, the uncured primer coating film, uncured base coat coating film and uncured clear coating film are cured by heating them.

The uncured primer coating film, uncured base coat coating film and uncured clear coating film can be cured by common coating film heating (baking) means, such as hot air heating, infrared heating or high-frequency heating.

From the viewpoint of energy savings and/or heat resistance of the base material, the uncured primer coating film, uncured base coat coating film and uncured clear coating film are heated at a temperature of preferably about 70° C. or higher and below about 120° C., more preferably about 70° C. to about 110° C., and even more preferably about 80° C. to about 100° C.

Also, the uncured primer coating film, uncured base coat coating film and uncured clear coating film are heated for preferably about 10 to about 60 minutes and more preferably about 15 to about 40 minutes. The uncured primer coating film, uncured base coat coating film and uncured clear coating film are cured under the conditions described above.

Specifically, the first method of forming a multilayer coating film including steps 1-1 to 1-4 is preferably one wherein a multilayer coating film comprising the primer coating film, the base coating film and the clear coating film is formed on an article to be coated, such as an automobile body or automobile part by a 3-coat, 1-bake system.

[Second Method of Forming a Multilayer Coating Film (Method 2)]

Method 2 comprises the following step 2-1 to step 2-3.

[Step 2-1]

In step 2-1, an article to be coated is coated with a primer coating composition (X), and an uncured primer coating film is formed on the article to be coated.

Step 2-1 is identical or similar to step 1-1 of method 1.

[Step 2-2]

In step 2-2, the article to be coated having the uncured primer coating film is coated with an aqueous colored coating composition $(Y_2)$ for a top coating film, and an uncured top coating film is formed over it.

The aqueous colored coating composition $(Y_2)$ for a top coating film (hereunder also referred to simply as "aqueous colored coating composition $(Y_2)$") is a coating composition for a top coating film, and it comprises a hydroxyl-containing resin (A) and a blocked polyisocyanate compound (B).

The aqueous colored coating composition $(Y_2)$ may contain the same components as the aqueous colored coating composition $(Y_1)$ for a base coat, described above for "step 1-2", and it may be applied by the same method as for the aqueous colored coating composition $(Y_1)$.

Also, the aqueous colored coating composition $(Y_2)$ may further contain a curing agent other than the blocked polyisocyanate compound (B). The curing agent may be a known curing agent, and especially an amino resin.

The amino resin may be one mentioned for the "aqueous colored coating composition $(Y_1)$", and it is preferably a melamine resin (C).

When the aqueous colored coating composition $(Y_2)$ contains a melamine resin (C), the aqueous colored coating composition $(Y_2)$ contains the melamine resin in an amount such that the hydroxyl-containing resin (A), blocked polyisocyanate compound (B) and melamine resin (C) are at preferably about 10 to about 90 parts by mass, about 5 to about 85 parts by mass and about 5 to about 40 parts by mass, respectively, more preferably about 15 to about 80 parts by mass, about 7 to about 75 parts by mass and about 7 to about 35 parts by mass respectively, and even more preferably about 20 to about 80 parts by mass, about 9 to about 55 parts by mass and about 9 to about 30 parts by mass, respectively, based on the total of 100 parts by solid mass of the hydroxyl-containing resin (A), blocked polyisocyanate compound (B) and melamine resin (C).

[Step 2-3]

In step 2-3, the uncured primer coating film and uncured top coating film are cured by heating.

Step 2-3 may be carried out in the same manner as step 1-4 of method 1.

Prior to the subsequent step, the uncured primer coating film and/or the uncured top coating film may optionally be allowed to stand at room temperature (25° C.) for about 1 to about 60 minutes, or be preheated under conditions in which the coating film essentially does not cure (for example, at a temperature of about 40° C. to about 80° C. for about 1 to about 60 minutes), or it may be air blown.

In method 2, the primer coating composition (X) is applied to a cured film thickness in the range of generally about 3 to about 40 µm, preferably about 5 to about 30 µm and more preferably about 7 to about 20 µm. Also, the aqueous colored coating composition ($Y_2$) is coated to a cured film thickness in the range of generally about 5 to about 50 µm, preferably about 10 to about 45 µm and more preferably about 20 to about 40 µm.

Specifically, method 2 is preferred for formation of a multilayer coating film composed of a primer coating film and a top coating film, on an article to be coated, such as an automobile body or automobile part by a 2-coat, 1-bake system.

[Third Method of Forming a Multilayer Coating Film (Method 3)]

Method 3 comprises the following step 3-1 to step 3-3.

[Step 3-1]

In step 3-1, the article to be coated is coated with an aqueous colored coating composition ($Y_1$) for a base coat, to form an uncured base coat coating film on the article to be coated.

The article to be coated is identical to the article to be coated described for "step 1-1" of method 1.

The aqueous colored coating composition ($Y_1$) for a base coat to be used in method 3 has a composition identical or similar to that of the aqueous colored coating composition ($Y_1$) for a base coat described in "step 1-1" of method 1, and it may be applied in an identical or similar manner.

[Step 3-2]

In step 3-2, an article to be coated having an uncured base coat coating film is coated with a clear coating composition (Z) to form a clear coating film on it.

The clear coating composition (Z) has a composition identical to that of the clear coating composition (Z) explained in "step 1-3" of method 1, and it may be applied in a similar manner.

[Step 3-3]

In step 3-3, uncured base coat coating film and uncured clear coating film are cured by heating.

Step 3-3 may be carried out in the same manner as step 1-4 of method 1.

Prior to the subsequent step, the uncured base coat coating film and/or the uncured clear coating film may optionally be allowed to stand at room temperature (25° C.) for about 1 to about 60 minutes, or be preheated under conditions in which the coating film essentially does not cure (for example, at a temperature of about 40° C. to about 80° C. for about 1 to about 60 minutes), or be air blown.

In method 3, the aqueous colored coating composition ($Y_1$) is applied to a cured film thickness in the range of generally about 3 to about 50 µm, preferably about 5 to about 35 µm and more preferably about 10 to about 20 µm. Also, the clear coating composition (Z) is applied to a cured film thickness in the range of generally about 10 to about 80 µm, preferably about 15 to about 60 µm and more preferably about 20 to about 45 µm.

Specifically, method 3 is preferred for formation of a multilayer coating film composed of a base coating film and a clear coating film, on an article to be coated, such as an automobile body or automobile part by a 2-coat, 1-bake system.

EXAMPLES

The present disclosure will now be explained in greater detail using examples and comparative examples. However, it is to be understood that the disclosure is not limited only to these examples. The "parts" and "%" values are all based on mass. Also, the film thicknesses of the coating films are based on the cured coating films.

Production of Hydroxyl-Containing Acrylic Resin ($A_1$)

Production Example 1

To a reactor equipped with a thermometer, thermostat, stirrer, reflux condenser and water separator there were added 60 parts of ethylene glycol monobutyl ether and 15 parts of isobutyl alcohol, and the contents were heated to 110° C. in a nitrogen stream. When the temperature of the contents reached 110° C., a mixture of 10 parts of styrene, 48 parts of methyl methacrylate, 26 parts of n-butyl acrylate, 10 parts of 2-hydroxyethyl methacrylate, 6 parts of acrylic acid and 1 part of azobisisobutyronitrile was added dropwise into the reactor over a period of 3 hours.

Upon completion of the addition, it was aged at 110° C. for 30 minutes, and a mixture of 1 part of azobisisobutyronitrile and 15 parts of ethylene glycol monobutyl ether was added dropwise into the reactor over 1 hour. After further ageing at 110° C. for 1 hour, the mixture was cooled and neutralized with an equal amount of dimethylaminoethanol, and deionized water was added to obtain a hydroxyl-containing acrylic resin ($A_1$-1) solution. The solid content of the hydroxyl-containing acrylic resin ($A_1$-1) solution was 50%.

Production of Hydroxyl-Containing Polyester Resin ($A_2$)

Production Example 2

After charging 109 parts of trimethylolpropane, 141 parts of 1,6-hexanediol, 126 parts of 1,2-cyclohexanedicarboxylic anhydride and 120 parts of adipic acid into a reactor equipped with a thermometer, thermostat, stirrer, reflux condenser and water separator, the contents were heated from 160° C. to 230° C. over a period of 3 hours, and the contents were subjected to condensation reaction at 230° C. for 4 hours while distilling off the produced condensation water with a water separator.

Next, 38.3 parts of trimellitic anhydride was further added to the reactor for addition of carboxyl groups to the obtained condensation reaction product, reaction was conducted at 170° C. for 30 minutes, and then the contents were diluted with ethylene glycol monobutyl ether to obtain a hydroxyl-containing polyester resin ($A_2$-1) solution with a solid concentration of 70%. The hydroxyl-containing polyester resin ($A_2$-1) solution had an acid value of 46 mgKOH/g, a hydroxyl value of 150 mgKOH/g and a number-average molecular weight of 1,400.

Production of Blocked Polyisocyanate Compound (B)

Production Example 3

After charging 480 parts of "SUMIDUR N-3300" (trade name of Sumika Bayer Urethane Co., Ltd., polyisocyanate containing isocyanurate structure derived from hexamethylene diisocyanate, solid content: approximately 100%, isocyanate group content: 21.8%), 150 parts of ethyl acetate and 365 parts of diisopropyl malonate into a reactor equipped with a thermometer, thermostat, stirrer, reflux condenser, nitrogen inlet tube, dropper and simple trap for the removed solvent, the contents were stirred under a nitrogen stream.

Next, 4 parts of a 28% methanol solution of sodium methoxide was added to the reactor and the contents were stirred at 65° C. for 8 hours. The isocyanate content in the obtained resin solution was 0.07 mol/Kg. After adding 870 parts of 4-methyl-2-pentanol to the reactor, the solvent in the reactor was distilled off over a period of 3 hours under reduced pressure conditions, while keeping the contents at a temperature of 90° C. to 95° C., and then 120 parts of 4-methyl-2-pentanol was further added to the reactor to obtain 1400 parts of a solution of a blocked polyisocyanate compound (B-1). The simple trap for the removed solvent included 183 parts of isopropanol. The solid concentration of the blocked polyisocyanate compound (B-1) solution was approximately 60%.

Production Example 4

After charging 450 parts of "DURANATE TPA-100" (trade name of Asahi Kasei Chemicals Corp., polyisocyanate containing an isocyanurate structure, derived from hexamethylene diisocyanate, solid content: approximately 100%, isocyanate group content: 23.0%), 150 parts of ethyl acetate and 310 parts of diethyl malonate into a reactor equipped with a thermometer, thermostat, stirrer, reflux condenser, nitrogen inlet tube, dropper and simple trap for the removed solvent, the contents were stirred under a nitrogen stream.

Next, 4 parts of a 28% methanol solution of sodium methoxide was added to the reactor and the contents were stirred at 65° C. for 8 hours. The isocyanate content in the obtained resin solution was 0.07 mol/Kg. After adding 870 parts of 4-methyl-2-pentanol to the reactor, the solvent was distilled off over a period of 3 hours under reduced pressure conditions, while keeping the contents at a temperature of 90° C. to 95° C., and then 120 parts of 4-methyl-2-pentanol was further added to the reactor to obtain 1350 parts of a solution of a blocked polyisocyanate compound (B-2). The simple trap for the removed solvent included 140 parts of ethanol. The solid concentration of the obtained blocked polyisocyanate compound (B-2) solution was approximately 60%.

Production Example 5

After charging 480 parts of "SUMIDUR N-3300", 150 parts of ethyl acetate, 330 parts of diisopropyl malonate and 27 parts of isopropyl acetoacetate into a reactor equipped with a thermometer, thermostat, stirrer, reflux condenser, nitrogen inlet tube, dropper and simple trap for the removed solvent, the contents were stirred under a nitrogen stream. Next, 4 parts of a 28% methanol solution of sodium methoxide was added to the reactor and the contents were stirred at 65° C. for 8 hours. The isocyanate content in the obtained resin solution was 0.08 mol/Kg.

After adding 870 parts of 4-methyl-2-pentanol to the reactor, the solvent was distilled off over a period of 3 hours under reduced pressure conditions, while keeping the reactor at a temperature of 90° C. to 95° C., and then 120 parts of 4-methyl-2-pentanol was further added to the reactor to obtain 1390 parts of a solution of a blocked polyisocyanate compound (B-3). The simple trap for the removed solvent included 173 parts of isopropanol. The solid concentration of the obtained blocked polyisocyanate compound (B-3) solution was approximately 60%.

Production Example 6

After charging 480 parts of "SUMIDUR N-3300", 150 parts of ethyl acetate, 280 parts of diethyl malonate and 30 parts of ethyl isobutyrylacetate into a reactor equipped with a thermometer, thermostat, stirrer, reflux condenser, nitrogen inlet tube, dropper and simple trap for the removed solvent, 4 parts of a 28% sodium methoxide methanol solution was added to the reactor while stirring the contents under a nitrogen stream, and the contents were further stirred at 65° C. for 8 hours. The isocyanate content in the obtained resin solution was 0.08 mol/Kg.

After adding 870 parts of 4-methyl-2-pentanol to the reactor, the solvent was distilled off over a period of 3 hours under reduced pressure conditions, while keeping the reactor at a temperature of 90° C. to 95° C., and then 120 parts of 4-methyl-2-pentanol was further added to obtain 1350 parts of a solution of a blocked polyisocyanate compound (B-4). The simple trap for the removed solvent included 133 parts of ethanol. The solid concentration of the obtained blocked polyisocyanate compound (B-4) solution was approximately 60%.

Production Example 7

After charging 480 parts of "SUMIDUR N-3300", 150 parts of ethyl acetate and 360 parts of diisopropyl malonate into a reactor equipped with a thermometer, thermostat, stirrer, reflux condenser, nitrogen inlet tube, dropper and simple trap for the removed solvent, 4 parts of a 28% methanol solution of sodium methoxide was added to the reactor while stirring the contents under a nitrogen stream, and the contents were further stirred at 65° C. for 8 hours. The isocyanate content in the obtained resin solution was 0.07 mol/Kg.

After adding 990 parts of 5-methyl-2-hexanol to the reactor, the solvent was distilled off over a period of 3 hours under reduced pressure conditions, while keeping the reactor at a temperature of 90° C. to 95° C., and then 120 parts of 5-methyl-2-hexanol was further added to the reactor to obtain 1400 parts of a solution of a blocked polyisocyanate compound (B-5). The simple trap for the removed solvent included 180 parts of isopropanol. The solid concentration of the obtained blocked polyisocyanate compound (B-5) solution was approximately 60%.

Production Example 8

After charging 450 parts of "DURANATE TPA-100", 150 parts of ethyl acetate and 360 parts of diisopropyl malonate into a reactor equipped with a thermometer, thermostat, stirrer, reflux condenser, nitrogen inlet tube, dropper and simple trap for the removed solvent, 4 parts of a 28% methanol solution of sodium methoxide was added to the reactor while stirring the contents under a nitrogen stream, and the contents were further stirred at 65° C. for 8 hours. The isocyanate content in the obtained resin solution was 0.07 mol/Kg.

After adding 1110 parts of 6-methyl-2-heptanol to the reactor, the solvent was distilled off over a period of 6 hours under reduced pressure conditions, while keeping the reactor at a temperature of 80° C. to 85° C., and then 120 parts of 6-methyl-2-heptanol was further added to the reactor to obtain 1430 parts of a solution of a blocked polyisocyanate compound (B-6). The simple trap for the removed solvent included 170 parts of isopropanol. The solid concentration of the obtained blocked polyisocyanate compound (B-6) solution was approximately 60%.

Production Example 9

After charging 480 parts of "SUMIDUR N-3300", 150 parts of ethyl acetate and 310 parts of diethyl malonate into a reactor equipped with a thermometer, thermostat, stirrer, reflux condenser, nitrogen inlet tube, dropper and simple trap for the removed solvent, 4 parts of a 28% methanol solution of sodium methoxide was added while stirring the contents under a nitrogen stream and the contents were further stirred at 65° C. for 8 hours. The isocyanate content in the obtained resin solution was 0.06 mol/Kg.

After adding 630 parts of n-butanol to the reactor, the solvent was distilled off over a period of 3 hours under reduced pressure conditions while maintaining a reactor temperature of 90° C. to 95° C., and 90 parts of n-butanol was added to the reactor to obtain 1270 parts of a blocked polyisocyanate compound (B-7) solution. The simple trap for the removed solvent included 100 parts of ethanol. The solid concentration of the obtained blocked polyisocyanate compound (B-7) solution was approximately 60%.

Production Example 10

After charging 480 parts of "SUMIDUR N-3300", 150 parts of ethyl acetate and 310 parts of diethyl malonate into a reactor equipped with a thermometer, thermostat, stirrer, reflux condenser, nitrogen inlet tube, dropper and simple trap for the removed solvent, 4 parts of a 28% methanol solution of sodium methoxide was added to the reactor while stirring the contents under a nitrogen stream and the contents were further stirred at 65° C. for 8 hours. The isocyanate content in the obtained resin solution was 0.06 mol/Kg.

After adding 630 parts of 2-butanol to the reactor, the solvent was distilled off over a period of 3 hours under reduced pressure conditions while maintaining a reactor temperature of 90° C. to 95° C., and 90 parts of 2-butanol was further added to the reactor to obtain 1250 parts of a solution of a blocked polyisocyanate compound (B-8). The simple trap for the removed solvent included 70 parts of ethanol. The solid concentration of the obtained blocked polyisocyanate compound (B-8) solution was approximately 60%.

Production Example 11

After charging 480 parts of "SUMIDUR N-3300", 150 parts of ethyl acetate and 310 parts of diethyl malonate into a reactor equipped with a thermometer, thermostat, stirrer, reflux condenser, nitrogen inlet tube, dropper and simple trap for the removed solvent, 4 parts of a 28% methanol solution of sodium methoxide was added to the reactor while stirring the contents under a nitrogen stream and the contents were further stirred at 65° C. for 8 hours. The isocyanate content in the obtained resin solution was 0.06 mol/Kg.

After adding 1110 parts of 2-ethyl-1-hexanol to the reactor, the solvent was distilled off over a period of 6 hours under reduced pressure conditions, while keeping the reactor at a temperature of 80° C. to 85° C., and then 120 parts of 2-ethyl-1-hexanol was further added to the reactor to obtain 1410 parts of a solution of a blocked polyisocyanate compound (B-9). The simple trap for the removed solvent included 130 parts of ethanol. The solid concentration of the obtained blocked polyisocyanate compound (B-9) solution was approximately 60%.

Production Example 12

After charging 480 parts of "SUMIDUR N-3300", 150 parts of ethyl acetate and 310 parts of diethyl malonate into a reactor equipped with a thermometer, thermostat, stirrer, reflux condenser, nitrogen inlet tube, dropper and simple trap for the removed solvent, 4 parts of a 28% methanol solution of sodium methoxide was added while stirring the contents under a nitrogen stream and the contents were further stirred at 65° C. for 8 hours. The isocyanate content in the obtained resin solution was 0.06 mol/Kg.

There was then added 1000 parts of propylene glycol monopropyl ether to the reactor, the solvent was distilled off over a period of 3 hours under reduced pressure conditions while maintaining a reactor temperature of 90° C. to 95° C., and 120 parts of propylene glycol monopropyl ether was added to the reactor to obtain 1380 parts of a solution of a blocked polyisocyanate compound (B-10). The simple trap for the removed solvent included 125 parts of ethanol. The solid concentration of the obtained blocked polyisocyanate compound (B-10) solution was approximately 60%.

Production Example 13

After charging 360 parts of "SUMIDUR N-3300", 60 parts of "UNIOX M-550" (product of NOF Corp., polyethylene glycol monomethyl ether, average molecular weight: approximately 550) and 0.2 part of 2,6-di-tert-butyl-4-methylphenol into a reactor equipped with a thermometer, thermostat, stirrer, reflux condenser, nitrogen inlet tube, dropper and simple trap for the removed solvent, the contents were stirred under a nitrogen stream while heating at 130° C. for 3 hours.

Next, 110 parts of ethyl acetate and 252 parts of diisopropyl malonate were charged into the reactor and 3 parts of a 28% methanol solution of sodium methoxide was added to the reactor while stirring the contents under a nitrogen stream, and then stirring was continued at 65° C. for 8 hours. The isocyanate content in the obtained resin solution was 0.12 mol/Kg.

After adding 683 parts of 4-methyl-2-pentanol to the reactor, the solvent was distilled off over a period of 3 hours under reduced pressure conditions while maintaining a reactor temperature of 80° C. to 85° C., to obtain 1010 parts of a blocked polyisocyanate compound (B-11) solution. The simple trap for the removed solvent included 95 parts of isopropanol. The solid concentration of the obtained blocked polyisocyanate compound (B-11) solution was approximately 60%.

Production Example 14

After charging 360 parts of "SUMIDUR N-3300", 50 parts of "UNIOX M-400" (product of NOF Corp., polyethylene glycol monomethyl ether, average molecular weight: approximately 400), 5 parts of "PEG#600" (product of NOF Corp., polyethylene glycol, average molecular weight: approximately 600) and 0.2 part of 2,6-di-tert-butyl-4-methylphenol into a reactor equipped with a thermometer, thermostat, stirrer, reflux condenser, nitrogen inlet tube, dropper and simple trap for the removed solvent, the contents were stirred while heating at 130° C. for 3 hours under a nitrogen stream.

Next, 110 parts of ethyl acetate and 247 parts of diisopropyl malonate were charged into the reactor and 3 parts of a 28% methanol solution of sodium methoxide was added to the reactor while stirring the contents under a nitrogen stream, and then the contents were stirred at 65° C. for 8 hours. The isocyanate content in the obtained resin solution was 0.11 mol/Kg.

After adding 670 parts of 4-methyl-2-pentanol to the reactor, the solvent was distilled off over a period of 3 hours under reduced pressure conditions while maintaining a reactor temperature of 80° C. to 85° C., to obtain 1010 parts of a blocked polyisocyanate compound (B-12) solution. The simple trap for the removed solvent included 92 parts of isopropanol. The solid concentration of the obtained blocked polyisocyanate compound (B-12) solution was approximately 60%.

Production of Pigment Dispersion

Production Example 15

After adding 42.9 parts of the hydroxyl-containing polyester resin ($A_2$-1) solution obtained in Production Example 2 (solid content: 30 parts), 112 parts of "JR-806" (trade name of Tayca Corp., rutile titanium dioxide), 8 parts of "Ketchen black EC600 J" (trade name of Lion Corp., conductive carbon) and 137.1 parts of deionized water to a mixing vessel, 2-(dimethylamino)ethanol was added and the pH of the contents was adjusted to 8.0 to obtain a mixed solution. Next, the obtained mixed solution and glass beads with diameters of about 1.3 mmϕ as a dispersion medium were added to a wide-mouth glass bottle, the wide-mouth glass bottle was sealed, and a paint shaker was used to disperse the pigment for 4 hours to obtain a pigment dispersion (P-1).

Production Example 16

After then adding 42.9 parts of the hydroxyl-containing polyester resin ($A_2$-1) solution obtained in Production Example 2 (solid content: 30 parts), 120 parts of "JR-806" (trade name of Tayca Corp., rutile titanium dioxide) and 137.1 parts of deionized water to the mixing vessel, 2-(dimethylamino)ethanol was further added and the pH of the contents was adjusted to 8.0 to obtain a mixed solution. Next, the obtained mixed solution and glass beads with diameters of about 1.3 mmϕ as a dispersion medium were added to a wide-mouth glass bottle, the wide-mouth glass bottle was sealed, and a paint shaker was used to disperse the pigment for 4 hours to obtain a pigment dispersion (P-2).

Production of Primer Coating Composition (X)

Production Example 17

After adding 30 parts of a solution of the hydroxyl-containing acrylic resin ($A_1$-1) obtained in Production Example 1 (solid content: 15 parts), 50 parts of "TAKELAC WS5000" (solid content: 15 parts) (trade name of Mitsui Takeda Chemicals, Inc., polyurethane dispersion, silanol group-containing self-crosslinking type, solid content: 30%), 133.3 parts of "SUPERCHLON E-403" (solid content: 40 parts) (trade name of Nippon Paper Group, Inc., aqueous dispersion of chlorinated polypropylene, chlorine content of resin: 15%, solid content: 30%) and 300 parts of the pigment dispersion (P-1) obtained in Production Example 15 to a mixing vessel, the contents were mixed, and then the pH, concentration and viscosity were adjusted with "ACRYSOL ASE-60" (trade name of Rohm & Haas, polyacrylic acid-based thickening agent), 2-(dimethylamino) ethanol and deionized water, to obtain an aqueous primer coating composition (X-1) having a pH of 8.0, a solid concentration of 45% and a viscosity of 40 seconds (Ford cup No. 4, 20° C.)

Production Example 18

After adding 10 parts of a solution of the hydroxyl-containing acrylic resin ($A_1$-1) obtained in Production Example 1 (solid content: 5 parts), 16.7 parts of "DURANATE MFK60X" (solid content: 10 parts) (trade name of Asahi Kasei Corp., active methylene-type blocked polyisocyanate compound, solid content: 60%), 50 parts of "TAKELAC WS5000" (solid content: 15 parts) (trade name of Mitsui Takeda Chemicals, Inc., polyurethane dispersion, silanol group-containing self-crosslinking type, solid content: 30%), 133.3 parts of "SUPERCHLON E-403" (solid content: 40 parts) (trade name of Nippon Paper Group, Inc., aqueous dispersion of chlorinated polypropylene, chlorine content of resin: 15%, solid content: 30%) and 300 parts of the pigment dispersion (P-1) obtained in Production Example 15 to a mixing vessel, the contents were mixed, and then the pH, concentration and viscosity were adjusted with "ACRYSOL ASE-60" (trade name of Rohm & Haas, polyacrylic acid-based thickening agent), 2-(dimethylamino) ethanol and deionized water, to obtain an aqueous primer coating composition (X-2) having a pH of 8.0, a solid concentration of 45% and a viscosity of 40 seconds (Ford cup No. 4, 20° C.)

Production of Hydroxyl-Containing Acrylic Resin Aqueous Dispersion ($A_{11}$)

Production Example 19

After charging 120 parts of deionized water and 0.8 part of "ADEKA REASOAP SR-1025" (trade name of Adeka Corp., emulsifying agent, active ingredient: 25%) into a reactor equipped with a thermometer, thermostat, stirrer, reflux condenser, nitrogen inlet tube and dropper, the contents were stirred in a nitrogen stream and heated to 80° C.

Next, 5% of the total core section monomer emulsion described below and 2.5 parts of a 6% ammonium persulfate aqueous solution were introduced into the reactor, and the mixture was kept at 80° C. for 15 minutes. The remainder of the core section monomer emulsion was then added dropwise into the reactor kept at the same temperature over a period of 3 hours, and upon completion of the dropwise addition the mixture was aged for 1 hour. Next, the shell section monomer emulsion was added dropwise over a period of 1 hour and aged for 1 hour, and the mixture was then cooled to 30° C. while gradually adding 3.8 parts of a 5% 2-(dimethylamino)ethanol aqueous solution to the reactor, and subsequently discharged while filtering with a 100 mesh nylon cloth, to obtain a hydroxyl-containing acrylic resin ($A_{11}$-1) aqueous dispersion with a mean particle diameter of 100 nm and a solid content of 30%. The hydroxyl-containing acrylic resin in the obtained hydroxyl-containing acrylic resin aqueous dispersion ($A_{11}$-1) had an acid value of 17.2 mgKOH/g and a hydroxyl value of 27.2 mgKOH/g.

Core Section Monomer Emulsion:

A core section monomer emulsion was obtained by stirring 54 parts of deionized water, 3.1 parts of "ADEKA REASOAP SR-1025", 1.0 part of allyl methacrylate, 10.0 parts of styrene, 35.0 parts of n-butyl acrylate, 10.0 parts of methyl methacrylate, 20.0 parts of ethyl acrylate and 1.0 part of 2-hydroxyethyl methacrylate.

Shell Section Monomer Emulsion:

A shell section monomer emulsion was obtained by stirring 50 parts of deionized water, 1.8 parts of "ADEKA REASOAP SR-1025", 0.04 part of ammonium persulfate, 5.3 parts of 2-hydroxyethyl acrylate, 2.6 parts of methacrylic acid, 8.0 parts of ethyl acrylate and 7.1 parts of methyl methacrylate.

Production Examples 20 to 24

Hydroxyl-containing acrylic resin aqueous dispersion ($A_{11}$-2) to hydroxyl-containing acrylic resin aqueous dispersion ($A_{11}$-6) were obtained in the same manner as Production Example 19, except for changing the compositions as shown in Table 1.

Hydroxyl-containing acrylic resin aqueous dispersion ($A_{11}$-1) and hydroxyl-containing acrylic resin aqueous dispersion ($A_{11}$-3) to hydroxyl-containing acrylic resin aqueous dispersion ($A_{11}$-6) correspond to the core-shell type hydroxyl-containing acrylic resin aqueous dispersion ($A_{111}$).

Table 1 shows the compositions (parts), solid contents (%), acid values (mgKOH/g) and hydroxyl values (mgKOH/g) of the hydroxyl-containing acrylic resin aqueous dispersions ($A_{11}$-1) to ($A_{11}$-6).

TABLE 1

| Production Example | | | 19 | 20 | 21 | 22 | 23 | 24 |
|---|---|---|---|---|---|---|---|---|
| Hydroxyl-containing acryl resin aqueous dispersion ($A_1$) No. | | | $A_{11}$-1 | $A_{11}$-2 | $A_{11}$-3 | $A_{11}$-4 | $A_{11}$-5 | $A_{11}$-6 |
| Deionized water | | | 120.0 | 120.0 | 120.0 | 120.0 | 120.0 | 120.0 |
| ADEKA REASOAP SR-1025 | | | 0.8 | 0.8 | 0.8 | 0.8 | 0.8 | 0.8 |
| 6% Ammonium persulfate aqueous solution | | | 2.5 | 2.5 | 2.5 | 2.5 | 2.5 | 2.5 |
| Core section monomer emulsion | Deionized water | | 54.0 | 104.0 | 54.0 | 54.0 | 54.0 | 54.0 |
| | ADEKA REASOAP SR-1025 | | 3.1 | 4.9 | 3.1 | 3.1 | 3.1 | 3.1 |
| | Monomer ($I_1$) | AMA | 1.0 | — | 1.0 | — | 1.0 | 1.0 |
| | Monomer Hydrophobic ($I_2$) polymerizable unsaturated monomer | St | 10.0 | 10.0 | — | 10.0 | 10.0 | 10.0 |
| | | nBA | 35.0 | 33.0 | — | 36.0 | 35.0 | 35.0 |
| | | MMA | 10.0 | 18.1 | 45.0 | 10.0 | 10.0 | 10.0 |
| | | EA | 20.0 | 30.0 | 30.0 | 20.0 | 20.0 | 20.0 |
| | | HEMA | 1.0 | 6.3 | 1.0 | 1.0 | 1.0 | 1.0 |
| | | MAAc | — | 2.6 | — | — | — | — |
| Shell section monomer emulsion | Deionized water | | 50.0 | — | 50.0 | 50.0 | 50.0 | 50.0 |
| | ADEKA REASOAP SR-1025 | | 1.8 | — | 1.8 | 1.8 | 1.8 | 1.8 |
| | 6% Ammonium persulfate | | 0.04 | — | 0.04 | 0.04 | 0.04 | 0.04 |
| | Hydroxyl-containing polymerizable unsaturated monomer ($II_1$) | HEMA | 5.3 | — | 5.3 | 5.3 | 5.3 | 5.3 |
| | Carboxyl-containing polymerizable unsaturated monomer ($II_2$) | MAAc | 2.6 | — | 2.6 | 2.6 | 8.0 | 0.1 |
| | Other polymerizable unsaturated monomer ($II_3$) | St | — | — | — | — | — | 1.5 |
| | | nBA | — | — | — | — | — | 1.0 |
| | | MMA | 7.1 | — | 7.1 | 7.1 | 4.0 | 7.1 |
| | | EA | 8.0 | — | 8.0 | 8.0 | 5.7 | 8.0 |
| 5% 2-(Dimethylamino) ethanol aqueous solution | | | 3.8 | 3.8 | 3.8 | 3.8 | 3.8 | 3.8 |
| Solid concentration [%] | | | 30.0 | 30.0 | 30.0 | 30.0 | 30.0 | 30.0 |
| Acid value [mgKOH/g] | | | 17.2 | 17.2 | 17.2 | 17.2 | 52.2 | 0.65 |
| Hydroxyl group value [mgKOH/g] | | | 27.2 | 27.2 | 27.2 | 27.2 | 27.2 | 27.2 |

The symbols in Table 1 have the following meanings.
AMA: Allyl methacrylate
St: Styrene
nBA: n-Butyl acrylate
MMA: Methyl methacrylate
EA: Ethyl acrylate
HEMA: 2-Hydroxyethyl methacrylate
MAAc: Methacrylic acid Production of Hydroxyl-Containing Polyester Resin ($A_2$)

Production Example 25

After charging 109 parts of trimethylolpropane, 141 parts of 1,6-hexanediol, 146 parts of hexahydrophthalic anhydride and 139 parts of adipic acid into a reactor equipped with a thermometer, thermostat, stirrer, reflux condenser and water separator, and heating between 160° C. and 230° C. for a period of 3 hours, condensation reaction was conducted at 230° C. for 4 hours. Next, 28.8 parts of trimellitic anhydride was further added to the obtained condensation reaction product, and reaction was conducted at 170° C. for 30 minutes to introduce carboxyl groups into the condensation reaction product. The condensation reaction product was then diluted with 2-ethyl-1-hexanol, to obtain a hydroxyl-containing polyester resin ($A_2$-2) with a solid concentration of 70%. The obtained hydroxyl-containing polyester resin ($A_2$-2) had an acid value of 45 mgKOH/g, a hydroxyl value of 100 mgKOH/g and a number-average molecular weight of 2,500.

Production of Luster Pigment Dispersion (AL)

Production Example 26

A luster pigment dispersion (AL) was obtained by adding 19 parts of the aluminum pigment paste "GX-180A" (trade name of Asahi Kasei Metals Co., Ltd., metal content: 74%), 34.8 parts of 2-ethyl-1-hexanol, 8 parts of a solution of a phosphate group-containing resin (PR-1)(*1) and 0.2 part of 2-(dimethylamino)ethanol into a mixing vessel, and uniformly mixing them.

(*1) Solution of Phosphate Group-Containing Dispersed Resin (PR-1):

After adding a mixed solvent comprising 27.5 parts of methoxypropanol and 27.5 parts of isobutanol into a reactor equipped with a thermometer, thermostat, stirrer, reflux condenser, nitrogen inlet tube and dropper and heating the reactor to 110° C., 121.5 parts of a mixture comprising 25 parts of styrene, 27.5 parts of n-butyl methacrylate, 20 parts of "Isostearyl Acrylate" (trade name of Osaka Organic Chemical Industry, Ltd., branched higher alkyl acrylate), 7.5 parts of 4-hydroxybutyl acrylate, 15 parts of a phosphate group-containing polymerizable unsaturated monomer (*2), 12.5 parts of 2-methacryloyloxyethyl acid phosphate, 10 parts of isobutanol and 4 parts of tert-butyl peroxyoctanoate was added to the reactor over a period of 4 hours.

Next, a mixture comprising 0.5 part of tert-butyl peroxyoctanoate and 20 parts of isopropanol was added dropwise to the reactor over a period of one hour. Next, the contents were aged while stirring for 1 hour, to obtain a solution of a phosphate group-containing dispersed resin (PR-1) with a solid concentration of 50%. The phosphate group-containing dispersed resin (PR-1) had a phosphate group-derived acid value of 83 mgKOH/g, a hydroxyl value of 29 mgKOH/g and a weight-average molecular weight of 10,000.

(*2) Phosphate Group-Containing Polymerizable Unsaturated Monomer:

After placing 57.5 parts of monobutylphosphoric acid and 41 parts of isobutanol in a reactor equipped with a thermometer, thermostat, stirrer, reflux condenser, nitrogen inlet tube and dropper, the reactor was heated to 90° C., and 42.5 parts of glycidyl methacrylate was added to the reactor dropwise over a period of 2 hours, and then the contents were stirred for 1 hour for ageing. Next, 59 parts of isopropanol was added to the reactor to obtain a phosphate group-containing polymerizable unsaturated monomer solution with a solid concentration of 50%. The obtained phosphate group-containing polymerizable unsaturated monomer had a phosphate group-derived acid value of 285 mgKOH/g.

Production of Aqueous Colored Coating Composition ($Y_1$)

Production Example 27

After placing 133.3 parts of the hydroxyl-containing acrylic resin aqueous dispersion ($A_{11}$-1) obtained in Production Example 19 (solid content: 40 parts), 51.4 parts of a solution of the hydroxyl-containing polyester resin ($A_2$-2) obtained in Production Example 25 (solid content: 36 parts), 33.4 parts of a solution of the blocked polyisocyanate compound (B-1) obtained in Production Example 3 (solid content: 20 parts), 62 parts of the luster pigment dispersion (AL) obtained in Production Example 26 and 10 parts of 2-ethyl-1-hexanol in a mixing vessel, the contents were uniformly mixed and the pH, solid concentration and viscosity were adjusted with "ACRYSOL ASE-60", 2-(dimethylamino)ethanol and deionized water to obtain an aqueous colored coating composition ($Y_1$-1) having a pH of 8.0, a solid concentration of 25% and a viscosity of 40 seconds (Ford cup No. 4, 20° C.)

Production Examples 28 to 46

Aqueous colored coating composition ($Y_1$-2) to aqueous colored coating composition ($Y_1$-20) were obtained in the same manner as Production Example 27, except that the compositions were changed as shown in Table 2 below.

Production Example 47

After placing 133.3 parts of the hydroxyl-containing acrylic resin aqueous dispersion ($A_{11}$-1) obtained in Production Example 19 (solid content: 40 parts), 34.3 parts of a solution of the hydroxyl-containing polyester resin ($A_2$-2) obtained in Production Example 25 (solid content: 24 parts), 41.7 parts of a solution of the blocked polyisocyanate compound (B-1) obtained in Production Example 3 (solid content: 25 parts), 240 parts of the pigment dispersion (P-2) obtained in Production Example 16 and 10 parts of 2-ethyl-1-hexanol in a mixing vessel, the contents were uniformly mixed and the pH, solid concentration and viscosity were adjusted with "ACRYSOL ASE-60", 2-(dimethylamino)ethanol and deionized water to obtain an aqueous colored coating composition ($Y_2$-1) having a pH of 8.0, a solid concentration of 45% and a viscosity of 60 seconds (Ford cup No. 4, 20° C.)

Production Example 48

Aqueous colored coating composition ($Y_2$-2) was obtained in the same manner as Production Example 47, except that the composition was changed as shown in Table 2 below.

The numerals in Table 2 all indicate solid content amounts.

TABLE 2

| Production Example | | | 27 | 28 | 29 | 30 | 31 | 32 | 33 | 34 | 35 | 36 | 37 |
|---|---|---|---|---|---|---|---|---|---|---|---|---|---|
| Aqueous colored coating composition (Y) | | | $Y_1$-1 | $Y_1$-2 | $Y_1$-3 | $Y_1$-4 | $Y_1$-5 | $Y_1$-6 | $Y_1$-7 | $Y_1$-8 | $Y_1$-9 | $Y_1$-10 | $Y_1$-11 |
| Hydroxyl-containing resin (A) | Hydroxyl-containing acryl resin aqueous dispersion ($A_{11}$) | Type Amount | $A_{11}$-1 40 | $A_{11}$-1 40 | $A_{11}$-1 40 | $A_{11}$-1 40 | $A_{11}$-1 40 | $A_{11}$-1 40 | $A_{11}$-1 40 | $A_{11}$-1 40 | — | $A_{11}$-2 40 | $A_{11}$-3 40 |
| | Hydroxyl-containing polyester resin ($A_2$) | Type Amount | $A_2$-2 36 | $A_2$-2 36 | $A_2$-2 36 | $A_2$-2 36 | $A_2$-2 36 | $A_2$-2 36 | $A_2$-2 36 | $A_2$-2 36 | $A_2$-2 76 | $A_2$-2 36 | $A_2$-2 36 |
| Blocked polyisocyanate compound (B) | | Type Amount | B-1 20 | B-2 20 | B-3 20 | B-4 20 | B-5 20 | B-6 20 | B-11 20 | B-12 20 | B-1 20 | B-1 20 | B-1 20 |
| Melamine resin | SAIMEL 325 | | — | — | — | — | — | — | — | — | — | — | — |
| Luster pigment dispersion (AL) | Dispersed resin | PR-1 | 4.0 | 4.0 | 4.0 | 4.0 | 4.0 | 4.0 | 4.0 | 4.0 | 4.0 | 4.0 | 4.0 |
| | Aluminum pigment | GX-180A | 14.0 | 14.0 | 14.0 | 14.0 | 14.0 | 14.0 | 14.0 | 14.0 | 14.0 | 14.0 | 14.0 |
| Pigment dispersion (P-2) | Dispersed resin | $A_2$-1 | — | — | — | — | — | — | — | — | — | — | — |
| | Titanium white | JR-806 | — | — | — | — | — | — | — | — | — | — | — |

| Production Example | | | 38 | 39 | 40 | 41 | 42 | 43 | 44 | 45 | 46 | 47 | 48 |
|---|---|---|---|---|---|---|---|---|---|---|---|---|---|
| Aqueous colored coating composition (Y) | | | $Y_1$-12 | $Y_1$-13 | $Y_1$-14 | $Y_1$-15 | $Y_1$-16 | $Y_1$-17 | $Y_1$-18 | $Y_1$-19 | $Y_1$-20 | $Y_2$-1 | $Y_2$-2 |
| Hydroxyl-containing resin (A) | Hydroxyl-containing acryl resin aqueous dispersion ($A_{11}$) | Type Amount | $A_{11}$-4 40.0 | $A_{11}$-5 40.0 | $A_{11}$-6 40.0 | $A_{11}$-1 40.0 | $A_{11}$-1 40.0 | $A_{11}$-1 40.0 | $A_{11}$-1 40.0 | $A_{11}$-1 40.0 | $A_{11}$-1 40.0 | $A_{11}$-1 40.0 | $A_{11}$-1 40.0 |
| | Hydroxyl-containing polyester resin ($A_2$) | Type Amount | $A_2$-2 36.0 | $A_2$-2 36.0 | $A_2$-2 36.0 | $A_2$-2 36.0 | $A_2$-2 36.0 | $A_2$-2 36.0 | $A_2$-2 36.0 | $A_2$-2 36.0 | $A_2$-2 36.0 | $A_2$-2 24.0 | $A_2$-2 24.0 |
| Blocked polyisocyanate compound (B) | | Type Amount | B-1 20.0 | B-1 20.0 | B-1 20.0 | B-1 10.0 | — | B-7 20.0 | B-8 20.0 | B-9 20.0 | B-10 20.0 | B-1 25.0 | — |
| Melamine resin | SAIMEL 325 | | — | — | — | 10.0 | 20.0 | — | — | — | — | — | 25.0 |
| Luster pigment dispersion (AL) | Dispersed resin | PR-1 | 4.0 | 4.0 | 4.0 | 4.0 | 4.0 | 4.0 | 4.0 | 4.0 | 4.0 | — | — |
| | Aluminum pigment | GX-180A | 14.0 | 14.0 | 14.0 | 14.0 | 14.0 | 14.0 | 14.0 | 14.0 | 14.0 | — | — |
| Pigment dispersion (P-2) | Dispersed resin | $A_2$-1 | — | — | — | — | — | — | — | — | — | 11.0 | 11.0 |
| | Titanium white | JR-806 | — | — | — | — | — | — | — | — | — | 96.0 | 96.0 |

Example 1

A degreased polypropylene board (PP board) was air spray coated with the primer coating composition (X-1) obtained in Production Example 17 to a cured film thickness of 15 μm, and an uncured primer coating film was formed on the PP board. The PP board with an uncured primer coating film was allowed to stand for 3 minutes and then preheated at 60° C. for 3 minutes. Next, the PP board with an uncured primer coating film was coated with the aqueous colored coating composition ($Y_1$-1) obtained in Production Example 27 to a cured film thickness of 15 μm using an electrostatic rotary atomizing coater, and an uncured base coat coating film was formed thereon.

The PP board with an uncured base coat coating film was allowed to stand for 5 minutes and then preheated at 60° C. for 5 minutes. The PP board with an uncured base coat coating film was coated with the clear coating composition "SOFLEX #520 CLEAR" (trade name of Kansai Paint Co., Ltd., polyisocyanate compound-containing two-pack acrylurethane-based organic solvent-type clear coating composition, hereunder also referred to as "clear coating composition (Z-1)") to a cured film thickness of 35 μm using an electrostatic rotary atomizing coater, and an uncured clear coating film was formed thereon. The PP board with an uncured clear coating film was allowed to stand for 7 minutes and then heated at 80° C. for 30 minutes, thereby curing the primer coating film, base coating film and base coating film to fabricate a test sheet.

Examples 2 to 15 and Comparative Examples 1 to 5

Test sheets were fabricated in the same manner as Example 1, except that the aqueous colored coating composition ($Y_1$-1) was changed to one of aqueous colored coating composition ($Y_1$-2) to aqueous colored coating composition ($Y_1$-20), as shown in Table 3 and Table 4.

Example 16

A test sheet was fabricated in the same manner as Example 1, except that the clear coating composition (Z-1) was changed to "MAGICRON TC-71" (trade name of Kansai Paint Co., Ltd., thermosetting clear coating composition comprising a hydroxyl-containing acrylic resin and a melamine resin) (hereunder also referred to as "clear coating composition (Z-2)"), as shown in Table 3.

Examples 17 and 18

Test sheets were fabricated in the same manner as Example 1, except that the baking temperature was changed to 70° C. or 115° C., as shown in Table 3.

Example 19

A test sheet was fabricated in the same manner as Example 1, except that the primer coating composition (X-1) was changed to primer coating composition (X-2), as shown in Table 3.

Example 20

A degreased polypropylene board (PP board) was air spray coated with the primer coating composition (X-1) obtained in Production Example 17 to a cured film thickness of 20 μm, and an uncured primer coating film was formed on the PP board. The PP board with an uncured primer coating film was allowed to stand for 3 minutes and then preheated at 60° C. for 3 minutes. Next, the PP board with an uncured primer coating film was coated with the aqueous colored coating composition ($Y_2$-1) obtained in Production Example 47 to a cured film thickness of 35 μm using an electrostatic rotary atomizing coater, and an uncured top coating film was formed thereon. The PP board with an uncured top coating film was allowed to stand for 3 minutes and then preheated at 60° C. for 3 minutes and heated at 80° C. for 30 minutes, for curing of the uncured primer coating film and the uncured top coating film, to fabricate a test coated sheet.

Comparative Example 6

A test sheet was fabricated in the same manner as Example 20, except that the aqueous colored coating composition ($Y_2$-1) was changed to aqueous colored coating composition ($Y_2$-2), as shown in Table 4.

Example 21

A zinc phosphate treated cold-rolled steel sheet was electrodeposited with a thermosetting epoxy resin-based cation electrodeposition coating composition (trade name: "ELECRON GT-10" by Kansai Paint Co., Ltd.) to a cured film thickness of 20 μm, and then the cold-rolled steel sheet with the electrodeposition coating was heated at 170° C. for 30 minutes for curing. The cold-rolled steel sheet with the electrodeposition coating was coated with a primer coating composition (trade name: "TP-65-5" by Kansai Paint Co., Ltd., polyester resin/amino resin-based organic solvent-type coating composition) to a cured film thickness of 20 μm using an electrostatic rotary atomizing coater, and an uncured primer coating film was formed thereon.

After allowing the cold-rolled steel sheet with the uncured primer coating film to stand for 5 minutes, it was preheated at 80° C. for 5 minutes and then for 7 minutes, after which the cold-rolled steel sheet with an uncured primer coating film was coated with the aqueous colored coating composition ($Y_1$-1) obtained in Production Example 27 to a cured film thickness of 15 μm using an electrostatic rotary atomizing coater, and an uncured base coat coating film was formed thereon.

After allowing the cold-rolled steel sheet with the uncured base coat coating film to stand for 5 minutes, it was preheated at 60° C. for 5 minutes, and then the cold-rolled steel sheet with the uncured base coat coating film was coated with a clear coating composition (Z-1) to a cured film thickness of 35 μm using an electrostatic rotary atomizing coater, and an uncured clear coating film was formed thereon. The cold-rolled steel sheet with the uncured clear coating film was allowed to stand for 7 minutes and then heated at 115° C. for 30 minutes, for curing of the uncured primer coating film, the uncured base coat coating film and the uncured clear coating film, to fabricate a test sheet.

Comparative Example 7

A test sheet was fabricated in the same manner as Example 21, except that the aqueous colored coating composition ($Y_1$-1) was changed to aqueous colored coating composition ($Y_1$-16), as shown in Table 4.

Example 22

A zinc phosphate treated cold-rolled steel sheet was electrodeposited with a thermosetting epoxy resin-based cation electrodeposition coating composition (trade name: "ELECRON GT-10" by Kansai Paint Co., Ltd.) to a cured film thickness of 20 μm, and then the cold-rolled steel sheet with the electrodeposition coating was heated at 170° C. for 30 minutes for curing. The cold-rolled steel sheet with the electrodeposition coating was coated with a primer coating composition (trade name: "TP-65-5" by Kansai Paint Co., Ltd.) to a cured film thickness of 20 μm using an electrostatic rotary atomizing coater, and an uncured primer coating film was formed thereon.

After allowing the cold-rolled steel sheet with the uncured primer coating film to stand for 5 minutes, it was preheated at 80° C. for 5 minutes and then for 7 minutes, after which the cold-rolled steel sheet with an uncured primer coating film was coated with the aqueous colored coating composition ($Y_2$-1) obtained in Production Example 47 to a cured film thickness of 35 μm using an electrostatic rotary atomizing coater, and an uncured top coating film was formed thereon. The cold-rolled steel sheet with the uncured top coating film was allowed to stand for 3 minutes and then preheated at 60° C. for 3 minutes and heated at 115° C. for 30 minutes, for curing of the uncured primer coating film and the uncured top coating film, to fabricate a test coated sheet.

Comparative Example 8

A test sheet was fabricated in the same manner as Example 22, except that the aqueous colored coating composition ($Y_2$-1) was changed to aqueous colored coating composition ($Y_2$-2), as shown in Table 4.

Example 23

A zinc phosphate treated cold-rolled steel sheet was electrodeposited with a thermosetting epoxy resin-based cation electrodeposition coating composition (trade name: "ELECRON GT-10" by Kansai Paint Co., Ltd.) to a cured film thickness of 20 μm, and then the cold-rolled steel sheet with the electrodeposition coating was heated at 170° C. for 30 minutes for curing. Next, the cold-rolled steel sheet with the electrodeposition coating was coated with the aqueous colored coating composition ($Y_1$-1) obtained in Production Example 27 to a cured film thickness of 20 μm using an electrostatic rotary atomizing coater, and an uncured base coat coating film was formed thereon.

After allowing the cold-rolled steel sheet with the uncured base coat coating film to stand for 3 minutes, it was preheated at 60° C. for 3 minutes, and then the cold-rolled steel sheet with the uncured base coat coating film was coated with a clear coating composition (Z-1) to a cured film thickness of 35 μm using an electrostatic rotary atomizing coater, and an uncured clear coating film was formed thereon. The cold-rolled steel sheet with the uncured clear coating film was allowed to stand for 3 minutes and then preheated at 60° C. for 3 minutes and heated at 115° C. for 30 minutes, for curing of the uncured base coat coating film and the uncured clear coating film, to fabricate a test coated sheet.

Comparative Example 9

A test sheet was fabricated in the same manner as Example 23, except that the aqueous colored coating composition ($Y_1$-1) was changed to aqueous colored coating composition ($Y_1$-16), as shown in Table 4.

[Evaluation]

Each of the test sheets obtained in Examples 1 to 23 and Comparative Examples 1 to 9 was evaluated by the following test method. The results are summarized in Table 3 and Table 4.

[Test Methods]

Smoothness:

Each test sheet was scanned with a "Wave Scan DOI" (trade name of BYK Gardner) and evaluated based on the measured value of Wc. A smaller value for Wc means higher smoothness of the coating surface.

Distinctness of Image:

Each test sheet was scanned with a "Wave Scan DOI" (trade name of BYK Gardner) and evaluated based on the measured value of Wa. A smaller value for Wa means higher distinctness of image of the coating surface.

Adhesion after Water Resistance Test (Initial):

Each test sheet was immersed for 240 hours in warm water at 40° C. and then raised and dried at 20° C. for 12 hours, after which the multilayer coating film of the test sheet was notched in a lattice-like manner with a cutter reaching to the basis material, to form 100 square grids with sizes of 2 mm×2 mm. Next, cellophane tape was attached to the surface and the cellophane tape was abruptly peeled off at 20° C., after which the residual state of the square grid coating film was examined and evaluated according to the following scale.

VG: 100 of the square grid coating films remained, with no chipping of the edges of the coating films at the edges of the cutter notches.

G: 100 of the square grid coating films remained, but edges of the coating films at the edges of the cutter notches were chipped.

F: 90-99 of the square grid coating films remained.

P: 89 or fewer of the square grid coating films remained.

Adhesion after Water Resistance Test (after Storage):

Each aqueous colored coating composition (Y) was used after storage for 1 month at 40° C., to fabricate a test sheet with a multilayer coating film. Each test sheet was immersed for 240 hours in warm water at 40° C. and then raised and dried at 20° C. for 12 hours, after which the multilayer coating film of the test sheet was notched in a lattice-like manner with a cutter reaching to the basis material, to form 100 square grids with sizes of 2 mm×2 mm. Cellophane tape was attached to the surface and the cellophane tape was abruptly peeled off at 20° C., after which the residual state of the square grid coating film was examined and evaluated according to the following scale.

VG: 100 of the square grid coating films remained, with no chipping of the edges of the coating films at the edges of the cutter notches.

G: 100 of the square grid coating films remained, but edges of the coating films at the edges of the cutter notches were chipped.

F: 90-99 of the square grid coating films remained.

P: 89 or fewer of the square grid coating films remained.

TABLE 3

| | | Coated article | Method of forming a multilayer coating film (Method No.) | Primer coating composition | Aqueous colored coating composition | Clear coating composition | Baking temperature (° C.) | Smoothness | Distinctness of image | Adhesion after water resistance test (initial) | Adhesion after water resistance test (after storage) |
|---|---|---|---|---|---|---|---|---|---|---|---|
| Example | 1 | PP | 1 | X-1 | $Y_1$-1 | Z-1 | 80 | 8 | 8 | VG | G |
| | 2 | PP | 1 | X-1 | $Y_1$-2 | Z-1 | 80 | 9 | 9 | G | F-G |
| | 3 | PP | 1 | X-1 | $Y_1$-3 | Z-1 | 80 | 9 | 9 | G | F-G |
| | 4 | PP | 1 | X-1 | $Y_1$-4 | Z-1 | 80 | 9 | 9 | G | F-G |
| | 5 | PP | 1 | X-1 | $Y_1$-5 | Z-1 | 80 | 8 | 9 | G | G |
| | 6 | PP | 1 | X-1 | $Y_1$-6 | Z-1 | 80 | 8 | 9 | G | G |
| | 7 | PP | 1 | X-1 | $Y_1$-7 | Z-1 | 80 | 8 | 7 | VG | VG |
| | 8 | PP | 1 | X-1 | $Y_1$-8 | Z-1 | 80 | 8 | 7 | VG | VG |
| | 9 | PP | 1 | X-1 | $Y_1$-9 | Z-1 | 80 | 9 | 8 | F-G | F-G |
| | 10 | PP | 1 | X-1 | $Y_1$-10 | Z-1 | 80 | 9 | 9 | F-G | F-G |
| | 11 | PP | 1 | X-1 | $Y_1$-11 | Z-1 | 80 | 8 | 9 | G | G |
| | 12 | PP | 1 | X-1 | $Y_1$-12 | Z-1 | 80 | 9 | 8 | F-G | F-G |
| | 13 | PP | 1 | X-1 | $Y_1$-13 | Z-1 | 80 | 9 | 8 | G | F-G |
| | 14 | PP | 1 | X-1 | $Y_1$-14 | Z-1 | 80 | 9 | 9 | G | F-G |
| | 15 | PP | 1 | X-1 | $Y_1$-15 | Z-1 | 80 | 8 | 9 | G | F-G |
| | 16 | PP | 1 | X-1 | $Y_1$-1 | Z-2 | 115 | 9 | 9 | G | F-G |
| | 17 | PP | 1 | X-1 | $Y_1$-1 | Z-1 | 115 | 8 | 9 | VG | G |
| | 18 | PP | 1 | X-1 | $Y_1$-1 | Z-1 | 70 | 8 | 8 | G | F-G |
| | 19 | PP | 1 | X-2 | $Y_1$-1 | Z-1 | 80 | 8 | 9 | G | G |
| | 20 | PP | 2 | X-1 | $Y_2$-1 | — | 80 | 9 | 9 | F-G | F-G |
| | 21 | Steel sheet | 1 | TP65-5 | $Y_1$-1 | Z-1 | 115 | 8 | 9 | VG | G |
| | 22 | Steel sheet | 2 | TP65-5 | $Y_2$-1 | — | 115 | 9 | 9 | G | F-G |
| | 23 | Steel sheet | 3 | — | $Y_1$-1 | Z-1 | 115 | 9 | 9 | G | F-G |

TABLE 4

|  |  | Coated article | Method of forming a multilayer coating film (Method No.) | Primer coating composition | Aqueous colored coating composition | Clear coating composition | Baking temperature (° C.) | Smoothness | Distinctness of image | Adhesion after water resistance test (initial) | Adhesion after water resistance test (after storage) |
|---|---|---|---|---|---|---|---|---|---|---|---|
| Comp. Example | 1 | PP | 1 | X-1 | $Y_1$-16 | Z-1 | 80 | 9 | 9 | P | P |
|  | 2 | PP | 1 | X-1 | $Y_1$-17 | Z-1 | 80 | 10 | 12 | F | F |
|  | 3 | PP | 1 | X-1 | $Y_1$-18 | Z-1 | 80 | 10 | 12 | F | F |
|  | 4 | PP | 1 | X-1 | $Y_1$-19 | Z-1 | 80 | 10 | 12 | F | F |
|  | 5 | PP | 1 | X-1 | $Y_1$-20 | Z-1 | 80 | 10 | 12 | F | F |
|  | 6 | PP | 2 | X-1 | $Y_2$-2 | — | 80 | 10 | 10 | P | P |
|  | 7 | Steel sheet | 1 | TP65-5 | $Y_1$-16 | Z-1 | 115 | 9 | 9 | F | P |
|  | 8 | Steel sheet | 2 | TP65-5 | $Y_2$-2 | — | 115 | 10 | 10 | P | P |
|  | 9 | Steel sheet | 3 | — | $Y_1$-16 | Z-1 | 115 | 11 | 10 | F | P |

The present disclosure relates to the following aspects J1 to J14.

[J1]

A method of forming a multilayer coating film comprising the following steps 1-1 to 1-4:

step 1-1: a step of coating an article to be coated with a primer coating composition (X) and forming an uncured primer coating film on the article to be coated, step 1-2: a step of coating the article to be coated having the uncured primer coating film with an aqueous colored coating composition ($Y_1$) for a base coat, to form an uncured base coat coating film thereover, step 1-3: a step of coating the article to be coated having the uncured primer coating film and uncured base coat coating film, with a clear coating composition (Z), and forming an uncured clear coating film thereover, and step 1-4: a step of curing the uncured primer coating film, the uncured base coat coating film and the uncured clear coating film by heating them, wherein the aqueous colored coating composition ($Y_1$) comprises a hydroxyl-containing resin (A), and a blocked polyisocyanate compound (B) having at least one blocked isocyanate group selected from the group consisting of blocked isocyanate groups represented by the following formula (I):

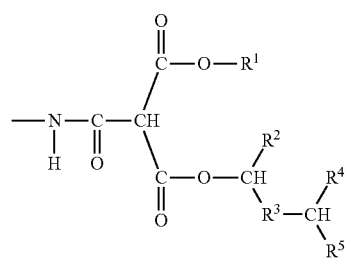

wherein $R^1$, $R^2$, $R^4$ and $R^5$ independently represent a C1-12 hydrocarbon group, and $R^3$ represents a C1-12 straight-chain or branched alkylene group, blocked isocyanate groups represented by the following formula (II):

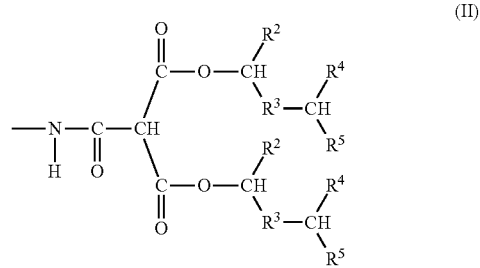

wherein $R^2$, $R^3$, $R^4$ and $R^5$ have the same definitions as above, and blocked isocyanate groups represented by the following formula (III):

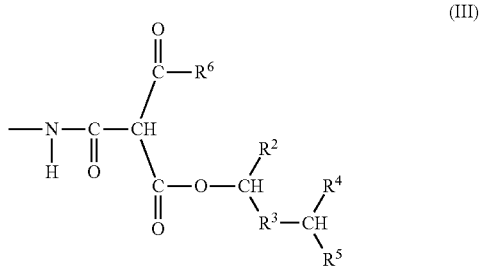

wherein $R^2$, $R^3$, $R^4$ and $R^5$ have the same definitions as above, and $R^6$ represents a C1-12 hydrocarbon group.

[J2]

A method of forming a multilayer coating film comprising the following steps 2-1, 2-2 and 2-3:

step 2-1: a step of coating an article to be coated with a primer coating composition (X) and forming an uncured primer coating film on the article to be coated, step 2-2: a step of coating the article to be coated having the uncured primer coating film with an aqueous colored coating composition ($Y_2$) for a top coating film, and forming an uncured top coating film thereover, step 2-3: a step of curing the uncured primer coating film and uncured top coating film by heating them, wherein the aqueous colored coating composition ($Y_2$) comprises a hydroxyl-containing resin (A), and a blocked polyisocyanate compound (B) having at least one blocked isocyanate group selected from the group consisting of blocked isocyanate groups represented by the following formula (I):

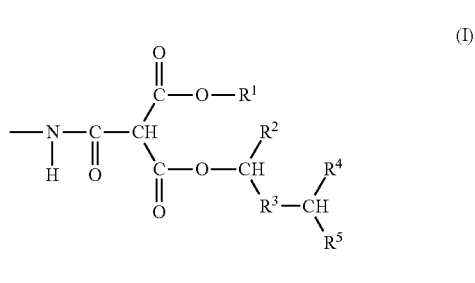

wherein $R^1$, $R^2$, $R^4$ and $R^5$ independently represent a C1-12 hydrocarbon group, and $R^3$ represents an approximately C1-12 straight-chain or branched alkylene group, blocked isocyanate groups represented by the following formula (II):

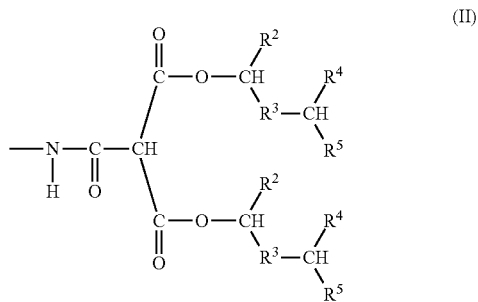

wherein $R^2$, $R^3$, $R^4$ and $R^5$ have the same definitions as above,
and blocked isocyanate groups represented by the following formula (III):

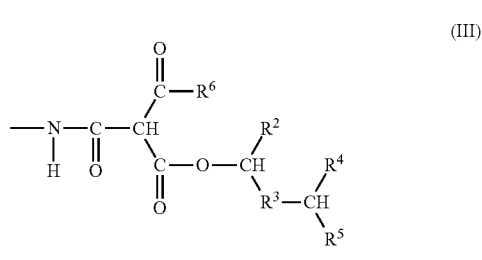

wherein $R^2$, $R^3$, $R^4$ and $R^5$ have the same definitions as above, and $R^6$ represents a C1-12 hydrocarbon group.

[J3]

A method of forming a multilayer coating film comprising the following steps 3-1, 3-2 and 3-3:

step 3-1: a step of coating an article to be coated with an aqueous colored coating composition ($Y_1$) for a base coat and forming an uncured base coat coating film on the article to be coated, step 3-2: a step of coating the article to be coated having the uncured base coat coating film with a clear coating composition (Z), and forming a clear coating film thereover, step 3-3: a step of curing the uncured base coat coating film and uncured clear coating film by heating them, wherein the aqueous colored coating composition ($Y_1$) comprises a hydroxyl-containing resin (A), and a blocked polyisocyanate compound (B) having at least one blocked isocyanate group selected from the group consisting of blocked isocyanate groups represented by the following formula (I):

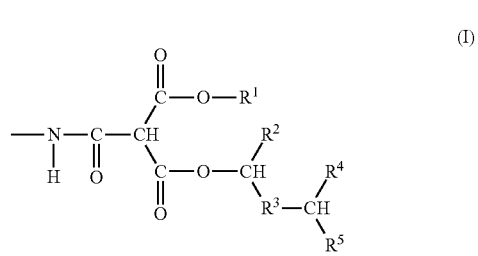

wherein $R^1$, $R^2$, $R^4$ and $R^5$ independently represent a C1-12 hydrocarbon group, and $R^3$ represents a C1-12 straight-chain or branched alkylene group, blocked isocyanate groups represented by the following formula (II):

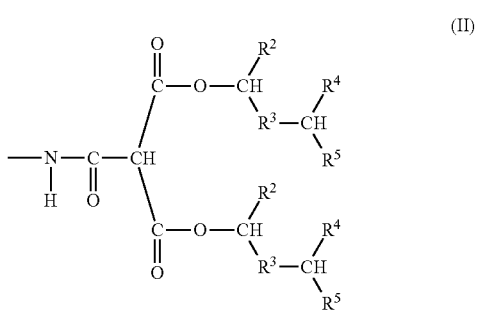

wherein $R^2$, $R^3$, $R^4$ and $R^5$ have the same definitions as above,
and blocked isocyanate groups represented by the following formula (III):

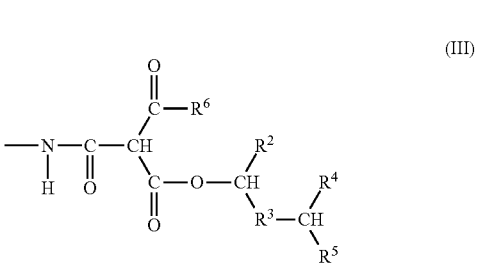

wherein $R^2$, $R^3$, $R^4$ and $R^5$ have the same definitions as above, and $R^6$ represents a C1-12 hydrocarbon group.

[J4]

The method according to any one of J1 to J3, wherein $R^1$ in formula (I) is an isopropyl group.

[J5]

The method according to any one of J1 to J4, wherein $R^6$ in formula (III) is an isopropyl group.

[J6]

The method according to any one of J1 to J5, wherein the blocked polyisocyanate compound (B) is obtained by reacting a blocked polyisocyanate compound precursor ($b_{31}$) having a blocked isocyanate group represented by the following formula (IV):

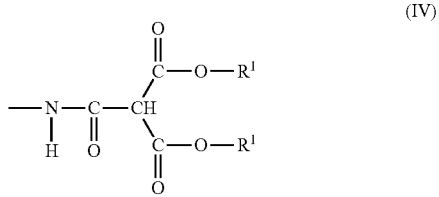

wherein the $R^1$ groups are as defined above, and each $R^1$ group may be the same or different,
with a secondary alcohol ($b_4$) represented by the following formula (VI):

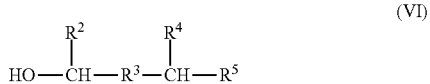

wherein $R^2$, $R^3$, $R^4$ and $R^5$ are as defined above.

[J7]

The method according to any one of J1 to J6, wherein the blocked polyisocyanate compound (B) is obtained by reacting a blocked polyisocyanate compound precursor ($b_{32}$) having a blocked isocyanate group represented by the following formula (V)):

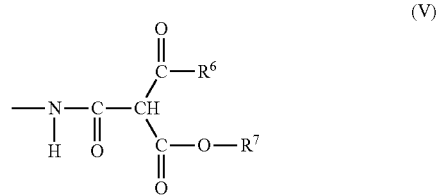

wherein $R^6$ is as defined above, and $R^7$ represents a C1-12 hydrocarbon group,
with a secondary alcohol ($b_4$).

[J8]

The method according to any one of J1 to J7, wherein the blocked polyisocyanate compound (B) is a blocked polyisocyanate compound (B') having a hydrophilic group.

[J9]

The method according to any one of J1 to J8, wherein the hydroxyl-containing resin (A) contains a hydroxyl-containing acrylic resin aqueous dispersion ($A_{11}$).

[J10]

The method according to any one of J1 to J9, wherein the aqueous colored coating composition ($Y_1$) or aqueous colored coating composition ($Y_2$) contains the hydroxyl-containing resin (A) and the blocked polyisocyanate compound (B) at 10 to 95 parts by mass and 5 to 90 parts by mass, respectively, based on a total of 100 parts by solid mass of the hydroxyl-containing resin (A) and the blocked polyisocyanate compound (B).

[J11]

The method according to any one of J1 to J10, wherein the aqueous colored coating composition ($Y_1$) or aqueous colored coating composition ($Y_2$) further contains a melamine resin (C), and the aqueous colored coating composition ($Y_1$) or aqueous colored coating composition ($Y_2$) contains the hydroxyl-containing resin (A), blocked polyisocyanate compound (B) and melamine resin (C) at 10 to 90 parts by mass, 5 to 85 parts by mass and 5-40 parts by mass, respectively, based on a total of 100 parts by solid mass of the hydroxyl-containing resin (A), the blocked polyisocyanate compound (B) and the melamine resin (C).

[J12]

The method according to any one of J1 to J11, wherein the clear coating composition (Z) contains a polyisocyanate compound with a non-blocked isocyanate group.

[J13]

The method according to any one of J1 to J12, wherein the step of curing is carried out at a temperature of 70° C. or higher and below 120° C.

[J14]

A coated article having a multilayer coating film formed by the method according to any one of J1 to J13.

The invention claimed is:

1. A method of forming a multilayer coating film comprising the following steps 1-1 to 1-4:

step 1-1: a step of coating an article to be coated with a primer coating composition (X) and forming an uncured primer coating film on the article to be coated, step 1-2: a step of coating the article to be coated having the uncured primer coating film with an aqueous colored coating composition ($Y_1$) for a base coat, to form an uncured base coat coating film thereover, step 1-3: a step of coating the article to be coated having the uncured primer coating film and uncured base coat coating film, with a clear coating composition (Z), and forming an uncured clear coating film thereover, and step 1-4: a step of curing the uncured primer coating film, the uncured base coat coating film and the uncured clear coating film by heating them, wherein the aqueous colored coating composition ($Y_1$) comprises a hydroxyl-containing resin (A), and a blocked polyisocyanate compound (B) having at least one blocked isocyanate group selected from the group consisting of blocked isocyanate groups represented by the following formula (I):

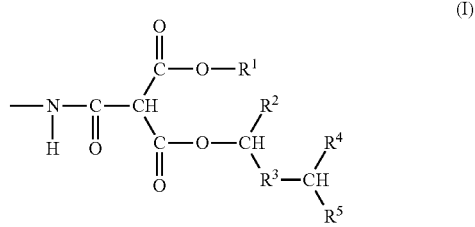

wherein $R^1$, $R^2$, $R^4$ and $R^5$ independently represent a C1-12 hydrocarbon group, and $R^3$ represents a C1-12 straight-chain or branched alkylene group, blocked isocyanate groups represented by the following formula (II):

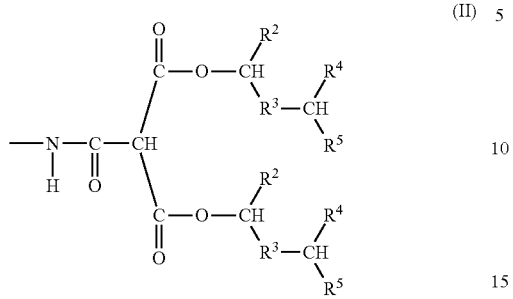

wherein $R^2$, $R^3$, $R^4$ and $R^5$ have the same definitions as above, and blocked isocyanate groups represented by the following formula (III):

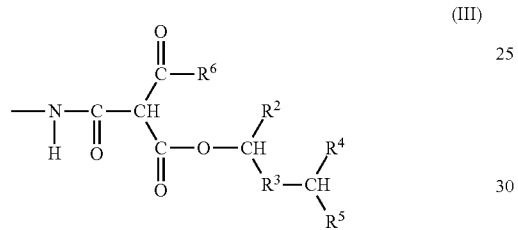

wherein $R^2$, $R^3$, $R^4$ and $R^5$ have the same definitions as above, and $R^6$ represents a C1-12 hydrocarbon group.

2. A method of forming a multilayer coating film comprising the following steps 2-1, 2-2 and 2-3:
   step 2-1: a step of coating an article to be coated with a primer coating composition (X) and forming an uncured primer coating film on the article to be coated,
   step 2-2: a step of coating the article to be coated having the uncured primer coating film with an aqueous colored coating composition ($Y_2$) for a top coating film, and forming an uncured top coating film thereover,
   step 2-3: a step of curing the uncured primer coating film and uncured top coating film by heating them,
   wherein the aqueous colored coating composition ($Y_2$) comprises a hydroxyl-containing resin (A), and a blocked polyisocyanate compound (B) having at least one blocked isocyanate group selected from the group consisting of blocked isocyanate groups represented by the following formula (I):

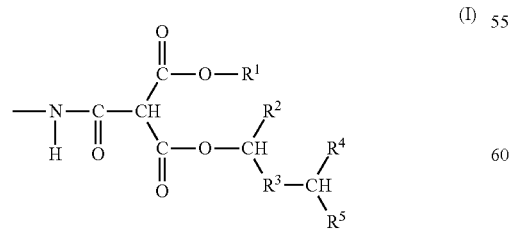

wherein $R^1$, $R^2$, $R^4$ and $R^5$ independently represent a C1-12 hydrocarbon group, and $R^3$ represents a C1-12 straight-chain or branched alkylene group, blocked isocyanate groups represented by the following formula (II):

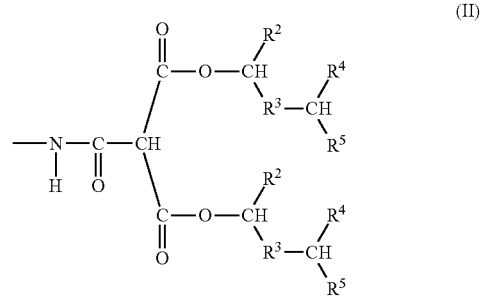

wherein $R^2$, $R^3$, $R^4$ and $R^5$ have the same definitions as above, and blocked isocyanate groups represented by the following formula (III):

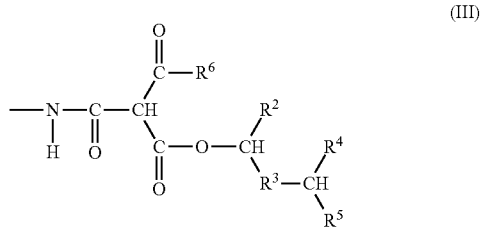

wherein $R^2$, $R^3$, $R^4$ and $R^5$ have the same definitions as above, and $R^6$ represents a C1-12 hydrocarbon group.

3. A method of forming a multilayer coating film comprising the following steps 3-1, 3-2 and 3-3:
   step 3-1: a step of coating an article to be coated with an aqueous colored coating composition ($Y_1$) for a base coat and forming an uncured base coat coating film on the article to be coated,
   step 3-2: a step of coating the article to be coated having the uncured base coat coating film with an clear coating composition (Z), and forming a clear coating film thereover,
   step 3-3: a step of curing the uncured base coat coating film and uncured clear coating film by heating them,
   wherein the aqueous colored coating composition ($Y_1$) comprises a hydroxyl-containing resin (A), and a blocked polyisocyanate compound (B) having at least one blocked isocyanate group selected from the group consisting of blocked isocyanate groups represented by the following formula (I):

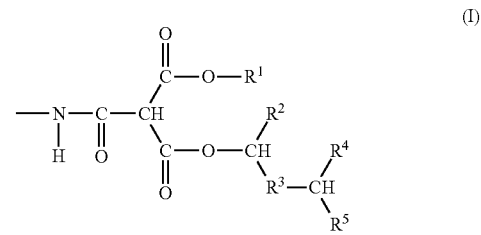

wherein $R^1$, $R^2$, $R^4$ and $R^5$ independently represent a C1-12 hydrocarbon group, and $R^3$ represents a C1-12 straight-chain or branched alkylene group, blocked isocyanate groups represented by the following formula (II):

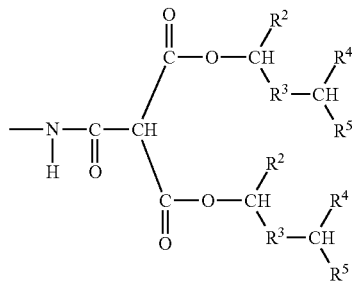
(II)

wherein $R^2$, $R^3$, $R^4$ and $R^5$ have the same definitions as above,
and blocked isocyanate groups represented by the following formula (III):

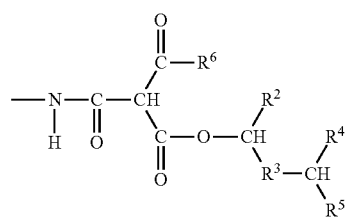
(III)

wherein $R^2$, $R^3$, $R^4$ and $R^5$ have the same definitions as above, and $R^6$ represents a C1-12 hydrocarbon group.

4. The method according to claim 1, wherein $R^1$ in formula (I) is an isopropyl group.

5. The method according to claim 1, wherein $R^6$ in formula (III) is an isopropyl group.

6. The method according to claim 1, wherein the blocked polyisocyanate compound (B) is obtained by reacting a blocked polyisocyanate compound precursor ($b_{31}$) having a blocked isocyanate group represented by the following formula (IV):

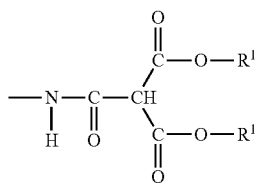
(IV)

wherein the $R^1$ groups are as defined above, and each $R^1$ group may be the same or different,
with a secondary alcohol ($b_4$) represented by the following formula (VI):

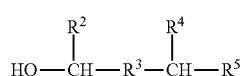
(VI)

wherein $R^2$, $R^3$, $R^4$ and $R^5$ are as defined above.

7. The method according to claim 1, wherein the blocked polyisocyanate compound (B) is obtained by reacting a blocked polyisocyanate compound precursor ($b_{32}$) having a blocked isocyanate group represented by the following formula (V):

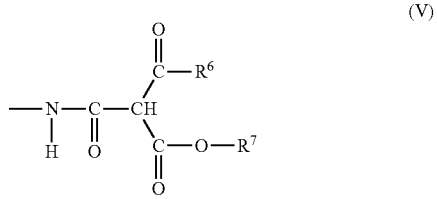
(V)

wherein $R^6$ is as defined above, and $R^7$ represents a C1-12 hydrocarbon group, with a secondary alcohol ($b_4$) represented by the following formula (VI):

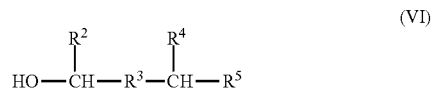
(VI)

wherein $R^2$, $R^3$, $R^4$ and $R^5$ are as defined above.

8. The method according to claim 1, wherein the blocked polyisocyanate compound (B) is a blocked polyisocyanate compound (B') having a hydrophilic group.

9. The method according to claim 1, wherein the hydroxyl-containing resin (A) contains a hydroxyl-containing acrylic resin aqueous dispersion ($A_{11}$).

10. The method according to claim 1, wherein the aqueous colored coating composition ($Y_1$) contains the hydroxyl-containing resin (A) and the blocked polyisocyanate compound (B) at 10 to 95 parts by mass and 5 to 90 parts by mass, respectively, based on a total of 100 parts by solid mass of the hydroxyl-containing resin (A) and the blocked polyisocyanate compound (B).

11. The method according to claim 1, wherein the aqueous colored coating composition ($Y_1$) further contains a melamine resin (C), and the aqueous colored coating composition ($Y_1$) contains the hydroxyl-containing resin (A), blocked polyisocyanate compound (B) and melamine resin (C) at 10 to 90 parts by mass, 5 to 85 parts by mass and 5 to 40 parts by mass, respectively, based on a total of 100 parts by solid mass of the hydroxyl-containing resin (A), the blocked polyisocyanate compound (B) and the melamine resin (C).

12. The method according to claim 1, wherein the clear coating composition (Z) contains a polyisocyanate compound with a non-blocked isocyanate group.

13. The method according to claim 1, wherein the step of curing is carried out at a temperature of 70° C. or higher and below 120° C.

14. A coated article having a multilayer coating film, formed by the method according to claim 1.

15. The method according to claim 2, wherein $R^1$ in formula (I) is an isopropyl group.

16. The method according to claim 2, wherein $R^6$ in formula (III) is an isopropyl group.

17. The method according to claim 2, wherein the blocked polyisocyanate compound (B) is obtained by reacting a blocked polyisocyanate compound precursor ($b_{31}$) having a blocked isocyanate group represented by the following formula (IV):

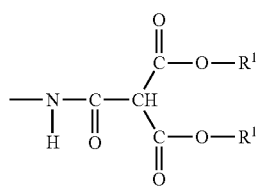
(IV)

wherein the $R^1$ groups are as defined above, and each $R^1$ group may be the same or different,
with a secondary alcohol ($b_4$) represented by the following formula (VI):

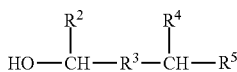
(VI)

wherein $R^2$, $R^3$, $R^4$ and $R^5$ are as defined above.

18. The method according to claim 2, wherein the blocked polyisocyanate compound (B) is obtained by reacting a blocked polyisocyanate compound precursor ($b_{32}$) having a blocked isocyanate group represented by the following formula (V):

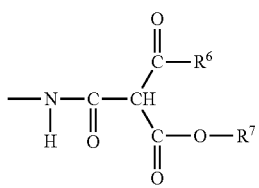
(V)

wherein $R^6$ is as defined above, and $R^7$ represents a C1-12 hydrocarbon group, with a secondary alcohol ($b_4$) represented by the following formula (VI):

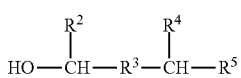
(VI)

wherein $R^2$, $R^3$, $R^4$ and $R^5$ are as defined above.

19. The method according to claim 2, wherein the blocked polyisocyanate compound (B) is a blocked polyisocyanate compound (B') having a hydrophilic group.

20. The method according to claim 2, wherein the hydroxyl-containing resin (A) contains a hydroxyl-containing acrylic resin aqueous dispersion ($A_{11}$).

21. The method according to claim 2, wherein the step of curing is carried out at a temperature of 70° C. or higher and below 120° C.

22. A coated article having a multilayer coating film, formed by the method according to claim 2.

23. The method according to claim 3, wherein $R^1$ in formula (I) is an isopropyl group.

24. The method according to claim 3, wherein $R^6$ in formula (III) is an isopropyl group.

25. The method according to claim 3, wherein the blocked polyisocyanate compound (B) is obtained by reacting a blocked polyisocyanate compound precursor ($b_{31}$) having a blocked isocyanate group represented by the following formula (IV):

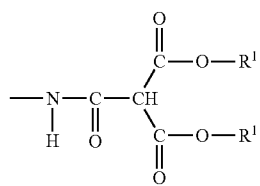
(IV)

wherein the $R^1$ groups are as defined above, and each $R^1$ group may be the same or different,
with a secondary alcohol ($b_4$) represented by the following formula (VI):

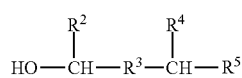
(VI)

wherein $R^2$, $R^3$, $R^4$ and $R^5$ are as defined above.

26. The method according to claim 3, wherein the blocked polyisocyanate compound (B) is obtained by reacting a blocked polyisocyanate compound precursor ($b_{32}$) having a blocked isocyanate group represented by the following formula (V):

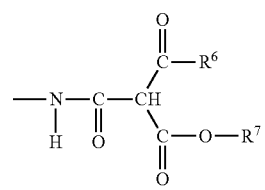
(V)

wherein $R^6$ is as defined above, and $R^7$ represents a C1-12 hydrocarbon group, with a secondary alcohol ($b_4$) represented by the following formula (VI):

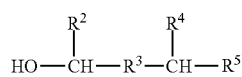
(VI)

wherein $R^2$, $R^3$, $R^4$ and $R^5$ are as defined above.

27. The method according to claim 3, wherein the blocked polyisocyanate compound (B) is a blocked polyisocyanate compound (B') having a hydrophilic group.

28. The method according to claim 3, wherein the hydroxyl-containing resin (A) contains a hydroxyl-containing acrylic resin aqueous dispersion ($A_{11}$).

29. The method according to claim 3, wherein the step of curing is carried out at a temperature of 70° C. or higher and below 120° C.

30. A coated article having a multilayer coating film, formed by the method according to claim 3.

31. The method according to claim 3, wherein the aqueous colored coating composition ($Y_1$) contains the hydroxyl-containing resin (A) and the blocked polyisocyanate compound (B) at 10 to 95 parts by mass and 5 to 90 parts by mass, respectively, based on a total of 100 parts by solid mass of the hydroxyl-containing resin (A) and the blocked polyisocyanate compound (B).

32. The method according to claim 3, wherein the aqueous colored coating composition ($Y_1$) further contains a melamine resin (C), and the aqueous colored coating composition ($Y_1$) contains the hydroxyl-containing resin (A), blocked polyisocyanate compound (B) and melamine resin (C) at 10 to 90 parts by mass, 5 to 85 parts by mass and 5 to 40 parts by mass, respectively, based on a total of 100 parts by solid mass of the hydroxyl-containing resin (A), the blocked polyisocyanate compound (B) and the melamine resin (C).

33. The method according to claim 3, wherein the clear coating composition (Z) contains a polyisocyanate compound with a non-blocked isocyanate group.

34. The method according to claim 2, wherein the aqueous colored coating composition ($Y_2$) contains the hydroxyl-containing resin (A) and the blocked polyisocyanate compound (B) at 10 to 95 parts by mass and 5 to 90 parts by mass, respectively, based on a total of 100 parts by solid mass of the hydroxyl-containing resin (A) and the blocked polyisocyanate compound (B).

35. The method according to claim 2, wherein the aqueous colored coating composition ($Y_2$) further contains a melamine resin (C), and the aqueous colored coating composition ($Y_2$) contains the hydroxyl-containing resin (A), blocked polyisocyanate compound (B) and melamine resin (C) at 10 to 90 parts by mass, 5 to 85 parts by mass and 5 to 40 parts by mass, respectively, based on a total of 100 parts by solid mass of the hydroxyl-containing resin (A), the blocked polyisocyanate compound (B) and the melamine resin (C).

* * * * *